(12) United States Patent
Baughman et al.

(10) Patent No.: US 12,006,598 B2
(45) Date of Patent: Jun. 11, 2024

(54) SHEATH-RUN ARTIFICIAL MUSCLES AND METHODS OF USE THEREOF

(71) Applicant: BOARD OF REGENTS, THE UNIVERSITY OF TEXAS SYSTEM, Austin, TX (US)

(72) Inventors: Ray H. Baughman, Dallas, TX (US); Jiuke Mu, Plano, TX (US); Monica Jung De Andrade, Dallas, TX (US); Shaoli Fang, Richardson, TX (US); Na Li, Dallas, TX (US); Carter S. Haines, Murphy, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 228 days.

(21) Appl. No.: 17/610,045

(22) PCT Filed: May 7, 2020

(86) PCT No.: PCT/US2020/031880
§ 371 (c)(1),
(2) Date: Nov. 9, 2021

(87) PCT Pub. No.: WO2020/231741
PCT Pub. Date: Nov. 19, 2020

(65) Prior Publication Data
US 2022/0259774 A1 Aug. 18, 2022

Related U.S. Application Data

(60) Provisional application No. 62/846,479, filed on May 10, 2019.

(51) Int. Cl.
*D02G 3/36* (2006.01)
*D02G 3/44* (2006.01)

(52) U.S. Cl.
CPC ............... *D02G 3/36* (2013.01); *D02G 3/448* (2013.01)

(58) Field of Classification Search
CPC ............. D02B 3/36; D02B 3/448; D02B 3/44
See application file for complete search history.

(56) References Cited

U.S. PATENT DOCUMENTS 10,154,895 B2 * 12/2018 Hiraoka ................. A61L 27/306
11,181,100 B2 * 11/2021 Kaneko .................... D04C 1/06
(Continued)

OTHER PUBLICATIONS

NPL1—Lovrecich, Patrizia; International Search Report and Written Opinion; PCT/US2020/031880; dated Mar. 5, 2021; 19 pages.
(Continued)

*Primary Examiner* — Bao-Thieu L Nguyen
(74) *Attorney, Agent, or Firm* — Dickinson Wright PLLC; Ross Spencer Garsson

(57) ABSTRACT

Sheath-run artificial muscles (or SRAMs) are described in which the dimensional changes and/or modulus changes of a sheath on the surface of a twisted or coiled host yarn or fiber drives torsional and tensile actuation. The sheath-core artificial muscle includes a sheath on a coiled core yarn or fiber that has inserted twist, in which the sheath does not include a yarn, the coiled core yarn or fiber includes a core yarn or fiber, the sheath can change volume, modulus, or a combination thereof when actuated by an influence source to drive actuation, and the influence source is selected from a group consisting of absorption processes, desorption processes, changes in temperature, changes in external pressure, changes in a magnetic field, changes in an electric field, exposures to actinic radiation, electrochemical charge and discharge, chemical reactions, and combinations thereof. These sheath-run muscles can be used for diverse applications, such as robots, robotic devices, energy harvesters, muscles that enable electrical energy harvesting, comfort- (Continued)

adjusting textiles, comfort-adjusting clothing, bio-powered intelligent muscles that control the release of drugs, muscles for appropriate drug delivery, intelligent muscles that sense their environment and actuate in response, muscles for artificial limbs and orthotic gloves, muscles for haptic applications, muscles that can perform in extreme environments, and muscles for intelligent solar panel positioning.

31 Claims, 31 Drawing Sheets

(56) References Cited

U.S. PATENT DOCUMENTS

| | | | | |
|---|---|---|---|---|
| 11,217,366 | B2* | 1/2022 | Baughman | H01B 7/04 |
| 11,299,825 | B2* | 4/2022 | Lima | D02J 1/18 |
| 2008/0170982 | A1* | 7/2008 | Zhang | D02G 3/44 |
| | | | | 423/447.3 |
| 2013/0205979 | A1* | 8/2013 | Nelis | D07B 1/16 |
| | | | | 57/244 |
| 2015/0147573 | A1* | 5/2015 | Zhang | B32B 5/12 |
| | | | | 427/113 |
| 2015/0152852 | A1* | 6/2015 | Li | D04C 1/02 |
| | | | | 60/527 |
| 2018/0096799 | A1* | 4/2018 | Chen | H01G 11/34 |
| 2018/0291535 | A1 | 10/2018 | Ridley et al. | |
| 2019/0376495 | A1* | 12/2019 | Kaneko | H02N 10/00 |
| 2020/0022803 | A1* | 1/2020 | Mirvakili | D02G 3/26 |
| 2020/0087820 | A1* | 3/2020 | Suzuki | D01F 8/14 |
| 2020/0345475 | A1* | 11/2020 | Lima | D02G 3/448 |
| 2020/0347525 | A1* | 11/2020 | Kaneko | H02N 10/00 |
| 2020/0347835 | A1* | 11/2020 | Kaneko | D02G 3/38 |
| 2021/0000587 | A1* | 1/2021 | Lima | B01J 23/50 |
| 2021/0046474 | A1* | 2/2021 | Lima | F04B 17/03 |
| 2021/0062378 | A1* | 3/2021 | Moody, III | B32B 3/30 |
| 2021/0317599 | A1* | 10/2021 | Yamanaka | D01D 5/098 |

OTHER PUBLICATIONS

D1—Lima Marco Dias et al.: Efficient, Absorption-Powered Artificial Muscles Based on Carbon Nanotube Hybrid Yarns, Small, vol. 11, No. 26, Jul. 1, 2015, pp. 3113-3118.

D2—Madden John D. W. and Kianzad Soheil: Twisted Lines: Artificial muscle and advanced instruments can be formed from nylon threads and fabric, IEEE Pulse, IEEE, USA, vol. 6, No. 1, Jan. 1, 2015, pp. 32-35.

D4—Jungwoo Park et al: "Electrically controllable twisted-coiled artificial muscle actuators using surface-modified polyester fibers", Smart Materials and Structures, IOP Publishing Ltd., Bristol, GB, vol. 26, No. 3, Feb. 17, 2017, p. 35048 (8 pp).

* cited by examiner

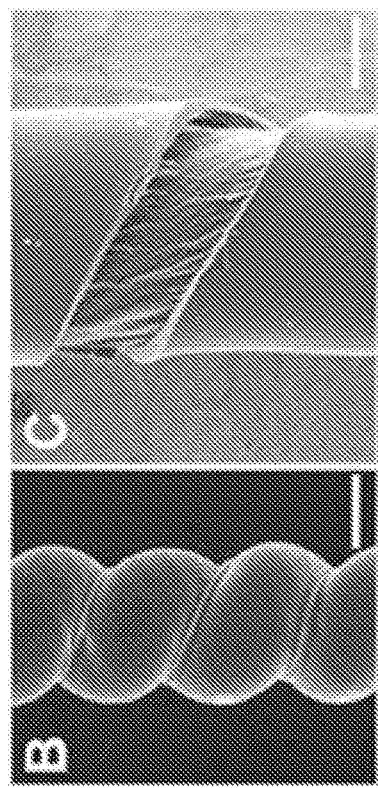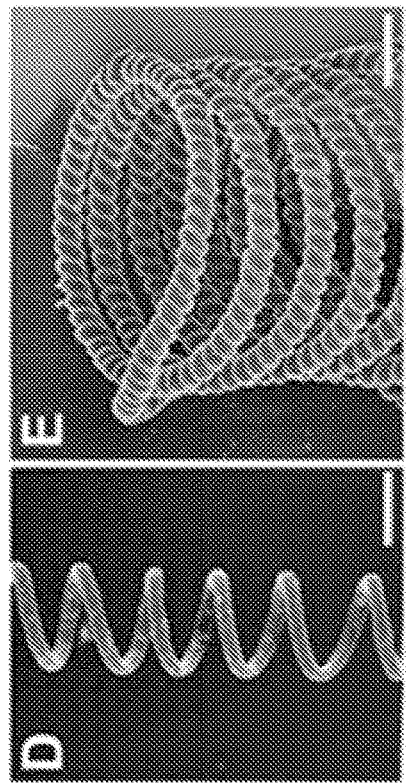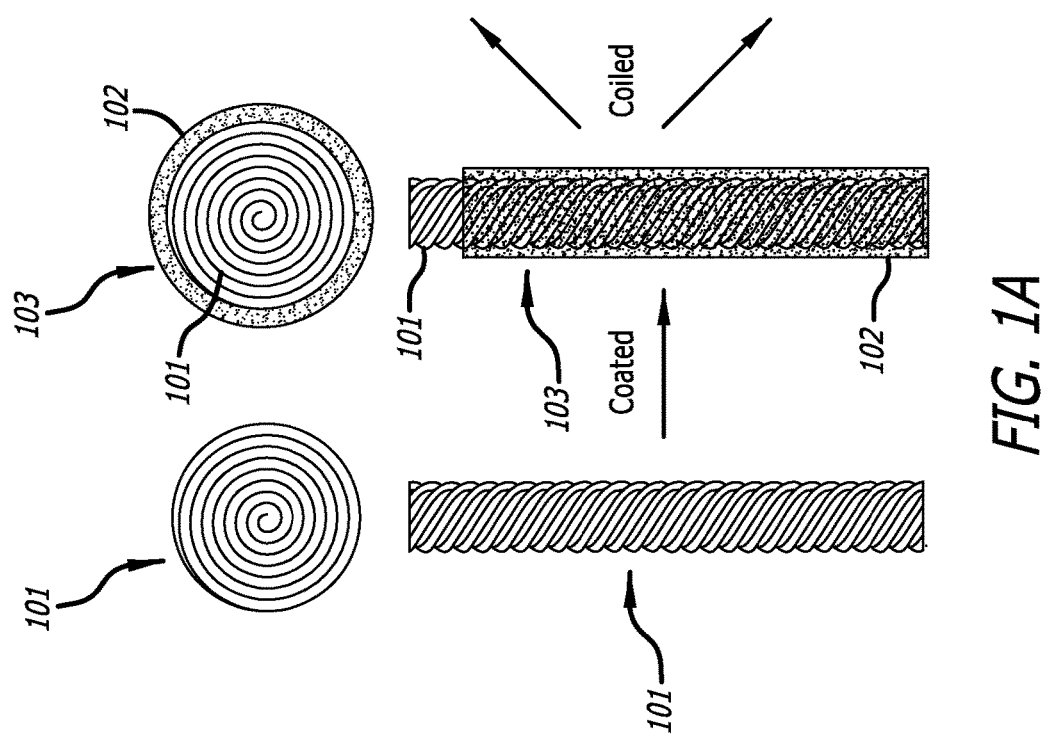
FIG. 1A FIG. 1B FIG. 1C FIG. 1D FIG. 1E

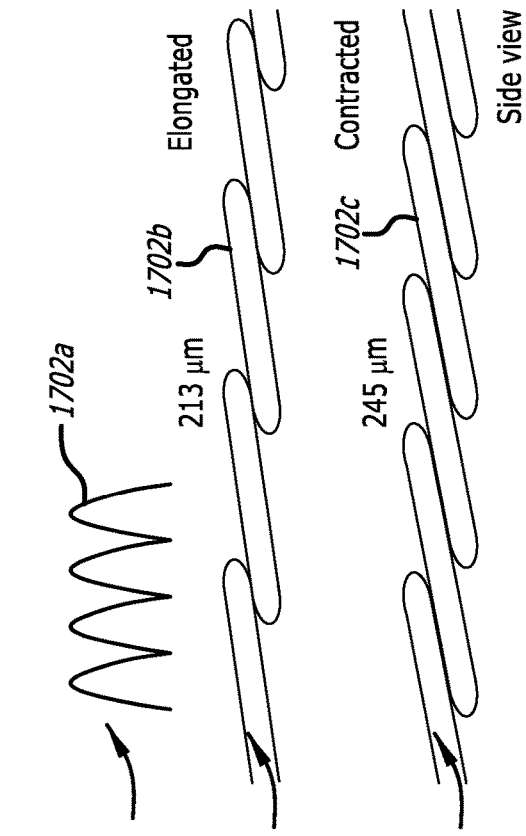
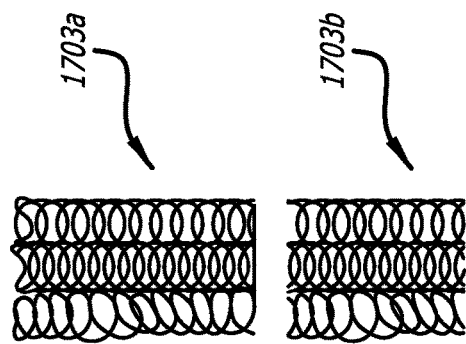
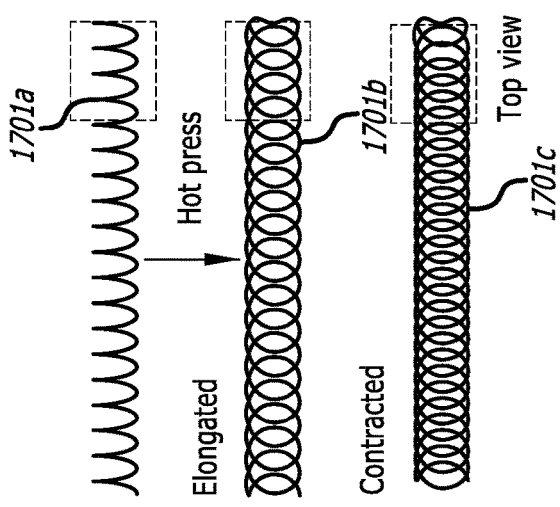
FIG. 17B
FIG. 17C
FIG. 17A

SHEATH-RUN ARTIFICIAL MUSCLES AND METHODS OF USE THEREOF

CROSS-REFERENCE TO RELATED APPLICATIONS

This application is a 35 U.S.C § 371 national application of PCT Application No. PCT/US2020/031880, filed on May 7, 2020, entitled "Sheath-Run Artificial Muscles And Methods Of Use Thereof", which claims priority to U.S. Provisional Patent Application No. 62/846,479, entitled "Sheath-Run Artificial Muscles And Methods of Use Thereof," filed May 10, 2019, which applications (including appendices) are incorporated by reference herein in their entirety.

GOVERNMENT INTEREST

This invention was made with government support under Grant No. FA9550-15-1-0089 awarded by the Air Force Office of Scientific Research and Grant No. N68335-18-C-0368 awarded by the Office of Naval Research. The government has certain rights in the invention. This invention was also supported by Grant No. AT-0029 from the Robert A. Welch Foundation.

FIELD OF INVENTION

The present invention is directed to artificial muscles and methods of use thereof, and more particularly sheath-run artificial muscles and methods of use thereof.

BACKGROUND OF THE INVENTION

Remarkable performance has been obtained for tensile and torsional carbon nanotube hybrid yarn muscles [Lima 2012; Gu 2016; Sun 2018; Song 2018; Mirvakili I 2017], whose actuation is driven by the volume change of a guest within a twisted or coiled carbon nanotube yarn host. During thermally-powered contraction, coiled hybrid muscles can deliver 29 times the work as the same weight human muscle [Lima 2012]. By changing the topological relationship between guest and host, major performance increases will be obtained, as well as the ability to replace expensive carbon nanotube yarn with cheap, commercially-available yarns.

Carbon nanotube (CNT) hybrid yarn artificial muscles (HYAMs) are made by inserting twist, or both twist and coiling, into a guest-filled CNT yarn. Muscles that are twisted (but not coiled), called twisted muscles, are mainly useful for torsional actuation. High inserted twist results in coiled muscles that can deliver tensile strokes exceeding those of human muscles [Lima 2012].

Polymer fiber and yarn muscles are also known [Haines 2014; Kim 2015; Aziz 2015; Zhang 2015; Hiraoka 2016; Swartz 2018] that operate similarly to CNT HYAMs: expansion of muscle volume drives muscle untwist, and this untwist produces both torsional and tensile actuation. These thermally or electrothermally driven polymer muscles are cheap, since they can be inexpensively made by inserting extreme twist into high strength fibers or yarns used for fishing line and sewing thread. Other materials have also been exploited as fiber-like muscles, such as twisted graphene oxide fiber [Cheng 2014], twisted shape memory alloy yarn [Mirvakili II 2017], twisted or coiled shape memory polymer fiber [Fan 2017], cotton yarn composites [Gong 2017], coiled carbon fiber/polydimethylsiloxane yarn [Lamura 2018], neat coiled multi-ply CNT yarns [Chen 2015; Deng 2017], neat twisted CNT yarns [Lima 2102; Guo 2012; Meng 2014], and twisted spider-silk dragline [Agnarsson 2009]. CNT HYAMs are especially useful since guest changes can convert them from being thermally driven [Lima 2012; Song 2018] to being driven electrochemically [Foroughi 2011; Lee 2017], by absorption [Gu 2016; Sun 2018; Kim 2016], or even as an actuating sensor that detects the presence of a biochemical and responds by opening or closing a valve.

The present challenge is to develop a fundamentally new host-guest topology that eliminates the liabilities of CNT HYAMs. First, the ability of guest expansion to drive yarn untwist depends on the yarn's bias angle (the angle between the yarn length and the nanotube direction). Since this angle decreases to zero when going from yarn surface to yarn center, the input energy delivered to guest near yarn center is not effectively utilized. Second, muscle mechanical power is limited by the chemical or thermal transport times to access yarn volume.

SUMMARY OF INVENTION

The present invention is directed to a major change in muscle topology that addresses each of the above-referenced problems. Rather than locating the volume-changing yarn guest within the yarn's interior, as for a HYAM, the guest of the present invention is a sheath on the surface of the host yarn. The resulting actuators are a new type of artificial muscles, referred to as "sheath-run artificial muscles" (or "SRAMs"), in which the dimensional changes and modulus changes of a sheath on the surface of a twisted or coiled host yarn or fiber drives torsional and tensile actuation. The present invention enables inexpensive yarn muscles, in which a sheath on a coiled yarn drives actuation that delivers much higher work per cycle and power densities during contraction than for previous guest-filled muscles. This topology change from guest-filled to sheath-run artificial muscles can increase the maximum work capacity, such as by factors of 1.70 to 2.15, for coiled tensile muscles driven electrothermally or by vapor absorption. A sheath-run electrochemical muscle can generate about 2 W/g of average contractile power—40 times that for a human muscle.

Advantages of this new host-guest structure include (1) increased output specific mechanical energy, output specific mechanical power, and energy conversion efficiency compared with prior-act hybrid muscles, and highly reversible actuation; and (2) enabling the replacement of expensive carbon nanotube yarns with inexpensive yarns. These sheath-run muscles can be used for diverse applications, from robots and robotic devices and energy harvesters to comfort-adjusting textiles and biopowered intelligent muscles that control the release of drugs. Such uses further include: comfort adjusting clothing, robotics, intelligent muscles that sense their environment and appropriately actuate, muscles for artificial limbs and orthotic gloves, muscles for appropriate drug delivery, muscles for haptic applications, muscles that can perform in extreme environments, muscles that enable electrical energy harvesting, and muscles for intelligent solar panel positioning.

In general, in one aspect, the invention features a sheath-core artificial muscle that includes a sheath on a coiled core yarn or fiber that includes twist. The sheath does not include a yarn. The coiled core yarn or fiber includes a core yarn or fiber. The sheath can change volume, modulus, or a combination thereof when actuated by an influence source to drive actuation. The influence source is selected from a group consisting of absorption processes, desorption processes, changes in temperature, changes in external pressure, changes in pH, changes in a magnetic field, changes in an electric field, exposure to actinic radiation, electrochemical charge or discharge, chemical reaction, and combinations thereof.

Implementations of the invention can include one or more of the following features:

The sheath-core artificial muscle can be operable to actuate by at least one of torsional rotation and changes in length.

The ratio of average thickness of the sheath to average diameter of the coiled core yarn or fiber before actuation can be at least 0.05.

The ratio of average sheath thickness of the sheath to average diameter of the coiled core yarn or fiber before actuation is at most 3.0.

The sheath can have a twist. The twist can be in the same direction as the direction of inserted twist in the coiled core yarn or fiber.

The sheath can have a twist. The twist can be in the opposite direction as the direction of inserted twist in the coiled core yarn or fiber.

The coiled core yarn or fiber can have the same direction of twist as the direction of coiling.

The coiled core yarn or fiber can have the opposite direction of twist as the direction of coiling.

The sheath-core artificial muscle can further include sheaths of at least two types of guest compositions or structures.

The sheath can be asymmetrically placed on opposite sides of the coiled core yarn. The asymmetrical placement can be with respect to sheath thickness, structure, or composition. The asymmetrical placement can be placed so that bending of the sheath-core artificial must can occur during actuation.

The coiled core yarn can include a plied core yarn.

The plied core yarn can include plies of differing types.

The core yarn or fiber can not significantly include a volume-changing guest.

The core yarn or fiber can include a guest. The guest can have a substantially same chemical composition as the sheath.

The concentration of the guest in the core yarn or fiber can be lowest at or near the center of the core yarn or fiber.

The core yarn or fiber can include a guest. The guest can have a substantially different chemical composition as the sheath. The guest can respond differently to the influence source.

The core yarn or fiber can include carbon nanotubes.

The core yarn or fiber can be substantially free of guest.

The core yarn or fiber can include carbon fibers.

The core yarn or fiber can include high strength carbon fibers and an elastomeric yarn guest.

The coiled core yarn or fiber can undergo substantial change in modulus or volume during actuation.

The sheath-core artificial muscle can include at least two components that are operable to actuate by changing volume, modulus, or both. The at least two actuating components can be selected from a group consisting of (1) multiple actuating sheaths, (2) actuating sheath and actuating core, and (3) combinations thereof.

The sheath-core artificial muscle can be operable to actuate in response to an environmental change by using differing actuation contributions from the at least two components within the yarn core or fiber to environmental changes that drive actuation.

The sheath-core artificial muscle can be operable to actuate (a) in response to the presence of at least one of an antigen, a toxic agent, and a biological agent, and (b) without the need for electrical energy input.

The sheath-core artificial muscle can be operable to provide sufficiently high tensile or torsional actuation to enable drug release.

The sheath-core artificial muscle can be operable to be actuated, at least in part, electrochemically.

The actuation of the sheath-core artificial muscle can be predominately driven electrochemically by using an electrically and ionically conducting muscle sheath as an electrochemical electrode.

The sheath-core artificial muscle can further include a high-surface-area electrical conductor in an electrolyte that is connected ionically to a counter electrode.

The high-surface-area conductor can include carbon nanotubes.

The twisted and coiled core yarn or fiber can be substantially electrochemically inactive. The twisted and coiled core yarn or fiber can include an insulating polymer yarn or fiber or an electronically conducting yarn or fiber.

The sheath can include a redox active electrical conductor in an electrolyte.

The twisted and coiled core or fiber of the sheath-core artificial muscle can be a counter electrode of the sheath-core artificial muscle. The sheath and coiled core yarn or fiber can be separated by an electronically insulating, ionically conducting layer.

The sheath-core artificial muscle can further include approximately coplanar coils of coiled core yarns or fibers.

The sheath-core artificial muscle can have a spring index of at most 1.5.

In general, in another aspect, the invention features a textile, article of clothing or bedding that includes one (or more) of the above-described sheath-core artificial muscles.

In general, in another aspect, the invention features a process for fabricating a sheath-run artificial muscle that includes the step of inserting twist in a yarn or fiber that is below the twist needed to produce coiling of the yarn or fiber. The process further includes the step of coating the twisted yarn or fiber with a sheath material. The process further includes the step of adding additional twist to the coated twisted yarn or fiber to produce a sheath-run artificial muscle comprising a coiled core yarn or fiber having a sheath. The step of adding additional twist occurs while (i) the sheath material is in a non-brittle state, and (ii) the coated twisted yarn or fiber is under tensile load.

Implementations of the invention can include one or more of the following features:

The non-brittle state of the sheath material can be obtained by heating the sheath material or by causing it to swell by liquid or vapor absorption.

In general, in another aspect, the invention features a method of using a sheath-core artificial muscle that includes the step of selecting one (or more) of the above-described sheath-core artificial muscles. The method further includes the step of driving actuation of the sheath-core artificial muscle using an actuation source that is selected from a group consisting of absorption processes, absorption or desorption processes, changes in pH, changes in temperature, changes in external pressure, changes in a magnetic field, changes in an electric field, exposure to actinic radiation, electrochemical charge or discharge, chemical reaction, and combinations thereof.

Implementations of the invention can include one or more of the following features:

The sheath-run muscles can be used for an application selected from a group consisting of robots, robotic devices, robotics, energy harvesters, muscles that enable electrical energy harvesting, comfort-adjusting textiles, comfort-adjusting clothing, biopowered intelligent muscles that control the release of drugs, muscles for appropriate drug delivery, intelligent muscles that sense their environment and actuate in response, muscles for artificial limbs and orthotic gloves, muscles for haptic applications, muscles that can perform in extreme environments, and muscles for intelligent solar panel positioning.

In general, in another aspect, the invention features a process for fabricating a coiled sheath-run artificial muscle. The process includes inserting twist that is sufficient to provide coiling in a nanofiber or microfiber ribbon that is patterned along its width with at least one deposited guest. The twist (a) is inserted near the center of the ribbon's width and the lateral patterning of this at least one deposited guest is exterior to the central region where twist is inserted, or (b) is inserted at one lateral edge of the ribbon and at least one deposited guest is deposited distant from this lateral edge.

In general, in another aspect, the invention features a process for fabricating a coiled sheath-run artificial muscle. The process includes scrolling a guest-deposited nanofiber or microfiber comprising ribbon and then inserting twist that is sufficient to produce coiling. The scrolling (a) is inserted near the center of the ribbon width and the lateral patterning of guest is exterior to the central region where twist is inserted, or (b) is inserted at one lateral edge of the ribbon and the guest is deposited distant from this lateral edge.

In general, in another aspect, the invention features a process for fabricating a coiled sheath-run artificial muscle. The process includes inserting twist that is sufficient to provide coiling in a spinning wedge that is laterally patterned with at least one deposited guest. The twist (a) is inserted near the center of the spinning wedge and the lateral patterning of guest is exterior to the central region where twist is inserted, or is inserted at one lateral edge of the spinning wedge and the guest is deposited distant from this lateral edge.

BRIEF DESCRIPTION OF THE DRAWINGS

FIGS. 1A-1E show muscle fabrication and structure for torsional and tensile actuation. FIG. 1A provides schematic lateral and cross-sectional views of a twisted CNT yarn and a SRAM, made by coating a twisted CNT yarn with a polymer sheath. FIGS. 1B-1E are scanning electron microscope (SEM) micrographs for PEO-SO$_3$@CNT muscles. FIG. 1B is a SEM micrograph of an SRAM made by self-coiling a sheath-coated twisted yarn. FIG. 1C is a SEM micrograph of the surface of a twisted SRAM, which was broken by untwisting in liquid N$_2$, showing the distinct boundary between sheath polymer and CNT core. FIG. 1D is a SEM micrograph of a mandrel-coiled twisted SRAM. FIG. 1E is a SEM micrograph of an SRAM that was self-coiled and then mandrel-coiled. The scale bars for FIGS. 1B-1E are 35, 15, 200, and 200 µm, respectively.

FIG. 2A is a graph showing the combinations of sheath/core ratio and yarn bias angle (prior to sheath coating) that result in sheath cracking (red region) during SRAM fabrication and combinations that result in crack-free sheaths (white region). FIG. 2B is a graph showing that for actuation by a saturated atmosphere of ethanol in dry air, the dependence of torsional stroke and maximum rotation speed on sheath/core ratio for a non-coiled 39-µm-diameter PEO-SO$_3$@CNT SRAM containing 74 turns/cm of twist, which had a bias angle of 42° before sheath coating. The inset of FIG. 2B are SEM micrographs at two magnifications showing the sheath cracking that occurs for sheath/core ratios that are in the red-colored region of the data plot. The scale bars are 150 µm (left) and 30 µm (right). FIGS. 2C-2F are SEM micrographs showing the sheath-core structure of PEO-SO$_3$@CNT SRAMs having progressively higher sheath-core ratios. The muscle sheath was intentionally cracked by untwisting the muscle while it was immersed in liquid nitrogen. The scale bars are 20 µm.

In FIG. 4A, twist is being inserted on one edge the spinning wedge to form an Archimedean yarn and the yarn guest is deposited on the opposite side of the spinning wedge, so that the guest is only in an outer shell of the yarn. In FIG. 4B, twist is being inserted at the center of the spinning wedge to form a Fermat yarn and the yarn guest is deposited near both sides of the spinning wedge, so that the guest is only on an outer shell of the yarn.

FIG. 5A are schematic illustrations of a PEO-SO$_3$ SRAM before vapor exposure and during vapor sorption and desorption, which cause the yarn to untwist and to uptwist, respectively. FIG. 5B is an illustration of vapor delivery to a muscle and graphs plotting the time dependence of torsional stroke and rotation speed for one sorption/desorption cycle for a PEO-SO$_3$@CNT SRAM and HYAM and for a pristine CNT yarn. A 41-µm-diameter pristine yarn, with 72 turns/cm of twist, was used for fabricating the 45-µm-diameter SRAM and 50-µm-diameter HYAM, which contained a 0.53 weight ratio of PEO-SO$_3$ to CNT. FIG. 5C is a graph showing equilibrium torsional stroke vs. weight changes due to ethanol absorption and desorption for the muscles of FIG. 5B, and the SRAM-to-HYAM stroke ratio during ethanol absorption. FIG. 5D is a graph showing torsional stroke vs. time for the muscles of FIG. 5B. FIG. 5E is a graph showing the observed dependence of torsional stroke on sheath/core ratio for PEO-SO$_3$@CNT SRAMs. FIG. 5F are graphs showing torsional stroke and rotation speed vs. time for a sorption/desorption cycle of a PEO-SO$_3$@silk SRAM and HYAM and a silk yarn. A 56-μm-diameter silk yarn (with 5.7 turns/cm of twist) was used for fabricating the 90-μm-diameter SRAM and HYAM, which weighed 0.48 mg/cm and contained a 0.27 weight ratio of PEO-SO$_3$ to silk.

FIG. 9A is a graph showing tensile stroke vs. time for a PEO-SO$_3$@CNT SRAM and HYAM and a pristine yarn when actuated by ethanol absorption using the illustrated configuration in FIG. 9A and 33 MPa stress. Sorption was from a near-equilibrium ethanol concentration in dry air and desorption was by dynamic pumping. Before coiling, the diameters of the PEO-SO$_3$@CNT SRAM and HYAM and the pristine yarn were 43, 47, and 38 μm, respectively. FIG. 9B is a graph showing tensile stroke and contractile work capacity vs. applied stress for the sorption-actuated muscles of FIG. 9A. FIG. 9C is a graph showing the time dependence of tensile stroke for a PU@CNT SRAM and HYAM and a pristine CNT yarn when electrothermally actuated using the illustrated configuration of FIG. 9C, 42 MPa stress, and 0.25 W/cm power, which provided temperatures of 85, 93, 97° C., respectively. Before coiling, the diameters of the PU@CNT SRAM and HYAM and the pristine yarn were 65, 71, and 51 μm, respectively. FIG. 9D is a graph showing tensile stroke and contractile work capacity vs. applied stress for the electrothermally actuated yarns in FIG. 9C.

FIG. 13A is a graph showing tensile stroke versus time for a PEO-SO$_3$@CNT SRAM, a PEO-SO$_3$@CNT HYAM, and a pristine CNT yarn when electrothermally actuated using the isobaric load that maximized muscle stroke (18, 15, and 19 MPa, respectively). The input power per yarn length was 0.18 W/cm and a 0.08 Hz square-wave potential was applied, which provided peak temperatures of 167, 175, 190° C., respectively. Before coiling, the diameters of the SRAM, the HYAM, and the pristine yarn were 44, 47, and 36 μm, respectively. FIG. 13B is a graph showing equilibrium tensile stroke and contractile work capacity versus applied isobaric stress for the PEO-SO$_3$@CNT SRAM, the PEO-SO$_3$@CNT HYAM, and the pristine CNT yarn of FIG. 13A, when using the same power input for electrothermal heating as in FIG. 13A. FIGS. 13C-13D are graphs showing the frequency dependence of (FIG. 13C) the tensile stroke and average tensile stroke release rate and (FIG. 13D) the per-cycle contractile work capacity and the full-cycle contractile power density for the PEO-SO$_3$@CNT SRAM and the PEO-SO$_3$@CNT HYAM when driven in air by square-wave voltages between 0 and 12 V. FIGS. 13E-13F are graphs showing the frequency dependence of (FIG. 13E) the tensile stroke and average tensile stroke release rate and (FIG. 13F) the per-cycle contractile work capacity and the full-cycle contractile power density for the PEO-SO$_3$@CNT SRAM and the PEO-SO$_3$@CNT HYAM when driven in a room-temperature water bath by square-wave voltages between 0 and 23 V For FIGS. 13C-13F, the diameters of the SRAM and the HYAM were 53 and 57 μm, and the load applied was around 29 MPa.

FIG. 14A is a graph showing results for the ethanol-vapor-driven PEO-SO$_3$@CNT SRAM of FIG. 9A and a tensile load of 48 MPa. FIG. 14B is a graph showing results for the electro-thermally-driven PU@CNT SRAM of FIG. 9C and a tensile load of 57 MPa. FIG. 14C is a graph showing results for the electro-chemically-driven CNT@nylon6 SRAM of FIG. 15D and a tensile load of 48 MPa. Actuation resulted from switching the inter-electrode voltage from 0 V to –3V. FIG. 14D is a graph showing results for the electro-thermally-driven PEO-SO$_3$@CNT SRAM of FIG. 13A and a tensile load of 48 MPa.

FIG. 15A is an illustration of cone spinning for fabricating CNT yarns and its modification for making SRAM yarns. SEM micrographs of a coiled pristine yarn, a coiled CNT@nylon6 SRAM yarn, and a non-coiled nylon 6 yarn are shown. FIG. 15B is a graph showing tensile stroke of the SRAM and HYAM during a cyclic voltammetry scan at 20 mV s$^{-1}$, under 22 MPa isobaric stress. The inset of FIG. 15B is a graph showing actuator stroke at this load for this muscle versus interelectrode voltage scan rate. FIG. 15C is a graph showing tensile stroke and contractile work capacity vs. load when applying a 10 mHz square-wave voltage between 0 and –3 V. The spring indices of the 95-μm-diameter CNT@nylon6 SRAM and the 70-μm-diameter CNT HYAM were 0.88 and 0.56, respectively. FIG. 15D is a graph showing the frequency dependence of work capacity for a coiled CNT@nylon6 SRAM (filled symbols) and a coiled CNT HYAM for square-wave voltages between 0 and –3 V at different applied stress. For 1 Hz cycle frequency, the tensile stroke, work-per-cycle, and average contractile power density for the SRAM at the highest loads were 4.7%, 0.99 J/g, and 1.98 W/g, compared to 0.90%, 0.11 J/g, and 0.22 W/g for the HYAM. FIG. 15E is a graph showing the scan rate dependence of work capacity and energy conversion efficiency for the SRAM and HYAM, using an applied stress of ~30 MPa for the SRAM and HYAM. For FIGS. 15D-15E, the spring indices of the 87-μm-diameter CNT@nylon6 SRAM and the 79-μm-diameter CNT HYAM were 0.97 and 0.67, respectively.

FIGS. 17A-17C are photographs showing actuating fibers and an illustrative simple textile based on water-vapor-driven planar SRAMs. FIG. 17A are photographs showing the fabrication of a planar SRAM: a homochiral, mandrel-coiled, twisted SRAM using a 150-μm-diameter PEO-SO$_3$@polycarbonate yarn having a sheath/core ratio of 0.33, an inserted twist of 22 turns/cm, and a spring index of 11.5. Pressing this mandrel-coiled SRAM between flat plates at 120° C. for 6 hours produced the below SRAM, which is pictured in initial (elongated) and moisture-actuated (contracted) states when the applied load is 4.3 MPa. FIG. 17B shows lateral views that are orthogonal to those of FIG. 17A. For illustrating the possible use of planar heterochiral SRAMs in an intelligent textile, photographs of three heterochiral SRAMs interconnected by an inert 150-μm-diameter fiber are provided (FIG. 17C) for the expanded moisture-absorbed state and the contracted moisture-free state. For an isobaric 4.7 MPa load, 48.6% contraction was obtained by exposing a homochiral planar SRAM to moist air (RH=70%) after it had been equilibrated in an ambient RH of 34%. For clarity, the muscle backgrounds in FIGS. 17A-17C were made black.

DETAILED DESCRIPTION

While guest-filled carbon nanotube yarns have provided record performance as torsional and tensile artificial muscles, they are expensive and only part of the muscle effectively contributes to actuation. The present invention provides a new muscle topology that enables inexpensive yarn muscles, where a sheath on a coiled yarn drives actuation that delivers much higher work per cycle and power densities during contraction than for previous muscles.

Fabrication of Sheath-Run Artificial Muscles

Carbon multiwalled nanotubes (MWNTs), which were initially used as the muscle core, were drawn as a sheet from a MWNT forest. In an exemplary experiment, a 12-cm-long, 2-cm-wide stack of seven sheet layers was twisted to make a MWNT yarn. Inserting 74 turns/cm of twist (normalized to the initial sheet length), while applying 8 MPa stress (normalized to the cross-sectional area of the twisted yarn), produced a 41-μm-diameter yarn with a 42° bias angle. These CNT yarns have either an Archimedean, dual Archimedean, or Fermat structure, depending upon the asymmetry or symmetry of stresses applied during twist insertion [Lima 2011]. Yarns having an Archimedean structure, like for conventional polymer yarns, were generally used since they provide large torsional actuation.

The nomenclature used to designate a sheath X on a yarn core Y of a SRAM or an X guest inside a yarn of a HYAM is X@Y. Hence, PEO-SO$_3$@CNT denotes a PEO-SO$_3$ guest and a CNT yarn host, where PEO-SO$_3$ is a 3 to 7 weight ratio of a blend of poly(ethylene oxide) and a co-polymer of tetrafluoroethylene and sulfonyl fluoride vinyl ether [Aquivion® PFSA from the Solvay Group].

SRAMs were fabricated from twisted yarns. See FIG. 1A showing schematic lateral and cross-sectional views of a twisted CNT yarn 101 and a SRAM 103, made by coating a twisted CNT yarn 101 with a polymer sheath 102 and FIGS. 1B-E showing SEM micrographs for PEO-SO$_3$@CNT muscles. A targeted thickness of sheath polymer was deposited around a yarn core by drawing a vertically-suspended, torsionally-tethered yarn through a large droplet of polymer solution multiple times. After completely drying in air to remove solvent, which was typically an ethanol/water solution designed to avoid polymer infiltration into the twist-densified core yarn, the sheath/core ratio (i.e., the ratio of sheath thickness to yarn diameter) was measured using a scanning electron microscope (SEM).

Figure 2B:
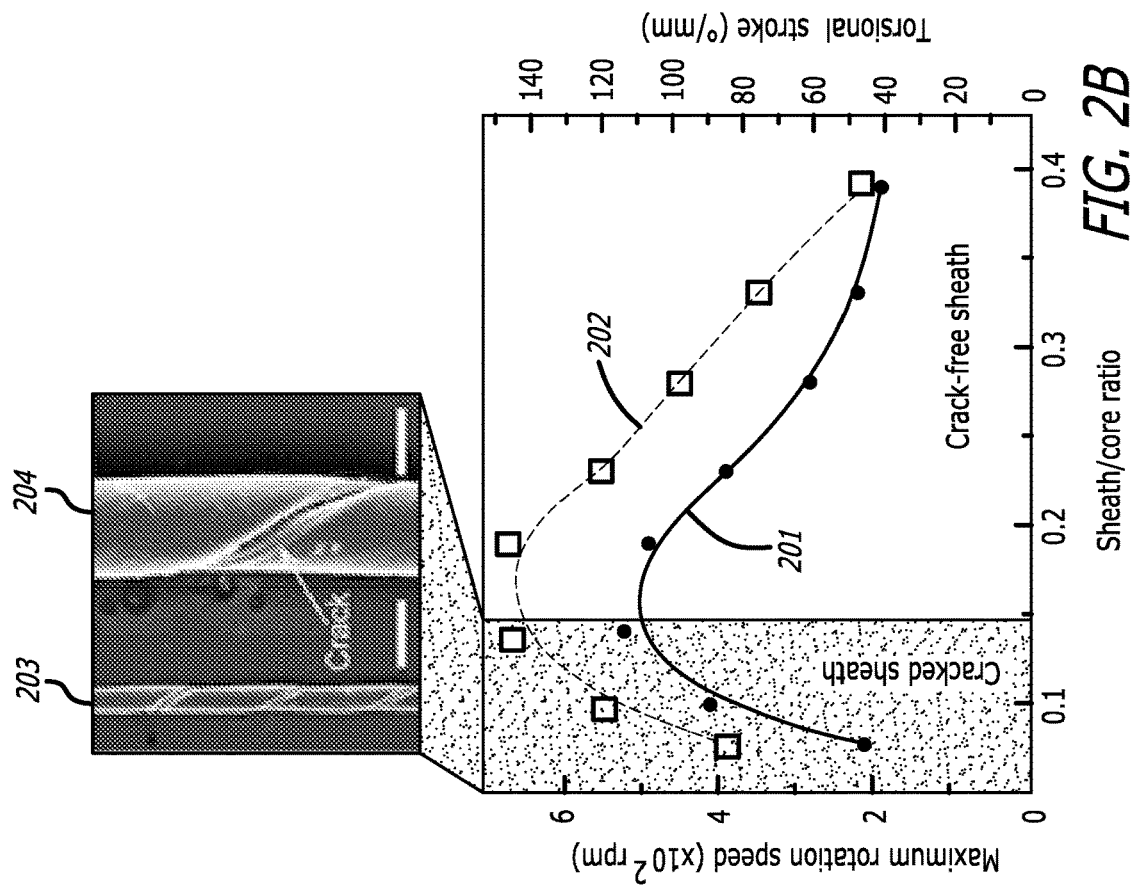
FIGS. 2A-2F illustrate the effects of sheath/core ratio on the fabricability and performance of a PEO-SO$_3$@CNT SRAM.
Figure 2A:
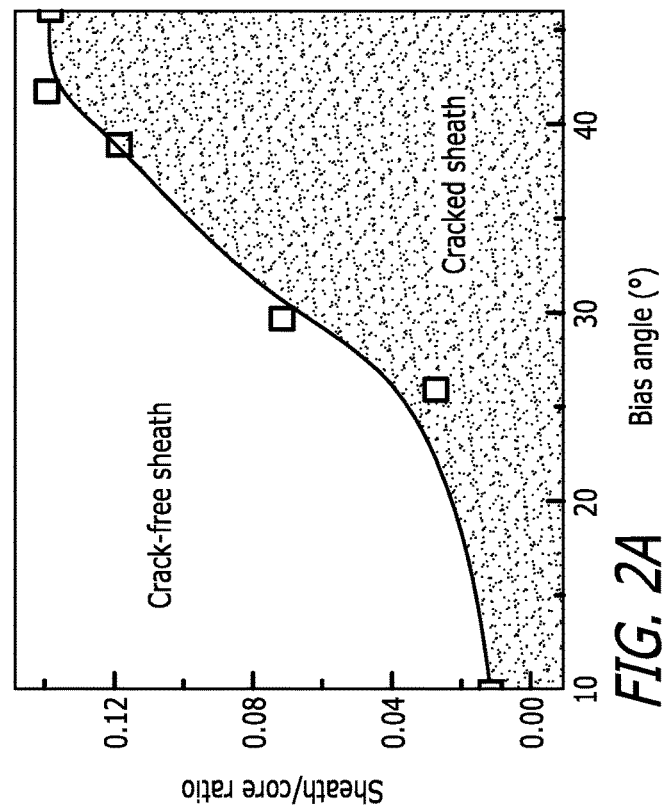
Figures 2C, 2D, 2E, 2F:
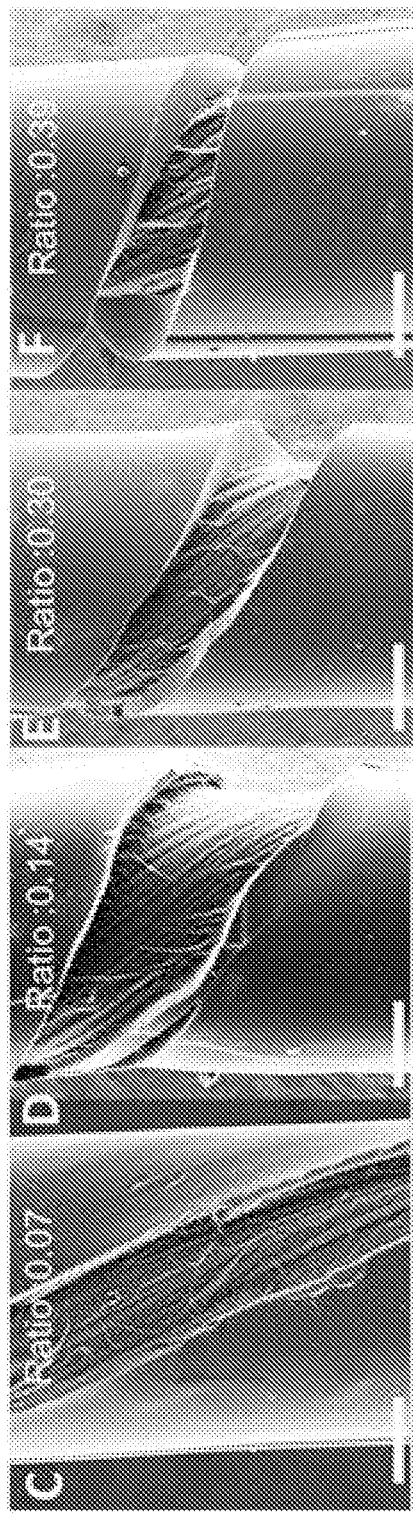

The sheath thickness is optimally chosen to be above the minimum thickness needed to prohibit such large untwist during release of tethering that the sheath cracks. FIG. 2A shows the yarn-bias-angle dependence of the minimum sheath/core ratio needed to prevent sheath cracking for a twisted PEO-SO$_3$@CNT yarn, and FIG. 2B shows that this ratio approximately maximizes torsional stroke (with plot 201 showing maximum rotational speed and plot 202 showing torsional stroke). For instance, for a PEO-SO$_3$@CNT yarn with a CNT bias angle of ~42°, a sheath/core ratio above 0.14 is needed to prohibit such large yarn untwist that sheath cracking occurs, and a sheath/core ratio below ~0.2 is needed for near maximum torsional stroke. The inset of FIG. 2B are SEM micrographs at two magnifications 203-204 showing the sheath cracking that occurs for sheath/core ratios that are in the darkened region of the data plot. The scale bars are 150 μm (magnification 203) and 30 μm (magnification 204).

The range of useful sheath/core ratios will depend on the type of materials and the structures of the sheath and the core. However, in most instances, the preferred minimum of the sheath/core ratio is 0.05 and the preferred maximum is below 3.0. FIGS. 2C-2F show the sheath-core structure of PEO-SO$_3$@CNT SRAMs having progressively higher sheath-core ratios, where the muscle sheath was intentionally cracked by untwisting the muscle while it was immersed in liquid nitrogen. These sheath/core ratios are important for both tensile and torsional actuation, since torsional actuation drives the tensile actuation of coiled SRAMs. A large sheath/core ratio enables the engineering of coiled SRAMs that provide non-monotonic tensile strokes when the applied load is small. During actuation, the SRAM first contracts in length until inter-coil contact occurs and then expands as inter-coil contact drives actuation. (See plot 304 in FIG. 3C; insets 305-308 are optical microscope images during the contraction and elongation processes). However, if the sheath/core ratio is too large, sheath-driven actuation does not significantly occur.

Figure 3A:
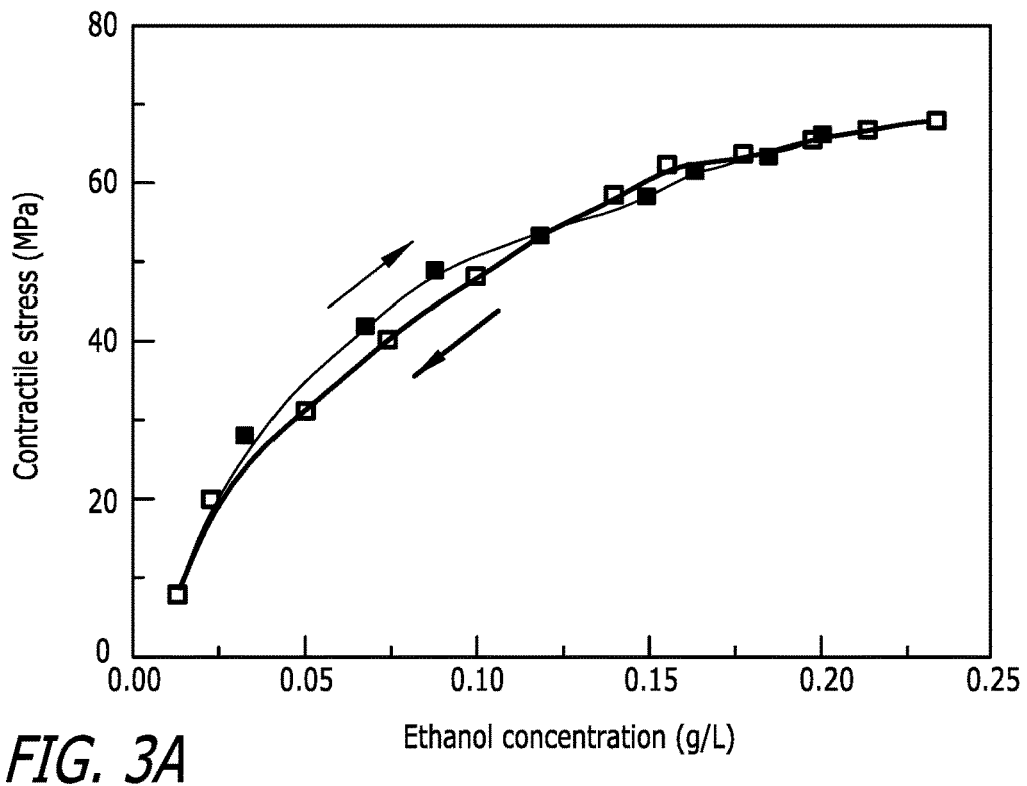
FIG. 3A is a graph showing equilibrium tensile stress generation as a function of ethanol concentration in dry air for isometric tensile actuation of a coiled PEO-SO$_3$@CNT SRAM. The outer diameter of the self-coiled SRAM was 44 µm, its inserted twist was 110 turns/cm, and its sheath/core ratio was 0.14.
Figure 3B:
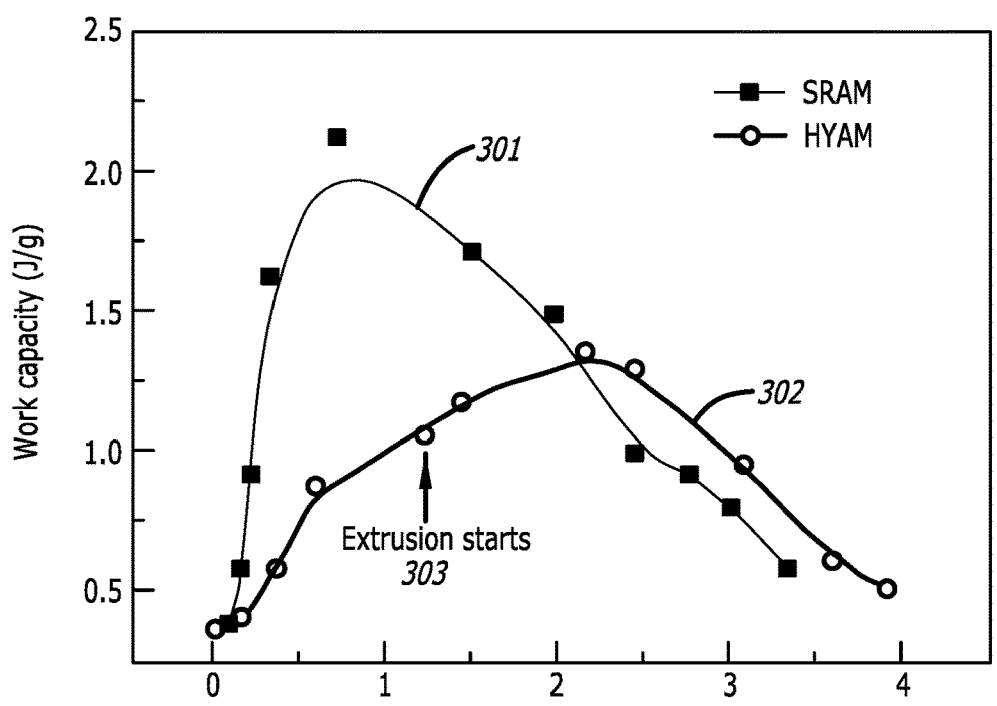
FIG. 3B is a graph showing load-optimized work capacity of a coiled PEO-SO$_3$@CNT SRAM and HYAM as a function of guest-to-host mass ratio ($M_G/M_H$). The mass ratio at which the guest PEO-SO$_3$ begins to extrude from the HYAM during coiling is indicated.

For comparative studies, the weight ratio of guest to host core was essentially the same for the SRAM and HYAM, and the same mechanical load was applied during twist insertion. Twisted HYAMs were made using the above droplet method by adding a similar weight ratio of polymer to a low-twist-yarn, partially drying the polymer solution to a gel-like state, and then adding additional twist to equal that of the SRAM. FIG. 3B is a graph showing load-optimized work capacity of a coiled PEO-SO$_3$@CNT SRAM (plot 301) and PEO-SO$_3$@CNT HYAM (plot 302) as a function of guest-to-host mass ratio ($M_G/M_H$). The mass ratio at which the guest PEO-SO$_3$ begins to extrude from the HYAM during coiling is indicated at point 303. If the weight ratio of yarn guest to host yarn is too high for a HYAM, guest will extrude from the host yarn during twist insertion (FIG. 3B). Such guest extrusion to provide a muscle sheath can be usefully deployed to increase work capacity. Nevertheless, the work capacity per total muscle weight for this example is much higher for all ratios of yarn guest to host yarn for muscles that contain guest in the sheath, but not in the core (FIG. 3B).

Relevant for cases where the work capacity per host yarn weight is the main performance metric, since the host yarn is expensive, the results of FIG. 3B indicate that the peak in work capacity per host yarn weight for the SRAM with no guest in the yarn core (4.27 J/g) is slightly lower than the peak in work capacity per host yarn weight for a modified SRAM that contains guest in both sheath and yarn core (4.43 J/g). This ability to include yarn guest in both sheath and in yarn core is useful for invention embodiments, especially when differences in guest composition in a sheath to that of the guest in the yarn core are used to provide additive or subtractive contributions to environmental changes that drive actuation.

As shown in FIG. 1C for the fractured surface of a twisted SRAM, the above deposition process to produce a SRAM can result in a sharp interface between the sheath and core, with no noticeable guest within the core yarn. To demonstrate that CNT yarns can be replaced by inexpensive yarns, commercially available nylon 6, silk, and bamboo yarns were evaluated as the muscle core, as well as easily-manufactured electrospun polyacrylonitrile (PAN) nanofibers.

"Self-coiled" yarns, which are most useful for tensile actuation, were fabricated by inserting further twist, while the guest was in the gel state (FIG. 1B). To increase yarn stroke by increasing the spring index, twisted yarns or self-coiled yarns (FIG. 1D-1E, FIG. 11A-11C) were coiled or supercoiled by wrapping around a mandrel. Afterwards, the coiled yarn was thermally annealed, which for PEO-SO$_3$@CNT was by heating at 115° C. for 4 hours. When describing a muscle, the diameter is for the dry, twisted muscle before coiling. Unless otherwise described, gravimetric work and power densities are normalized to the weight of the dry muscle. The spring index is the ratio of the difference in outer coil diameter and the fiber diameter to the fiber diameter, where a fiber's diameter is its width in its largest lateral dimension.

Alternative methods are also available for making variants of sheath-run artificial muscles, in which both sheath and core comprise nanofibers or microfibers, but guest incorporation is radially dependent. One of these methods uses the inventor's biscrolling method for yarn fabrication [Fang '756 patent and Lima 2011]. For instance, the guest material can be deposited in a patterned manner on a longitudinally extended sheet (which is here called a ribbon) comprising an array of nanofibers or microfibers, so that twist insertion about the longitudinal axis (i.e., the ribbon axis) results in guest distribution only on the outer part of the yarn. More specifically, if the guest is deposited only on the two outer lateral regions of a ribbon, twist insertion in the center of the ribbon will result in location of the guest only in the outer regions of a Fermat yarn. On the other hand, the guest can be deposited only on one lateral side of the ribbon, so that twist insertion in the opposite lateral ribbon side again results in location of the guest only in the outer regions of an Archimedean yarn. By depositing different guests on different lateral regions of the ribbon, this biscrolling process can be used to provide sheath-run muscles that have different guests in the yarn sheath (or in a multiplicity of sheaths) and optionally in the yarn core. Such multiplicity of guest-containing sheaths, or this multiplicity of guest-containing sheaths in combination with optionally a guest-containing yarn core, can be used to provide sheath-run muscles that provide intelligent actuation in response to various environmental influences. Depending upon the sign and magnitude of the volume changes produced by different environmental influences on different guests, these influences can either negatively or positively affect muscle stoke.

Figure 4A:
FIGS. 4A-4B are schematic illustrations of biscrolling a guest that is patterned on a spinning wedge, as this spinning wedge is formed by twist-based spinning from a carbon nanotube (CNT) forest.
Figure 4B:
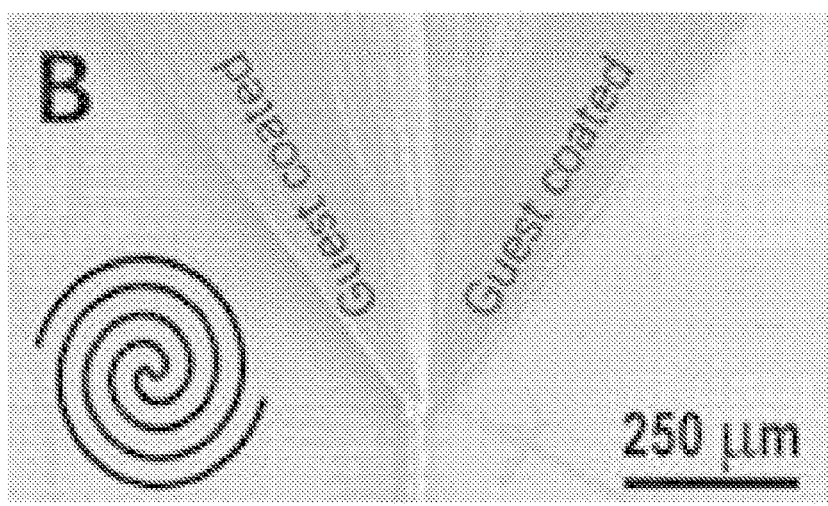
Figure 4C:
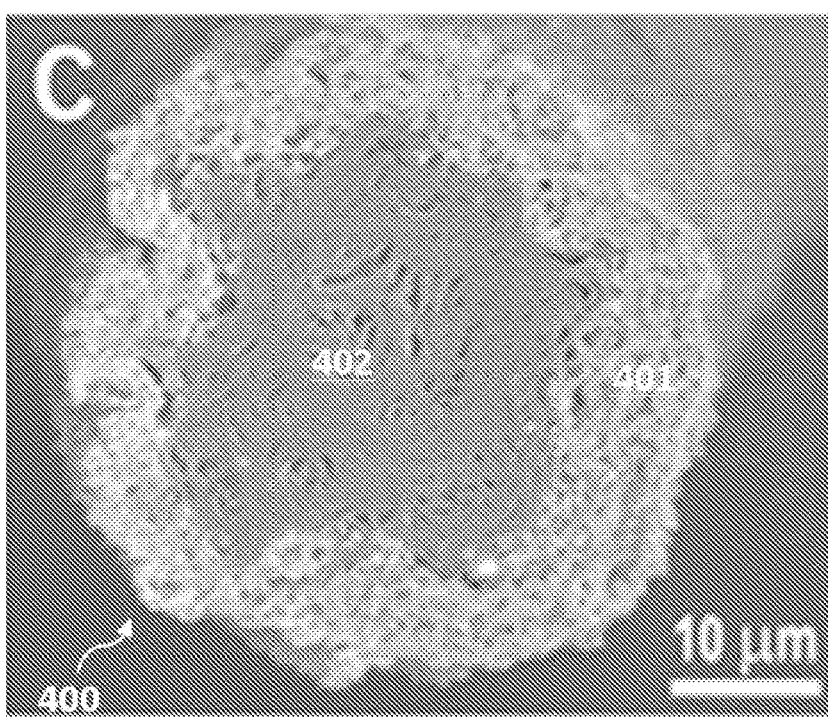
FIG. 4C is a SEM micrograph of a CNT yarn, made by the process of FIG. 4B, which contains TiO$_2$ guest only on the outer shell of the yarn.
Figure 4D:
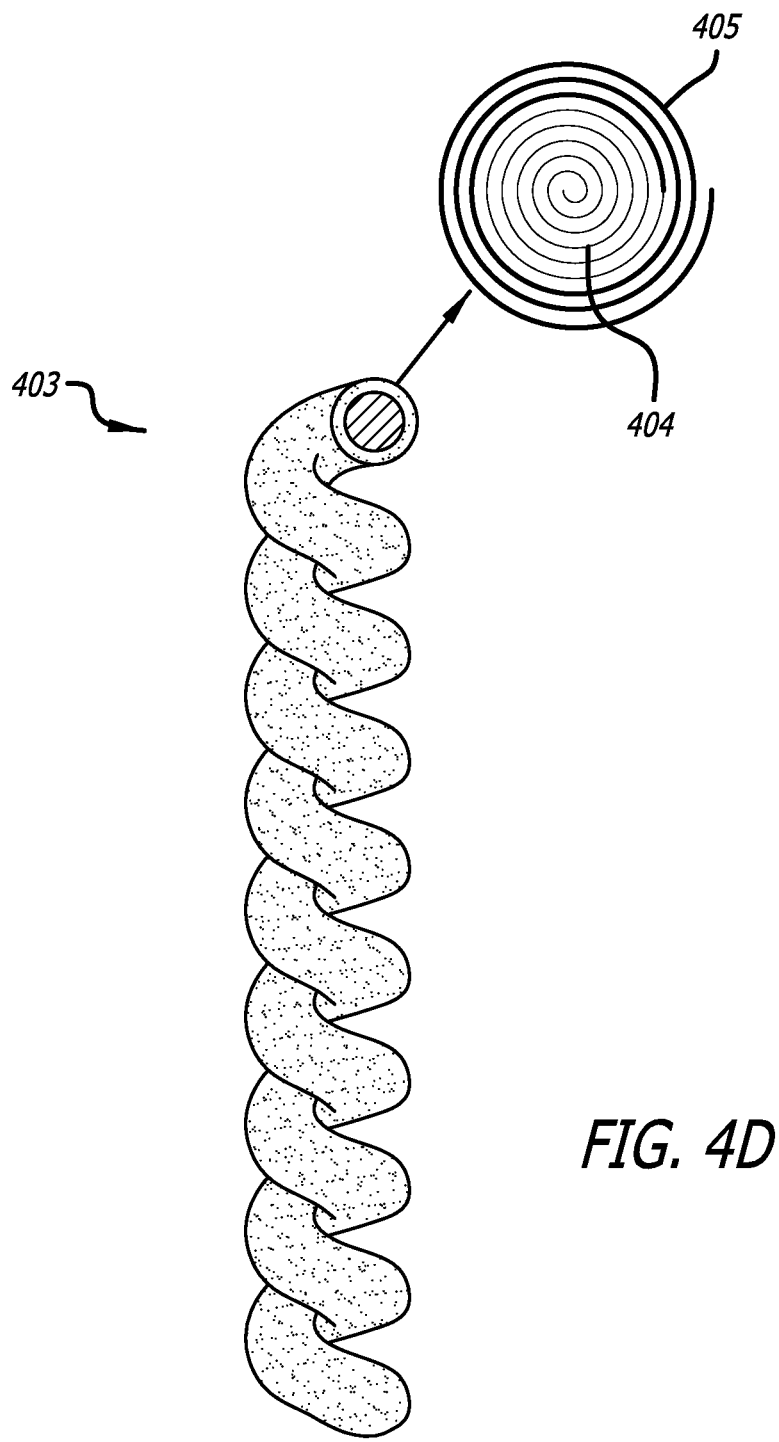
FIG. 4D is a schematic illustration of a coiled Archimedean CNT yarn that that contains two guests, one in the central part of the yarn and one in the outer part of the yarn.

Rather that accomplishing the above biscrolling processes by twist insertion into a preformed guest-patterned sheet, this process for forming a sheath-core structure can be analogously performed by selectively depositing guest on the spinning wedge that is formed while spinning an array comprising nanofibers or microfibers into a twisted yarn [Fang '756 patent and Lima 2011]. This method is shown FIGS. 4A-4B for the specific case where the spinning wedge is formed by yarn twist during draw of a nanofiber sheet from a carbon nanotube forest. FIG. 4C is a SEM micrograph of a CNT yarn 400, made by the process of FIG. 4B, which contains $TiO_2$ guest only on the outer shell 401 of yarn 400 (but not the central part 402 of yarn 400). FIG. 4D is a schematic illustration of a coiled Archimedean CNT yarn 403 that that contains two guests, one in the central part of yarn 403 (denoted by layers 404) and one in the outer part of yarn 403 (denoted by layers 405).

As an alternative to this method for fabricating of sheath-run muscles, the guest-deposited nanofiber or microfiber sheet can be scrolled like a jelly-roll from a lateral ribbon edge (for the case where the guest is deposited adjacent to the opposite edge) or can be scrolled from the ribbon center (for the case where the guest is deposited adjacent to both ribbon edges). Inserting twist into this scrolled yarn provides a sheath-run muscle.

As an alternative to the above biscrolling method using a nanofiber or microfiber sheet as the substrate for deposited guest, this sheet can comprise any fixable material, such as a thin polymer sheet. However, for use as electrochemical sheath-run muscles this sheet should be a membrane that enables penetration of an electrolyte.

In invention embodiments that are especially useful for large-stroke, tensile sheath-run muscles, so much twist is inserted into a sheath-core yarn that yarn completely coils.

Torsional Actuation of Twisted Muscles Powered by Sorption

Figure 5A:
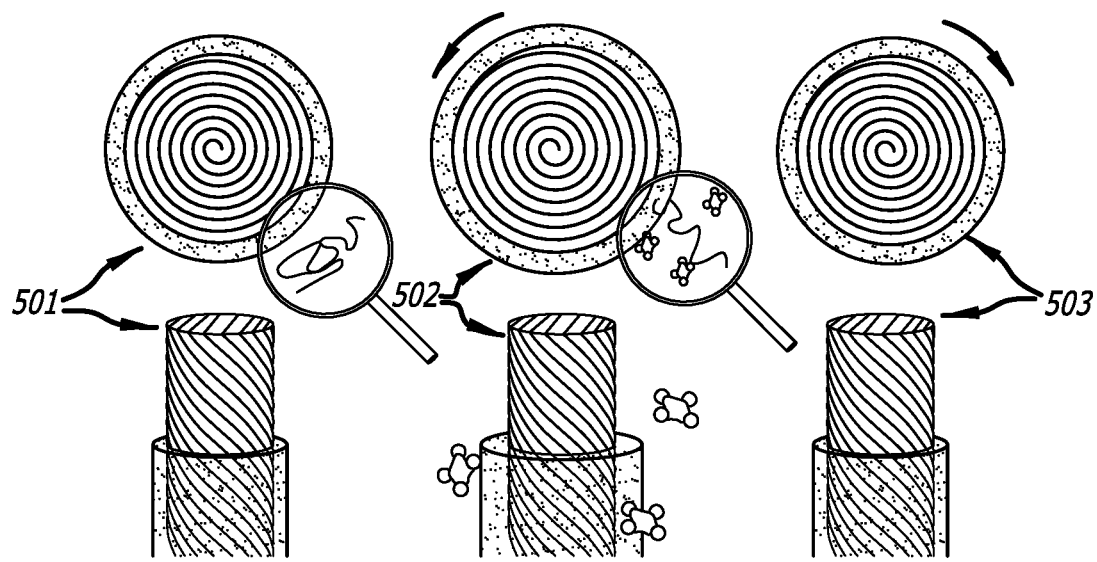
FIGS. 5A-5F show torsional actuation of twisted PEO-SO$_3$ SRAMs and HYAMs driven by ethanol vapor.

FIG. 5A illustrates the untwist during vapor sorption and the uptwist during vapor desorption that occurs during the actuation cycle of a SRAM that is torsionally and translationally tethered at only one end. FIG. 5A are schematic illustrations 501-503 of, respectively, a $PEO-SO_3$ SRAM before vapor exposure and during vapor sorption and desorption, which cause the yarn to untwist and to uptwist, respectively. Unless otherwise indicated for actuation cycles of SRAM, HYAM, and pristine yarn, a near-equilibrium vapor pressure of an absorbable vapor was provided in a flow of room-temperature dry air and then removed by vacuum pumping, using the glass tube system 521 illustrated in FIG. 5B. For comparative studies, the same lightweight paddle at yarn end (weighing 60 mg, and having a moment of inertia of 0.28 kg·mm$^2$) was used to characterize torsional rotation angle and speed. Also, twisted muscles for SRAM and HYAM comparisons were made from identical yarn, the same degree of twist insertion was used, and the host/guest weight ratio was kept nearly constant.

Figure 5B:
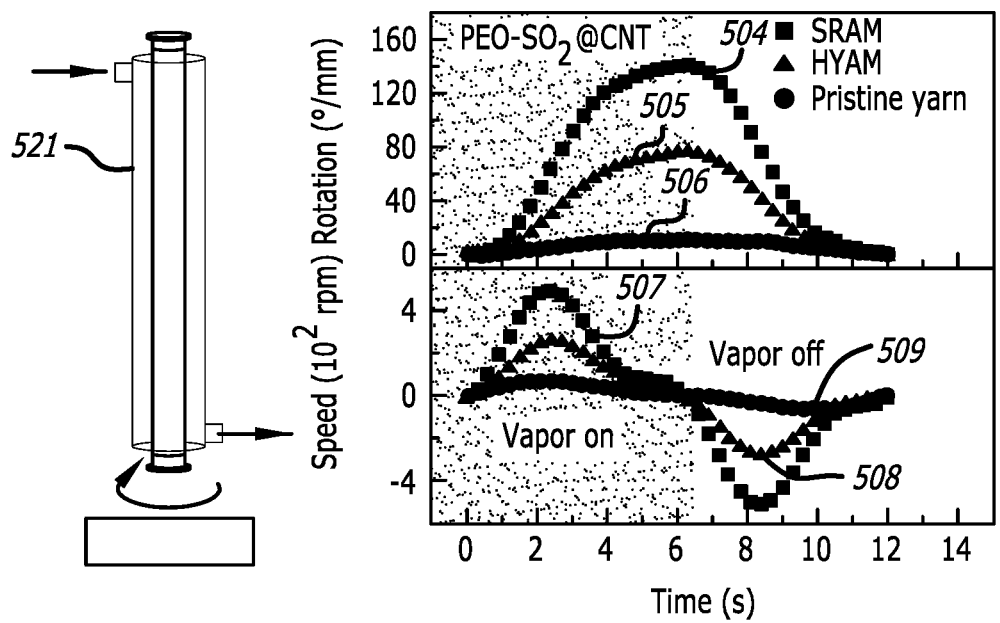
Figure 5C:
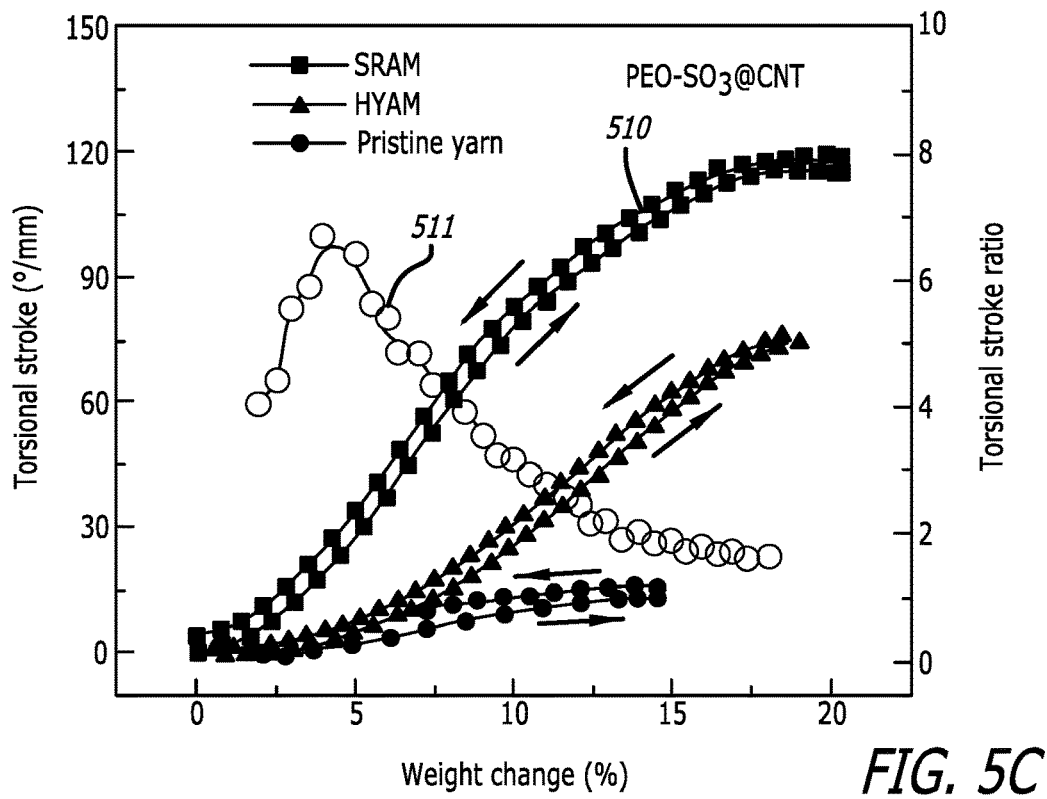

The graphs in FIG. 5B compare the time dependence of paddle rotation and speed for a $PEO-SO_3$@CNT SRAM (plots 504 and 507, respectively), a $PEO-SO_3$@CNT HYAM (plots 505 and 508, respectively), and a pristine CNT (plots 506 and 509, respectively) muscle that are undergoing one complete cycle of ethanol-vapor-powered actuation. These results for fully reversible actuation show that the peak stroke and peak rotation speeds for the SRAM (143°/mm and 507 rpm) were about twice that for the HYAM (76°/mm and 254 rpm), and much larger than for the pristine yarn (4.7°/mm and 36 rpm). FIG. 5C shows equilibrium torsional stroke vs. weight changes (plot 510) due to ethanol absorption and desorption for the muscles of FIG. 5B, and the SRAM-to-HYAM stroke ratio during ethanol absorption (plot 511). In FIG. 5C, steady-state measurements of torsional stroke versus weight-percent ethanol in the muscles show that the ratio of $PEO-SO_3$@CNT SRAM to $PEO-SO_3$@CNT HYAM torsional strokes peaks at 6.7 for 4.1 weight percent (wt %) ethanol, and thereafter gradually decreases to 1.7 for 17.5 wt % ethanol. There is little hysteresis in torsional strokes for the SRAM and HYAM, which means that both could be used to reliably open and close valves in response to absorbed vapor. However, the torsional stroke of the SRAM is much more sensitive to the amount of absorbed ethanol than the HYAM. If twisted yarns are replaced by coiled yarns, much larger torsional strokes can be obtained [Chen 2015; Deng 2017].

Figure 5D:
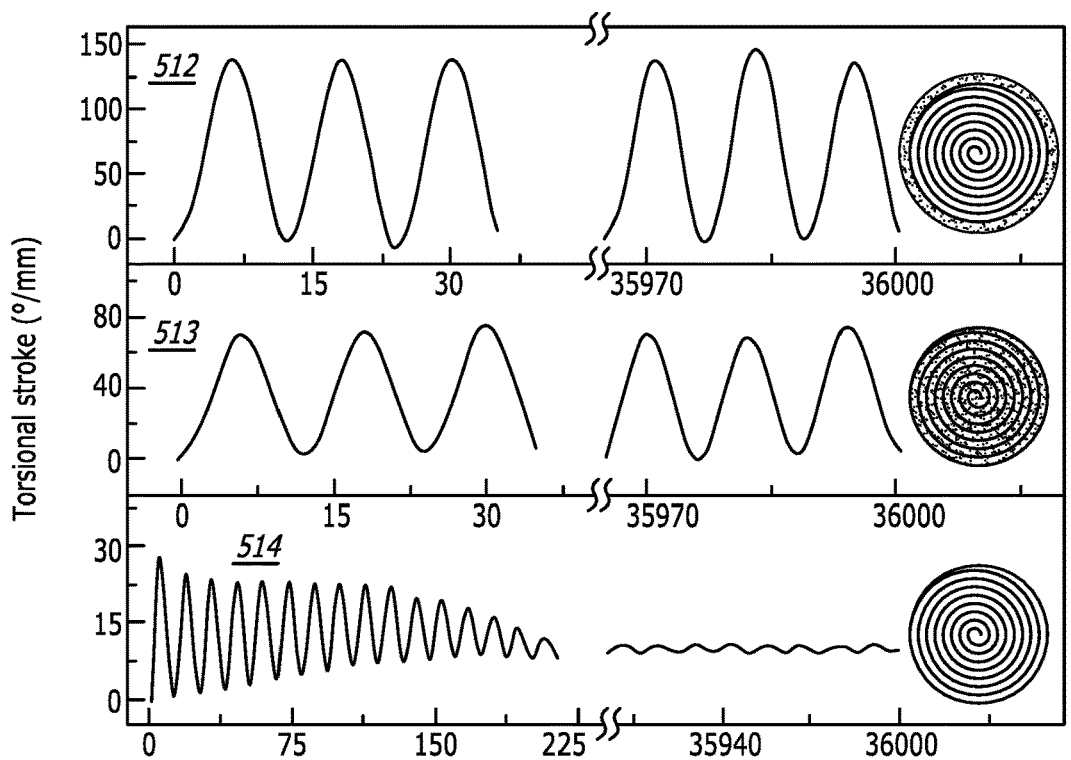
Figure 5E:
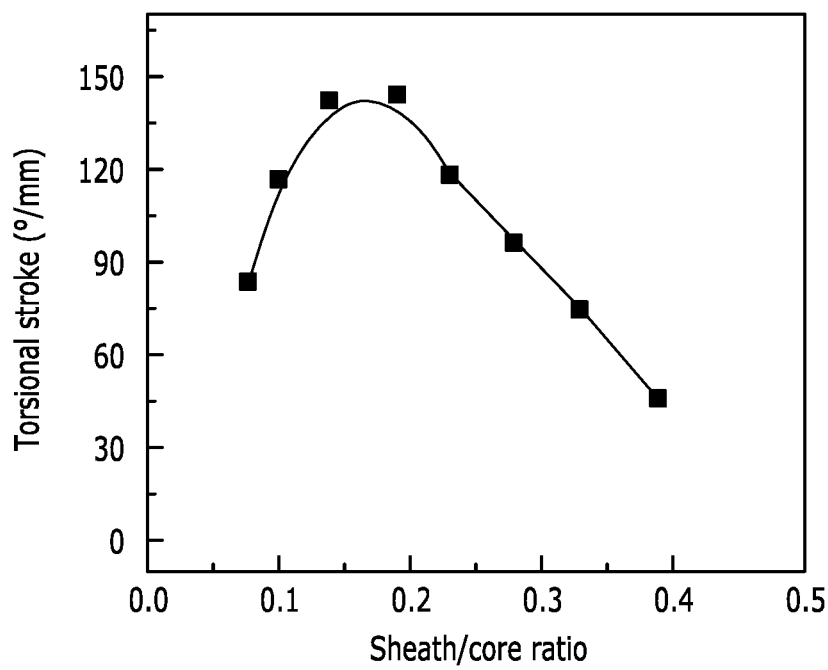

FIG. 5D is a graph showing torsional stroke vs. time for the $PEO-SO_3$@CNT SRAM and HYAM and pristine CNT yarn muscles discussed and described above regarding FIG. 5B (plots 512-514, respectively). FIG. 5D shows that the $PEO-SO_3$@CNT SRAMs and HYAMs reversibly actuate over 3000 cycles of ethanol absorption and desorption without substantial change in torsional actuation, despite the absence of tethering to an external torsional return spring. This reversibility results since the guest acts as a torsional return spring. In contrast, the torsional stroke of the pristine yarn rapidly decreases from 27.3°/mm for the first cycle to about 4.73°/mm on the 27th cycle, thereafter stabilizing at near this value for the next 3000 cycles. This eventual stabilization results when the degree of yarn twist becomes sufficiently low (22 turns/cm versus the initial 74 turns/cm) that inter-nanotube interactions become sufficiently strong to act as an internal torsional return spring for subsequent small torsional strokes. The smaller torsional stroke for the pristine yarn, even at the start of actuation cycles, can be associated with the known increase in pristine yarn volume during liquid sorption [Terrones 2014].

For evaluating the effect of equilibrium sheath volume change during ethanol absorption on torsional stroke, the $PEO-SO_3$ sheath of a $PEO-SO_3$@CNT SRAM was replaced by polyvinyl alcohol (PVA) and nylon 6 sheaths. Reflecting the much higher equilibrium percent volume expansion of the $PEO-SO_3$ (16.7%), compared with that for PVA (1.3%) or nylon 6 (0.5%), the torsional stroke of the $PEO-SO_3$@CNT SRAM (143°/mm) was much larger than for the SRAMs having PVA (22°/mm) or nylon 6 sheaths (11°/mm). However, this shows that the 13-fold maximum variation in torsional stroke reduces to a 3.2-fold maximum variation when torsional stroke is normalized to the percent polymer volume change on vapor absorption.

Figure 5F:
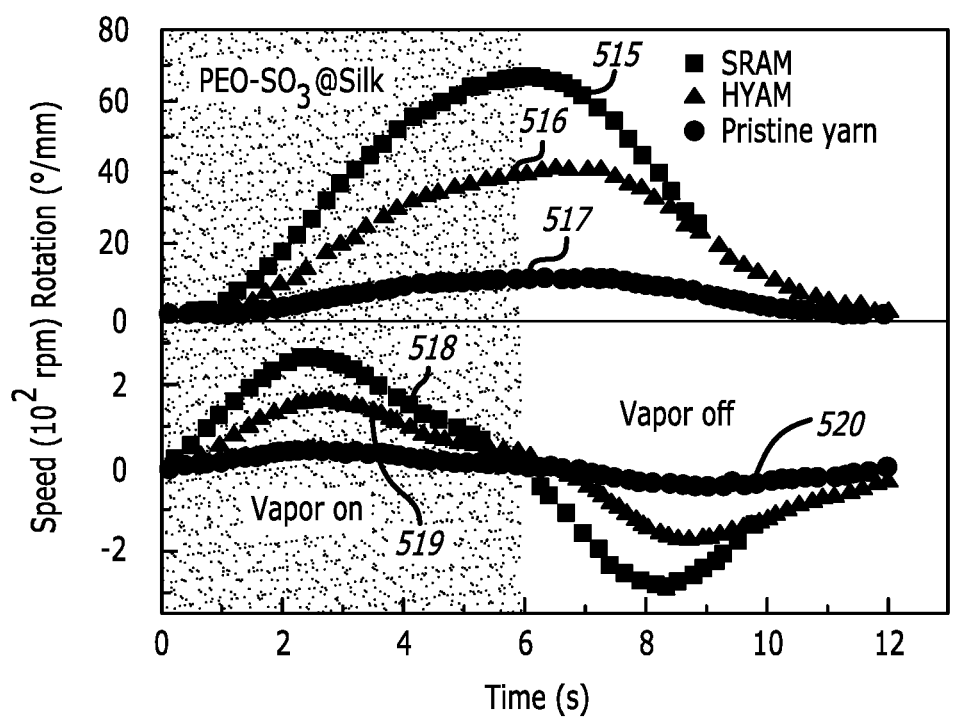
Figure 6A:
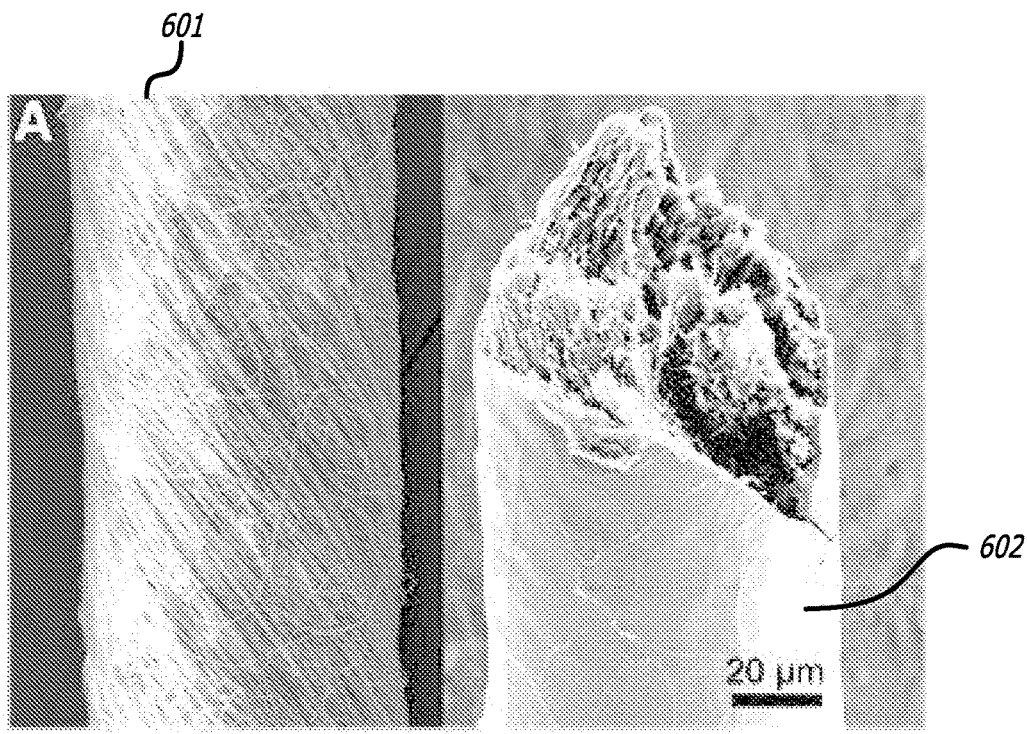
FIG. 6A are SEM micrographs of a 76-μm-diameter pristine yarn made from electrospun PAN nanofibers having an average diameter of 245 nm and the fracture surface of an 87-μm-diameter PEO-SO$_3$@PAN SRAM (sheath/core ratio of 0.073) that was made from the 76-μm-diameter pristine yarn. The yarn was fractured by bending in liquid N$_2$.
Figure 6B:
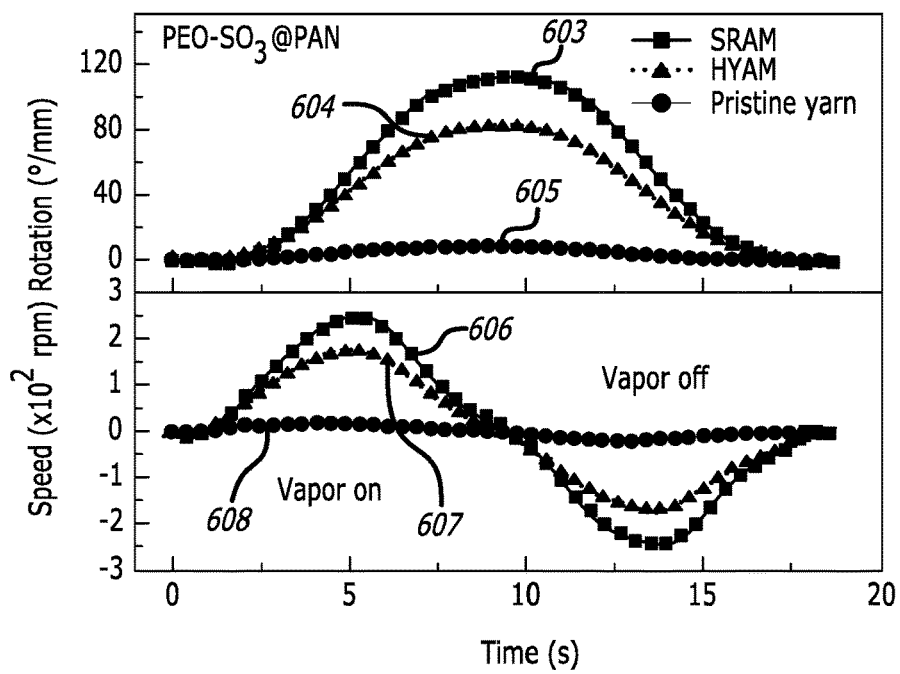
FIG. 6B is a graph showing the time dependence of torsional stroke and rotation speed for one reversible ethanol sorption/desorption cycle for an 87-μm-diameter PEO-SO$_3$@PAN SRAM, a 92-μm-diameter PEO-SO$_3$@PAN HYAM, and a 76-μm-diameter pristine yarn. The same 76-μm-diameter PAN yarn, containing 23 turns/cm of twist, was used for the neat muscle and for the fabrication of the SRAM and HYAM. Also, the SRAM and HYAM had about the same weight (4.8 mg/cm). The PEO-SO$_3$@PAN SRAM of (FIG. 6B) has a sheath/core ratio of 0.073.

High performance results for ethanol-powered torsional SRAMs in which the expensive CNT yarn core of the above $PEO-SO_3$@CNT SRAM is replaced by a core of silk yarn (FIG. 5F) or electrospun PAN nanofiber yarn (FIG. 6B). FIG. 5F shows torsional stroke and rotation speed vs. time for a sorption/desorption cycle of a $PEO-SO_3$@silk SRAM (plots 515 and 518, respectively), $PEO-SO_3$@silk HYAM (plots 516 and 519, respectively), and a silk yarn (plots 517 and 520, respectively). A 56-µm-diameter silk yarn (with 5.7 turns/cm of twist) was used for fabricating the 90-µm-diameter SRAM and HYAM, which weighed 0.48 mg/cm and contained a 0.27 weight ratio of $PEO-SO_3$ to silk. FIG. 6B shows the time dependence of torsional stroke and rotation speed for one reversible ethanol sorption/desorption cycle for an 87-µm-diameter $PEO-SO_3$@PAN SRAM (plots 603 and 606, respectively), a 92-µm-diameter PEO- SO$_3$@PAN HYAM (plots 604 and 607, respectively), and a 76-µm-diameter pristine yarn (plots 605 and 608, respectively). The same 76-µm-diameter PAN yarn, containing 23 turns/cm of twist, was used for the neat muscle and for the fabrication of the SRAM and HYAM. Also, the SRAM and HYAM had about the same weight (4.8 mg/cm). The PEO-SO$_3$@PAN SRAM of FIG. 6B has a sheath/core ratio of 0.073. FIG. 6A are SEM micrographs of a 76-µm-diameter pristine yarn 601 made from electrospun PAN nanofibers having an average diameter of 245 nm and the fracture surface of an 87-µm-diameter PEO-SO$_3$@PAN SRAM 602 (sheath/core ratio of 0.073) that was made from the yarn 601. Yarn 601 was fractured by bending in liquid N$_2$.

Figure 7:
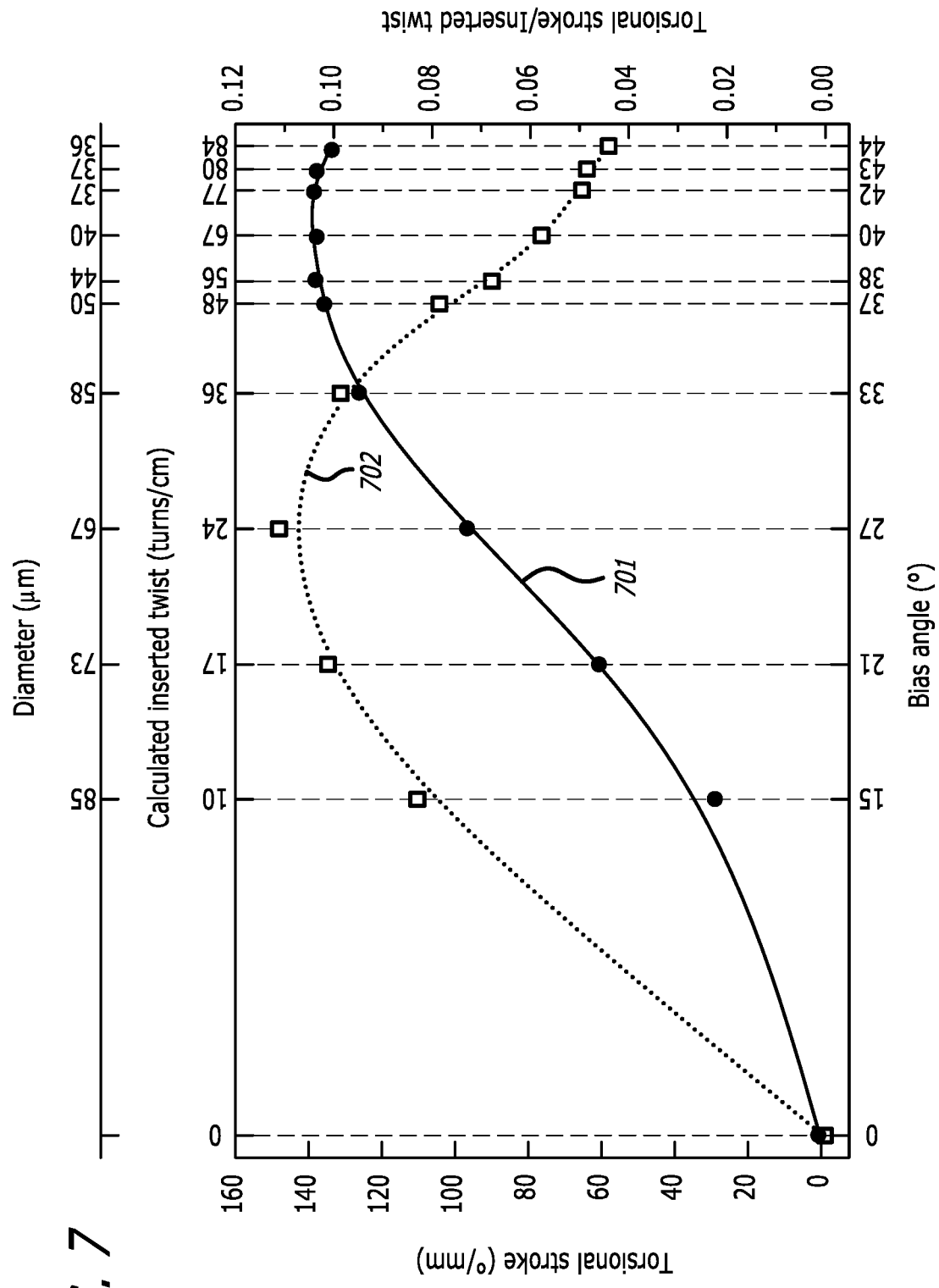
FIG. 7 is a graph showing the dependence of torsional stroke on the measured bias angle (α) of a CNT core yarn on a linear scale (before sheath deposition) for a twisted PEO-SO$_3$@CNT SRAM. These torsional strokes are equilibrium values for a SRAM exposed to a saturated atmosphere of ethanol in dry air. The lower-top axis is the inserted twist per yarn length (T), which is calculated using the bias angle of the core yarn (α) and the yarn diameter (D, which is provided by the upper-top axis) using $T=\tan(\alpha)/\pi D$. Yarn coiling does not initiate until the bias angle exceeds 43.4°, at which point the diameter of the CNT yarn is 36.5 μm. After overcoating with PEO-SO$_3$, this diameter yarn provides a SRAM having a sheath/core ratio of 0.14.

Since the PAN and silk core yarns broke when twisted to higher bias angles, the bias angles of these SRAMs (30° and 18°, respectively) are lower than for the CNT yarn core SRAM) (42°. The lower bias angles and larger diameters of the PAN and silk core yarns results in smaller equilibrium torsional strokes (123°/mm and 70°/mm, respectively) than for the PEO-SO$_3$@CNT SRAM (143°/mm). However, using the invariance of the product of torsional stroke and yarn diameter when the yarn's bias angle is constant [Lima 2012] and results in FIG. 7 for the bias-angle-dependence of torsional stroke for a PEO-SO$_3$@CNT SRAM, the torsional strokes of a PEO-SO$_3$@PAN SRAM and a PEO-SO$_3$@silk SRAM are predicted to be close to those for a PEO-SO$_3$@CNT SRAM having the same core bias angle and diameter. (In FIG. 7, plots 701-702 show the torsional stroke (°/mm) and torsional stroke/inserted twist, respectively).

Figure 8:
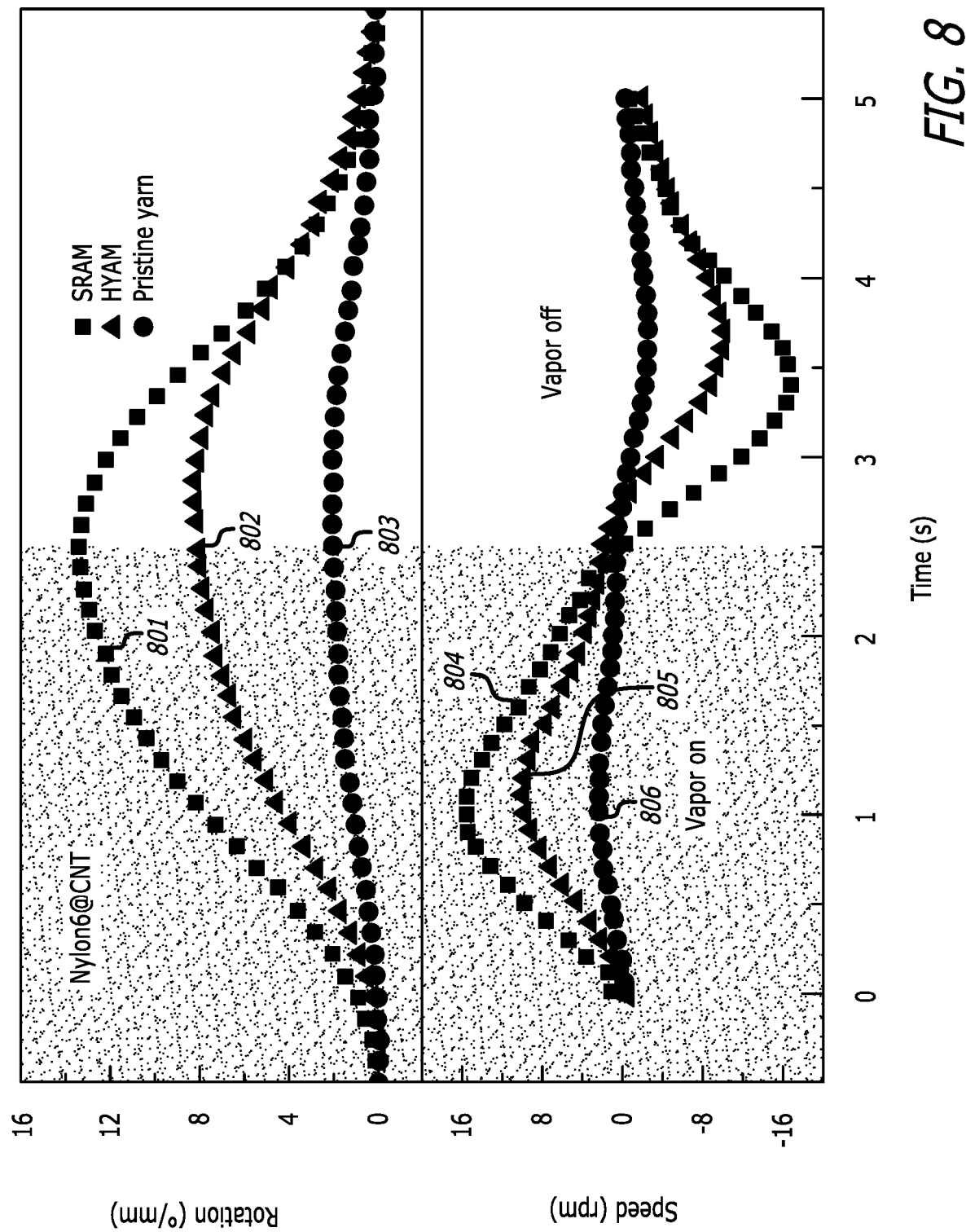
FIG. 8 is a graph showing the time-dependence of torsional stroke and torsional rotation speed for water-vapor-driven actuation of a 44-μm-diameter nylon6@CNT SRAM, a 47-μm-diameter nylon6@CNT HYAM, and a 39-μm-diameter pristine CNT yarn, which was obtained by switching between 45% RH air and 90% RH air. All yarns contain the same weight of CNTs, and both nylon6@CNT muscles have similar linear densities (0.29 mg/cm). The applied tensile stress for these experiments was 0.35 MPa. The twist densities of the SRAM, the HYAM, and the pristine yarn are 72 turns/cm.

The measurements show that a SRAM has important performance advantages over the corresponding HYAM as a torsional actuator. The ratios of peak torsional speed of the SRAM to that of the corresponding HYAM are nearly the same for PEO-SO$_3$@CNT (1.75), PEO-SO$_3$@silk (1.74), and PEO-SO$_3$@PAN (1.79) muscles that are powered by ethanol vapor, and close to that for water-vapor-powered nylon6@CNT muscles (1.86) (FIG. 5B, FIG. 5F, FIG. 6B and FIG. 8, respectively). However, there is greater variation in the ratio of peak stroke for the SRAM to that of the HYAM (1.86, 1.67, 1.36, 1.63, respectively, for the above). FIG. 8 shows the time-dependence of torsional stroke and torsional rotation speed for water-vapor-driven actuation of a 44-µm-diameter nylon6@CNT SRAM (plots 801 and 804, respectively), a 47-µm-diameter nylon6@CNT HYAM (plots 802 and 805, respectively), and a 39-µm-diameter pristine CNT yarn (plots 803 and 806, respectively).

Tensile Actuation of Coiled Muscles Powered Thermally or by Sorption

By adding sufficient additional twist to twisted yarn muscles used for torsional actuation, fully-coiled homochiral yarn muscles were obtained that provide large-stroke tensile actuation. By comparing the performance of coiled yarn muscles made from twisted yarns having nearly the same host and guest weight per yarn length, we will demonstrate the increases in stroke, stroke rate, and contractile mechanical energy that result from transitioning from the HYAM structure to the SRAM structure.

Figure 9A:
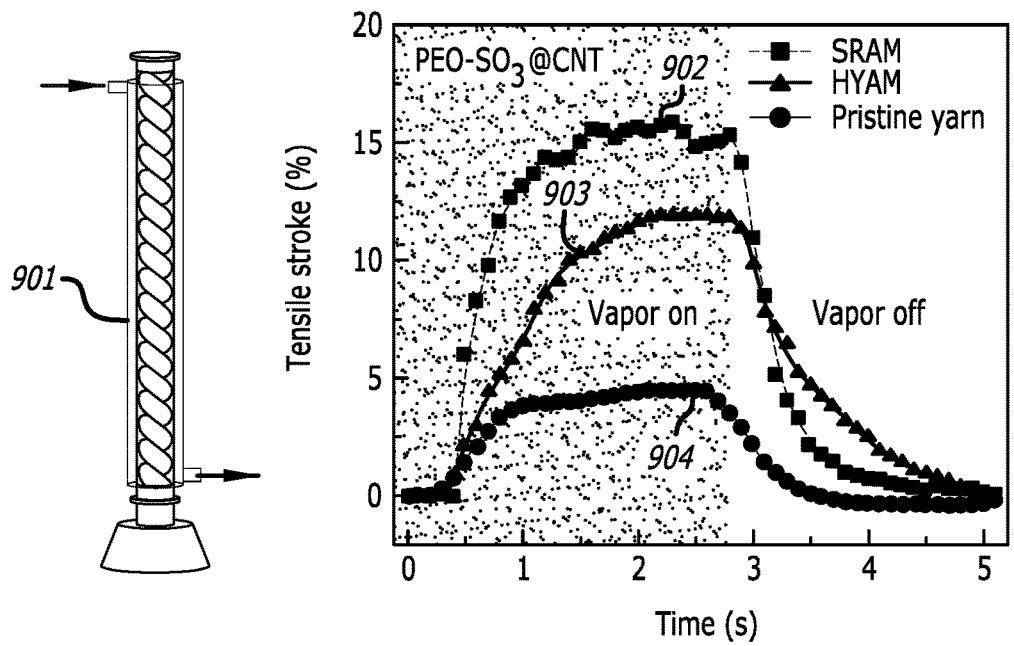
FIGS. 9A-9D show isobaric tensile actuation of self-coiled, sorption-powered and electrothermally-powered SRAMs, HYAMs, and pristine CNT yarns.
Figure 10:
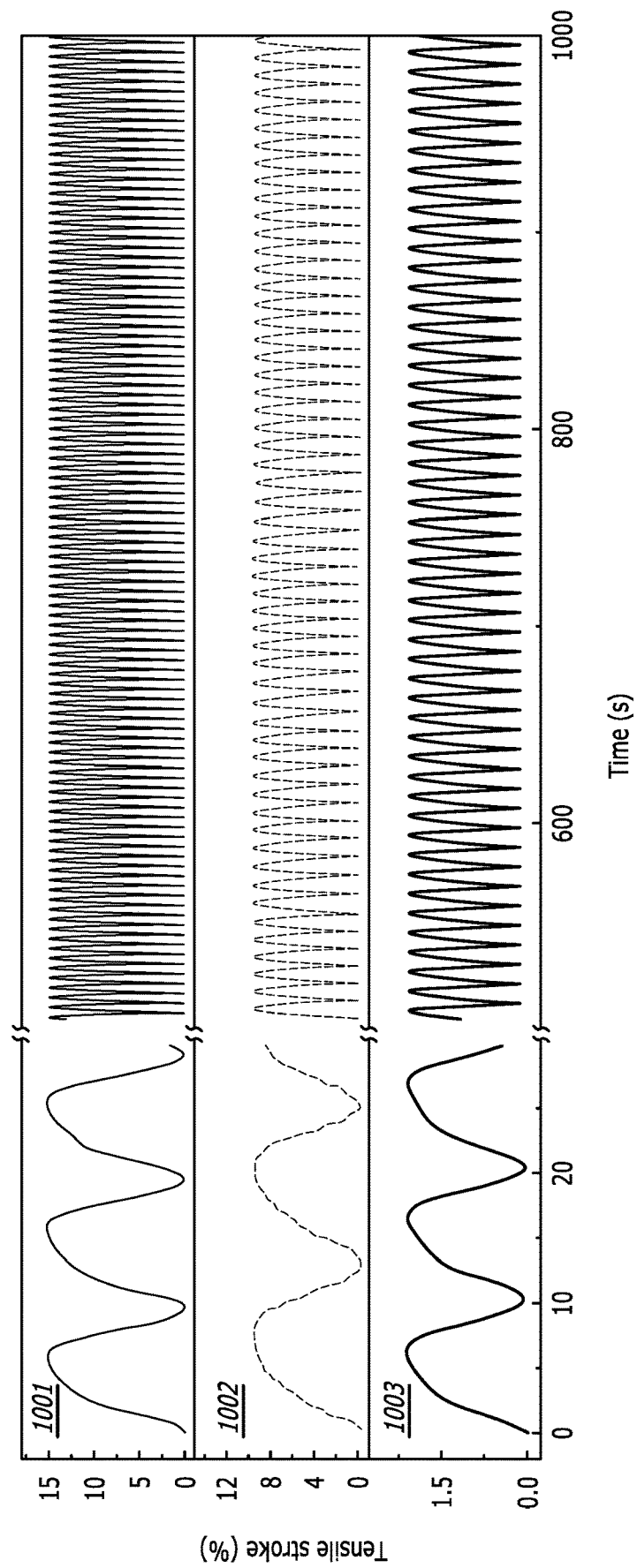
FIG. 10 is a graph showing tensile stroke versus time for a coiled PEO-SO$_3$@CNT SRAM, a coiled PEO-SO$_3$@CNT HYAM, and a coiled pristine yarn. Actuation cycles were obtained by exposing the muscles to dry air containing 0.17 mg/L of ethanol and then desorbing the ethanol using dynamic pumping. Before coiling, the diameters of the SRAM, the HYAM, and the pristine yarn were 43, 47, and 38 μm, respectively. The applied stress during coiling and during actuation were 8 MPa and 33 MPa, respectively. All muscles contained the same weight of CNTs per untwisted length, and both PEO-SO$_3$@CNT muscles have similar linear densities (0.33 mg/cm before coiling). The spring indexes of the SRAM, the HYAM, and the pristine yarn were 0.51, 0.56, and 0.32, respectively.

Measurements of sorption-powered tensile actuation used the same vapor delivery system as for the torsional actuation measurements; however, the torsional rotor was replaced by a heavy weight that was prohibited from rotating for the tensile actuation results. See FIG. 9A, which shows tensile stroke vs. time for a PEO-SO$_3$@CNT SRAM and HYAM and a pristine yarn (plots 902-904, respectively) when actuated by ethanol absorption using the configuration 901 and 33 MPa stress. (Sorption was from a near-equilibrium ethanol concentration in dry air and desorption was by dynamic pumping. Before coiling, the diameters of the PEO-SO$_3$@CNT SRAM and HYAM and the pristine yarn were 43, 47, and 38 µm, respectively.) Allowing the weight to rotate decreases tensile contraction for a twisted PEO-SO$_3$@CNT SRAM, since yarn untwist increases muscle length. The graph of FIG. 9A shows that an ethanol-vapor-driven, coiled PEO-SO$_3$@CNT SRAM delivers a maximum tensile stroke of 15.7%, as compared with the 11.5% stroke of an ethanol-vapor-driven coiled PEO-SO$_3$@CNT HYAM for the same 33 MPa tensile load. Retention of stroke over 100 cycles is shown in FIG. 10 (showing tensile stroke versus time for a coiled PEO-SO$_3$@CNT SRAM (plot 1001), a coiled PEO-SO$_3$@CNT HYAM (plot 1002), and a coiled pristine yarn (plot 1003)). FIG. 9A shows that the equilibrium isometric contractile stress generated by a PEO-SO$_3$@CNT SRAM monotonically increases with increasing ethanol concentration in dry air.

Figure 11A:
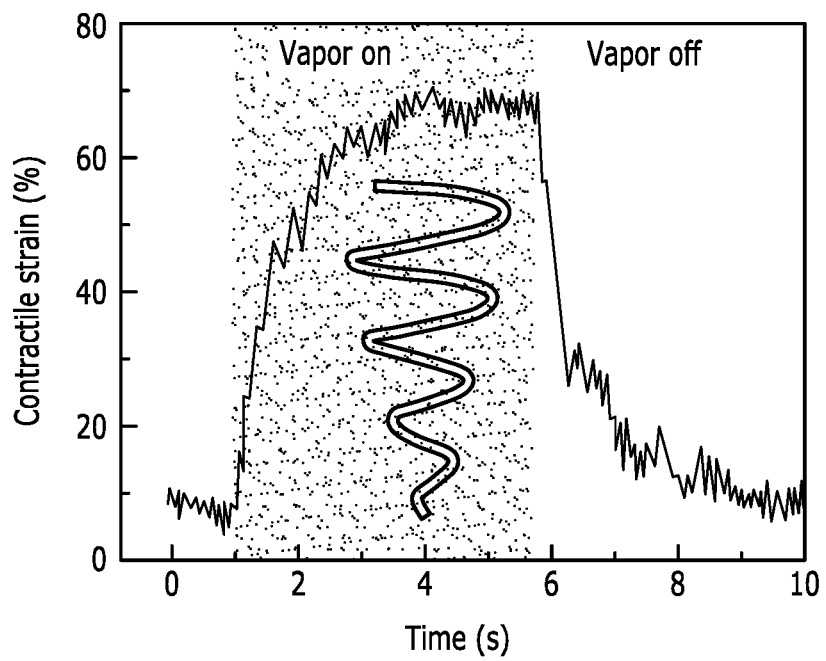
FIGS. 11A-11C are graphs show contractile strain versus time for water-vapor-driven actuation of cylindrical-shaped and cone-shaped PEO-SO$_3$@CNT SRAMs that have coiled and supercoiled structures. While self-coiled structures provide the highest work capacity, because of their low spring indices and correspondingly high tensile moduli, the contraction during tensile actuation can be amplified by using mandrel-coiled muscles having very high spring indices. This amplification is evident in the plots of FIGS. 11A-11C.
Figure 11B:
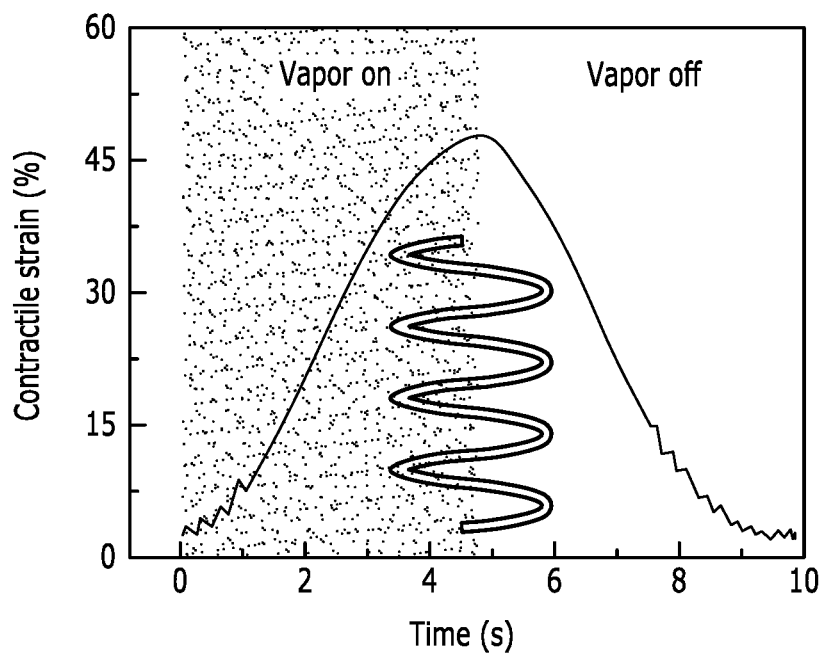
Figure 11C:
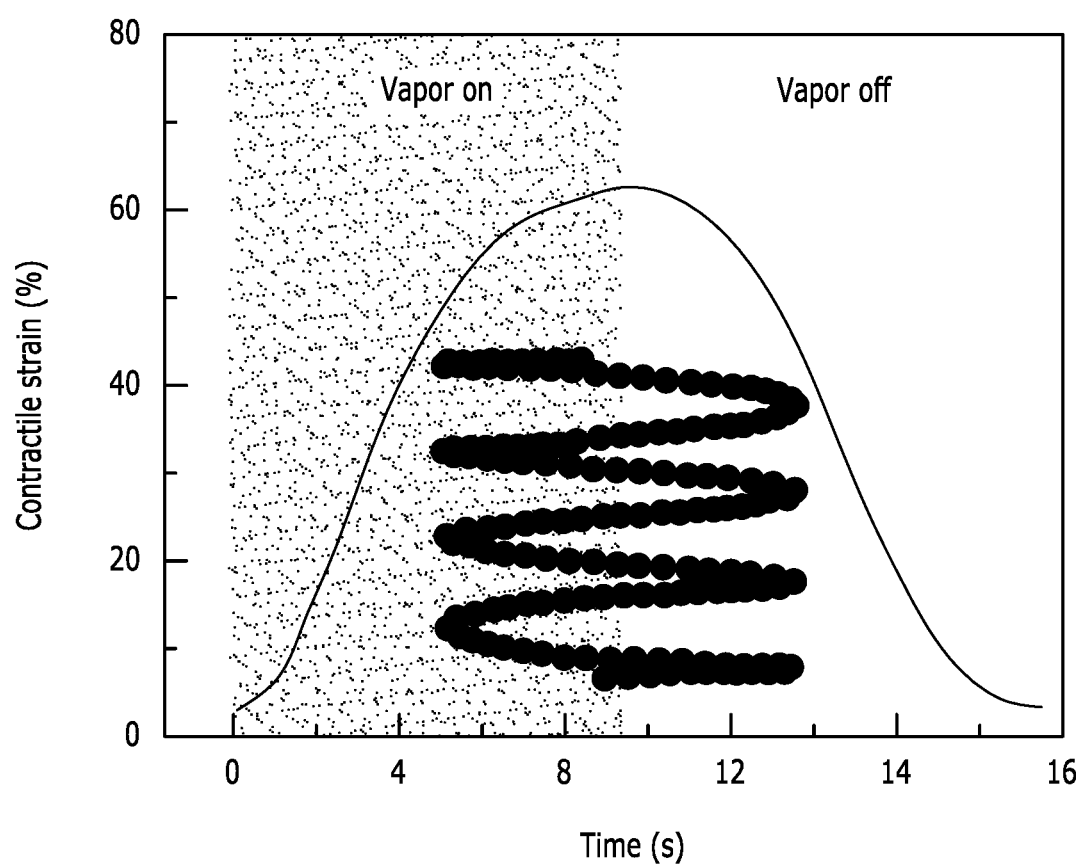

While self-coiled structures provide the highest work capacity, because of their low spring indices and correspondingly high tensile moduli, the contraction during tensile actuation can be amplified by using mandrel-coiled muscles having very high spring indices. A maximum tensile stroke of 70% was obtained for a humidity-driven cone-mandrel SRAM (FIG. 11A), and this SRAM enabled faster actuation than cylindrical-mandrel SRAMs that were coiled and supercoiled (FIGS. 11B-11C, respectively).

The SRAMs provide advantages in contractile work capacity and maximum average contractile power (FIG. 9B, FIG. 12, FIGS. 13A-13F, and FIGS. 14A-14D, and TABLE 1), which is defined as the maximum ratio of contractile work to actuation time.

Figure 9B:
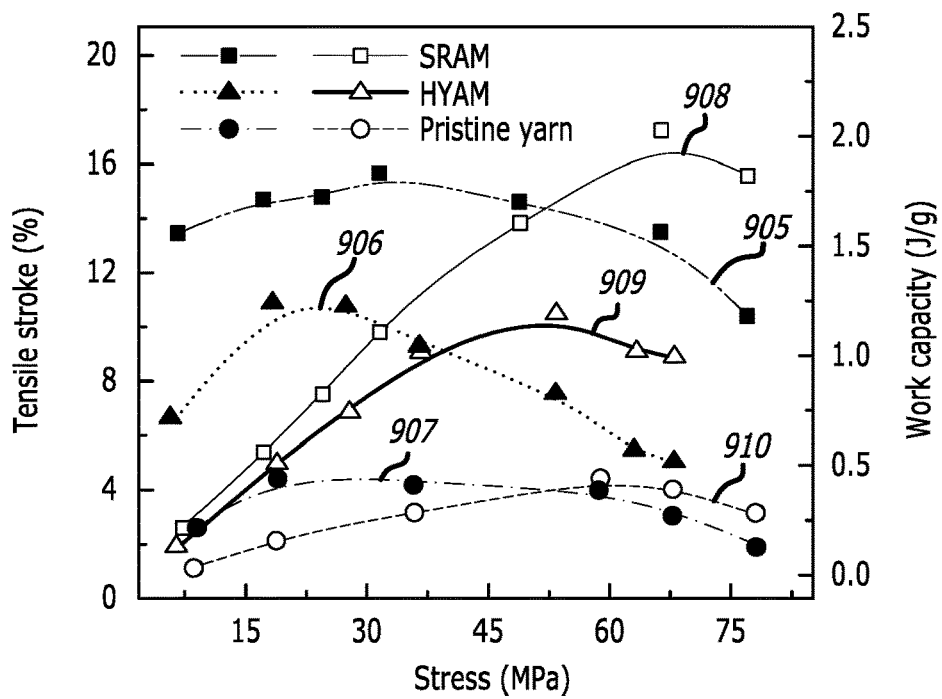

FIG. 9B shows tensile stroke and contractile work capacity vs. applied stress for the sorption-actuated muscles of FIG. 9A (PEO-SO$_3$@CNT SRAM (plots 905 and 908, respectively), PEO-SO$_3$@CNT HYAM (plots 906 and 909, respectively), and pristine yarn (plots 907 and 910, respectively).

Figure 12:
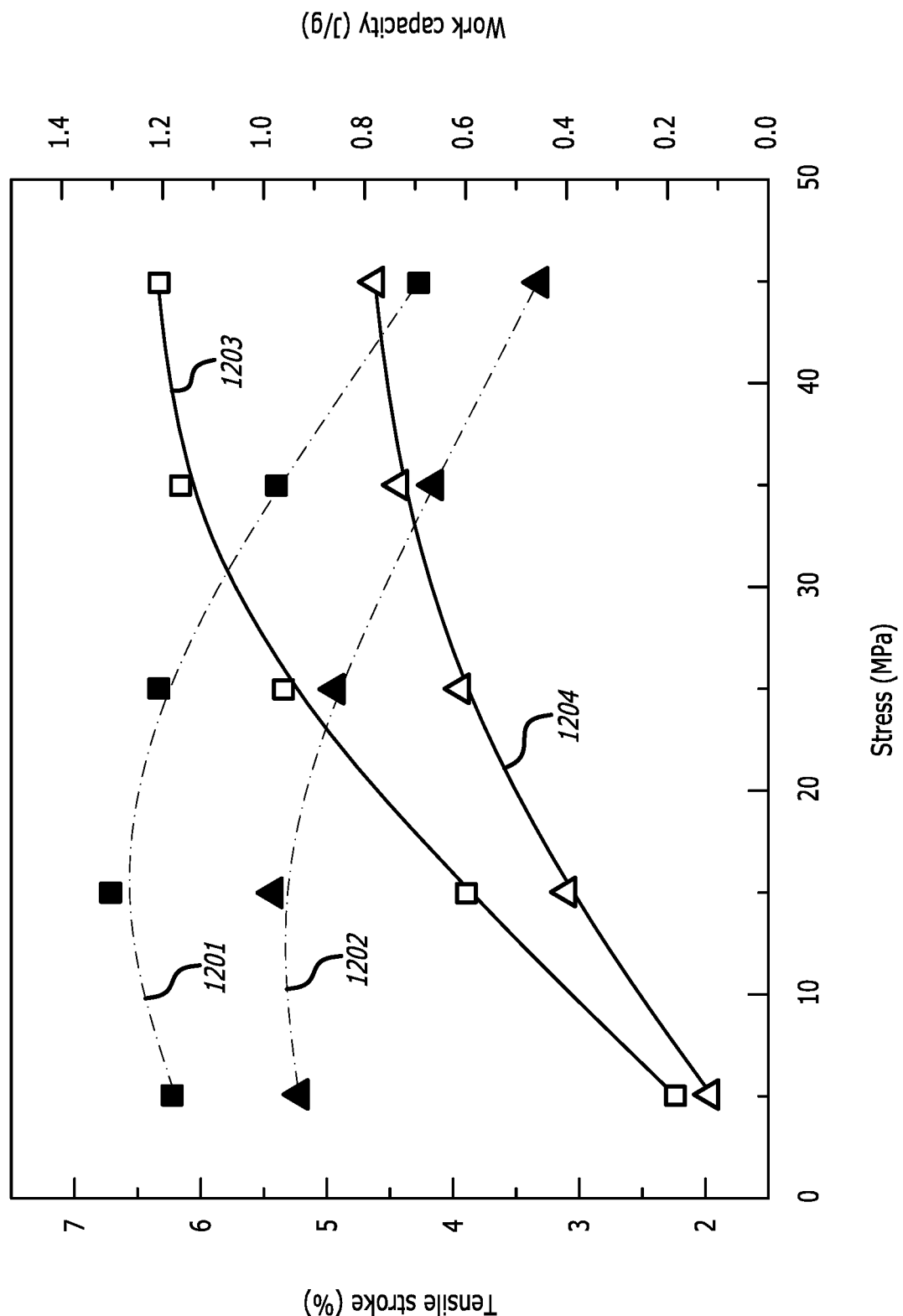
FIG. 12 is a graph showing the comparison of the dependence of equilibrium tensile stroke and contractile work capacity on applied isobaric stress for a coiled PEO-SO$_3$@CNT SRAM and a coiled PEO-SO$_3$@CNT HYAM for a temperature increase from 25° C. to 200° C. at 5° C./minute in a thermal mechanical analyzer (TMA). Before coiling, the diameters of the SRAM and the HYAM yarn were 44 and 47 μm, respectively, and the spring indices after coiling were 0.51 and 0.56 for the SRAM and HYAM, respectively. The sheath/core ratio of the SRAM was 0.14.

FIG. 12 shows the comparison of the dependence of equilibrium tensile stroke and contractile work capacity on applied isobaric stress for a coiled PEO-SO$_3$@CNT SRAM (plots 1201 and 1203, respectively) and a coiled PEO-SO$_3$@CNT HYAM (plots 1202 and 1204, respectively) for a temperature increase from 25° C. to 200° C. at 5° C./minute in a thermal mechanical analyzer (TMA).

Figure 13A:
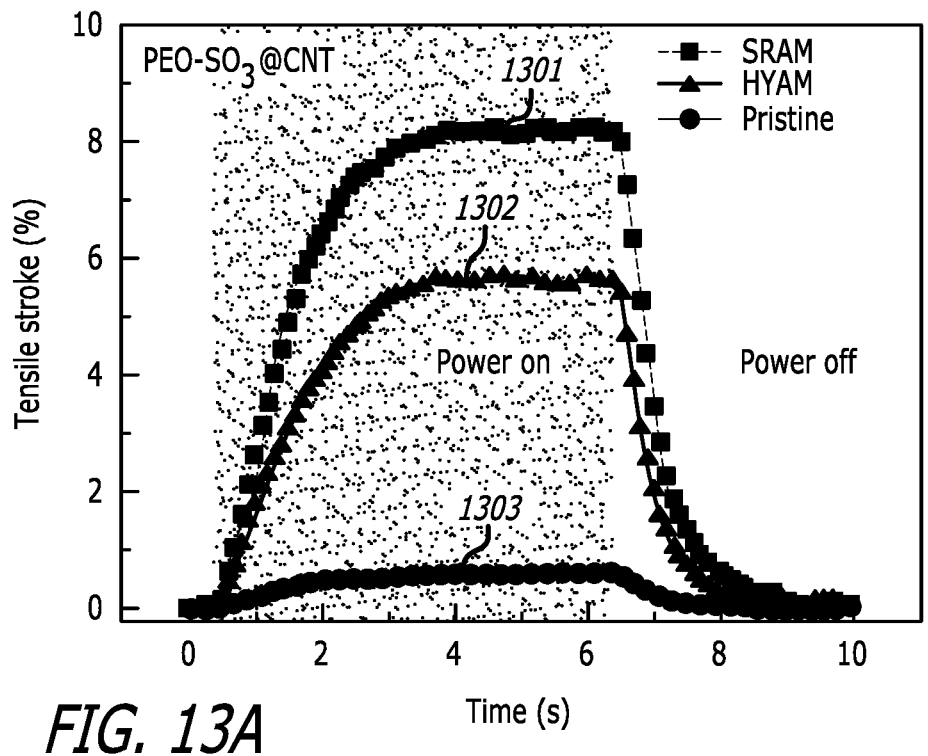
FIGS. 13A-13F are graphs showing the comparison of electrothermally-powered tensile actuation for a coiled SRAM, a coiled HYAM, and a coiled pristine yarn.
Figure 13B:
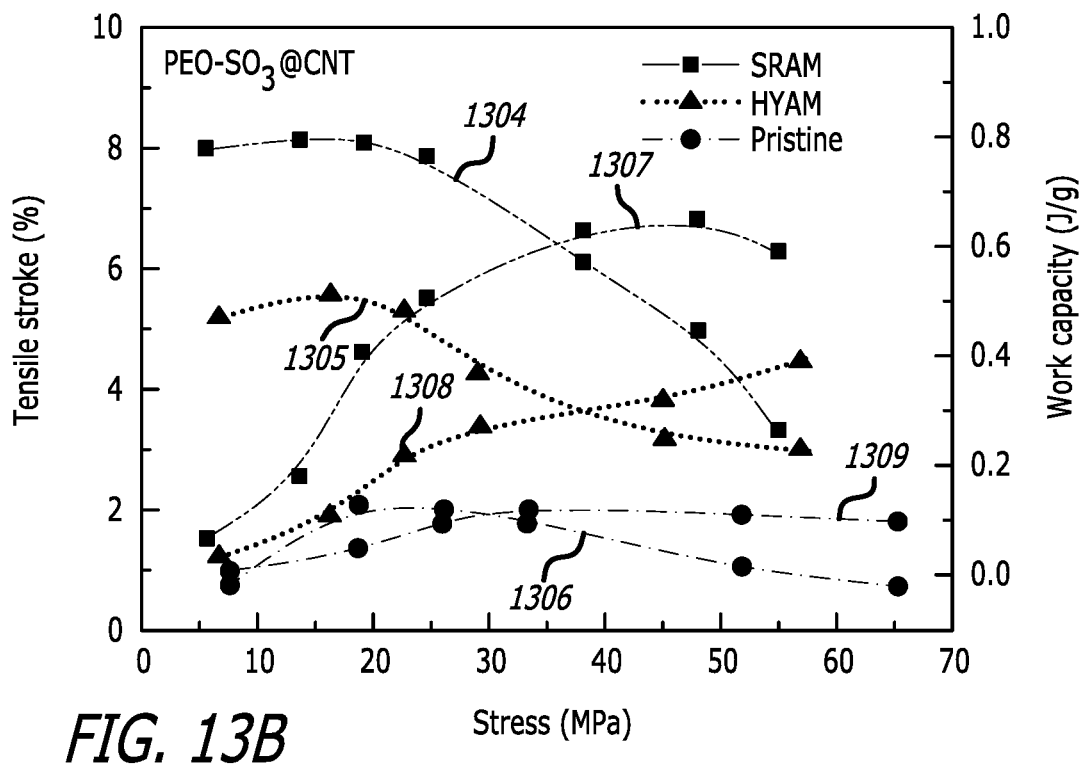
Figure 13C:
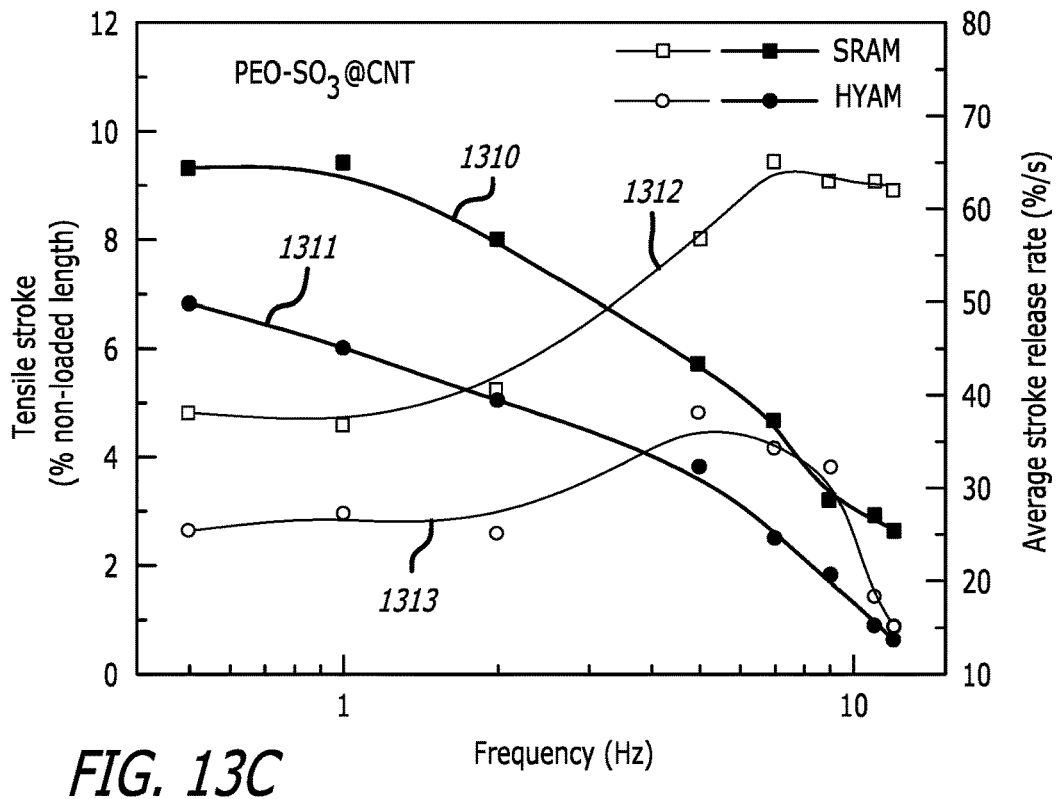
Figure 13D:
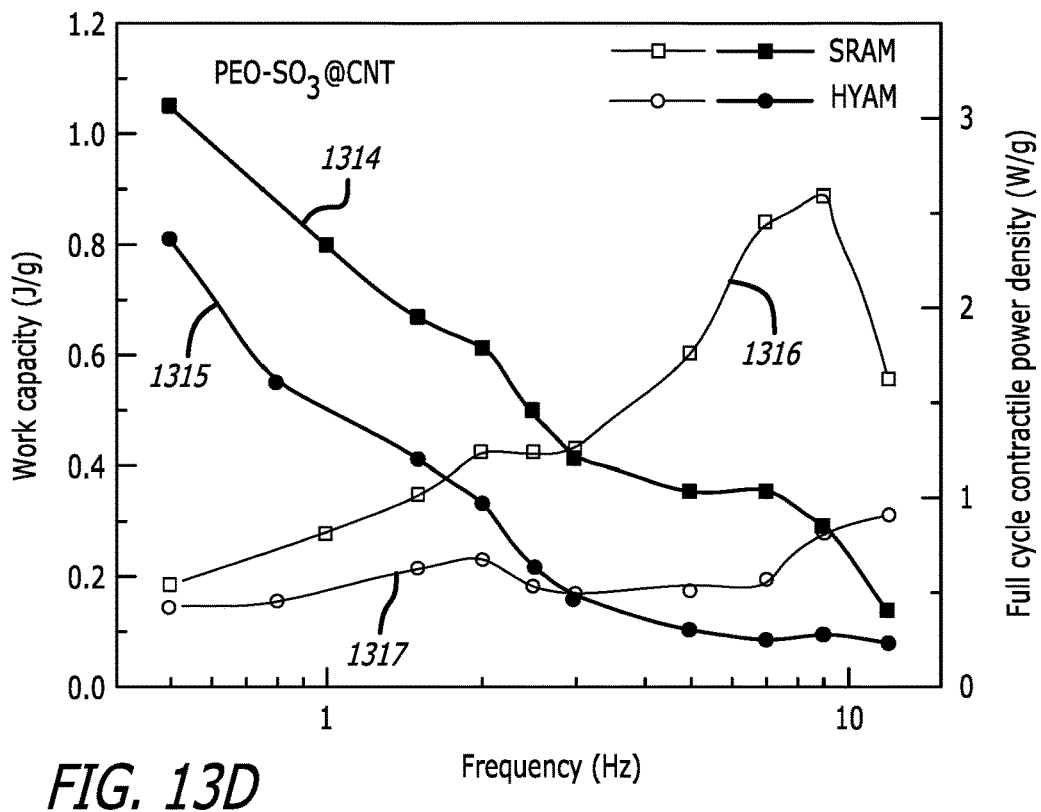
Figure 13E:
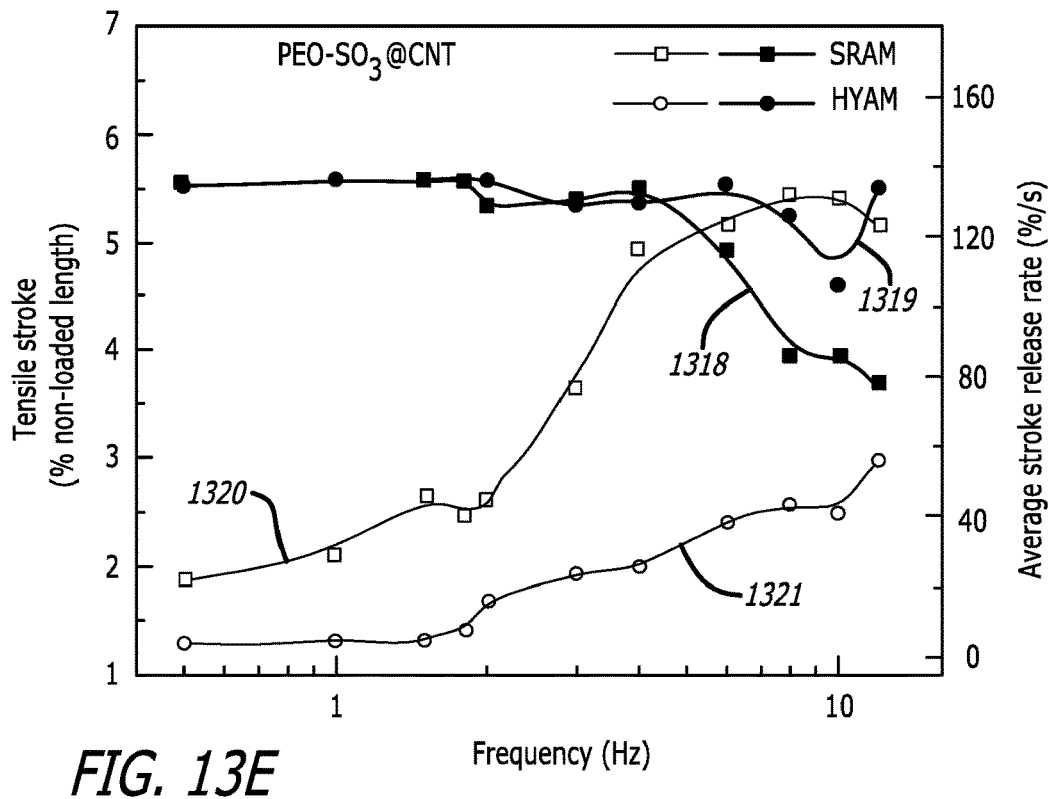
Figure 13F:
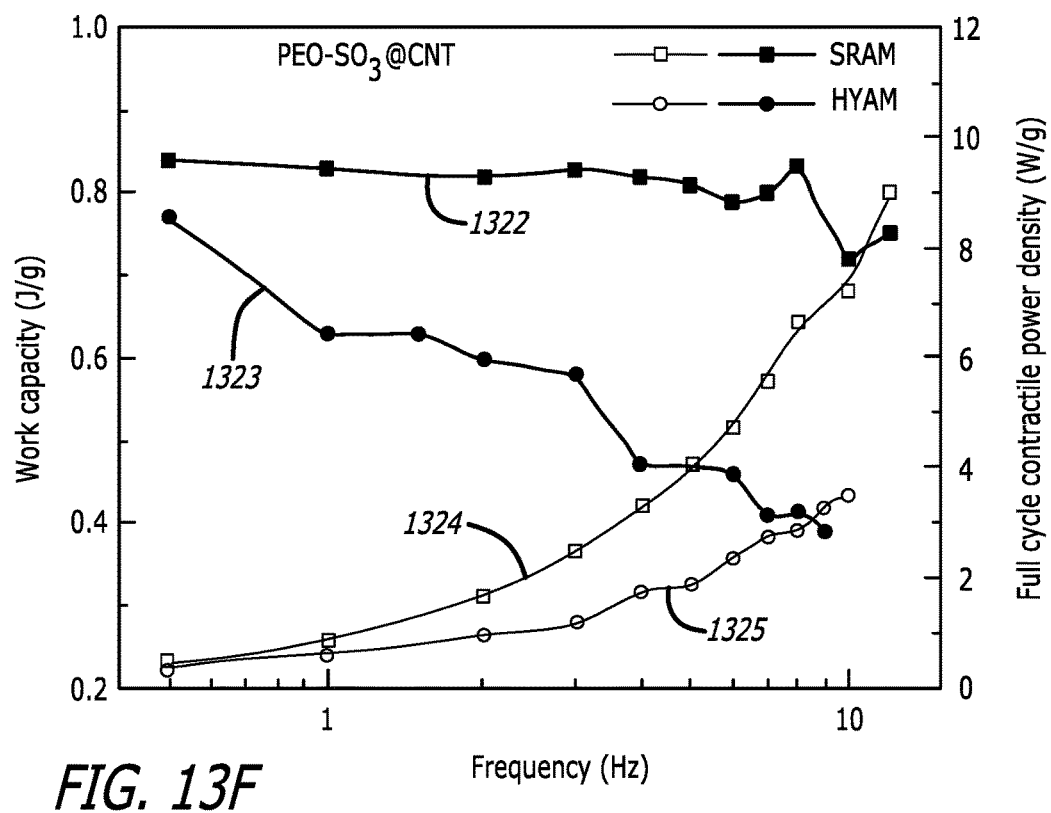

FIG. 13A shows tensile stroke versus time for a PEO-SO$_3$@CNT SRAM (plot 1301), a PEO-SO$_3$@CNT HYAM (plot 1302), and a pristine CNT yarn (plot 1303) when electrothermally actuated using the isobaric load that maximized muscle stroke (18, 15, and 19 MPa, respectively). FIG. 13B shows equilibrium tensile stroke and contractile work capacity versus applied isobaric stress for the PEO-SO$_3$@CNT SRAM (plots 1304 and 1307, respectively), the PEO-SO$_3$@CNT HYAM (plots 1305 and 1308, respectively), and the pristine CNT yarn (plots 1306 and 1309, respectively). FIG. 13C shows the frequency dependence of (FIG. 13C) the tensile stroke and average tensile stroke release rate for the PEO-SO$_3$@CNT SRAM (plots 1310 and 1312, respectively) and the PEO-SO$_3$@CNT HYAM (plots 1311 and 1313, respectively) when driven in air by square-wave voltages between 0 and 12 V. FIG. 13D shows the frequency dependence of the per-cycle contractile work capacity and the full-cycle contractile power density for the PEO-SO$_3$@CNT SRAM (plots 1314 and 1316, respectively) and the PEO-SO$_3$@CNT HYAM (plots 1315 and 1317, respectively) when driven in air by square-wave voltages between 0 and 12 V. FIG. 13E show the frequency dependence of the tensile stroke and average tensile stroke release rate for the PEO-SO$_3$@CNT SRAM (plots 1318 and 1320, respectively) and the PEO-SO$_3$@CNT HYAM (plots 1319 and 1321, respectively) when driven in a room-temperature water bath by square-wave voltages between 0 and 23 V. FIG. 13F show the frequency dependence of the per-cycle contractile work capacity and the full-cycle contractile power density for the PEO-SO$_3$@CNT SRAM (plots 1322 and 1324, respectively) and the PEO-SO$_3$@CNT HYAM

15D and a tensile load of 48 MPa. FIG. 14D shows work capacity and maximum average contractile power (plots 1407-1408, respectively) for the electro-thermally-driven PEO-SO$_3$@CNT SRAM of FIG. 13A and a tensile load of 48 MPa.

TABLE 1 shows contractile work densities (J/g) and maximum average-power densities (W/g) of a SRAM divided by that of a HYAM as a function of the applied stress. Bold and underlined numbers for these performance figures indicate that they are maximized at the listed applied stress.

TABLE I

| Type of coiled muscle (muscle drive method) | PEO-SO$_3$@CNT (ethanol-vapor-driven) (FIG. 9B) | PEO-SO$_3$@CNT (electrothermally-driven) (FIG. 13B) | PU@CNT (electrothermally-driven) (FIG. 9D) | CNT@nylon vs. CNT (electrochemically-driven) Potential switched between 0 to −3 V at 1 Hz (FIG. 15D and FIG. 16) |
|---|---|---|---|---|
| Contractile work density (J/g) of a SRAM divided by that of a HYAM as a function of the applied stress | | 0.18/0.09 = 2.00 @ 13.6 MPa | 0.30/0.22 = 1.36 @ 17.0 MPa | 0.41/0.068 = 6.03 @ 12 MPa, 15 MPa (load for SRAM and HYAM, respectively) |
| | 0.56/0.47 = 1.19 @ 17.5 MPa | 0.41/0.18 = 2.28 @ 19.0 MPa | 0.53/0.28 = 1.89 @ 24.0 MPa | 0.81/0.11 = 7.36 @ 27 MPa, 29 MPa |
| | 0.81/0.66 = 1.23 @ 24.5 MPa | 0.51/0.24 = 2.13 @ 24.0 MPa | 0.79/0.38 = 2.08 @ 33.0 MPa | 0.99/0.10 = 9.9 @ 48 MPa, 42 MPa |
| | 1.12/0.87 = 1.29 @ 33.0 MPa | 0.63/0.30 = 2.10 @ 38.0 MPa | 1.12/0.49 = 2.29 @ 42.0 MPa | |
| | 1.61/1.15 = 1.40 @ 48.0 MPa | 0.64/0.34 = 1.88 @ 48.0 MPa | 1.18/0.51 = 2.31 @ 49.0 MPa | |
| | 2.12/1.01 = 2.10 @ 66.0 MPa | 0.59/0.37 = 1.59 @ 55.0 MPa | 1.33/0.62 = 2.15 @ 57.0 MPa | |
| Maximum average power density (W/g) of a SRAM divided by that of a HYAM as a function of the applied stress | | 0.06/0.03 = 2.00 @ 13.6 MPa | 0.06/0.05 = 1.20 @ 17.0 MPa | 0.75/0.27 = 2.78 @ 12 MPa, 15 MPa |
| | 1.23/0.62 = 1.98 @ 17.5 MPa | 0.14/0.06 = 2.33 @ 19.0 MPa | 0.106/0.065 = 1.63 @ 24.0 MPa | 1.93/0.36 = 5.36 @ 27 MPa, 29 MPa |
| | 1.77/0.87 = 2.03 @ 24.5 MPa | 0.17/0.08 = 2.13 @ 24.0 MPa | 0.16/0.088 = 1.82 @ 35.0 MPa | 3.71/0.65 = 5.71 @ 48 MPa, 42 MPa |
| | 2.45/1.15 = 2.13 @ 33.0 MPa | 0.21/0.10 = 1.91 @ 38.0 MPa | 0.26/0.11 = 2.36 @ 42.0 MPa | |
| | 3.52/1.51 = 2.33 @ 48.0 MPa | 0.22/0.11 = 2.00 @ 48.0 MPa | 0.35/0.18 = 1.94 @ 49.0 MPa | |
| | 4.44/1.30 = 3.42 @ 66.0 MPa | 0.20/0.13 = 1.54 @ 55.0 MPa | 0.37/0.18 = 2.06 @ 57.0 MPa | |

(plots 1323 and 1325, respectively) when driven in a room-temperature water bath by square-wave voltages between 0 and 23 V.

Figure 9C:
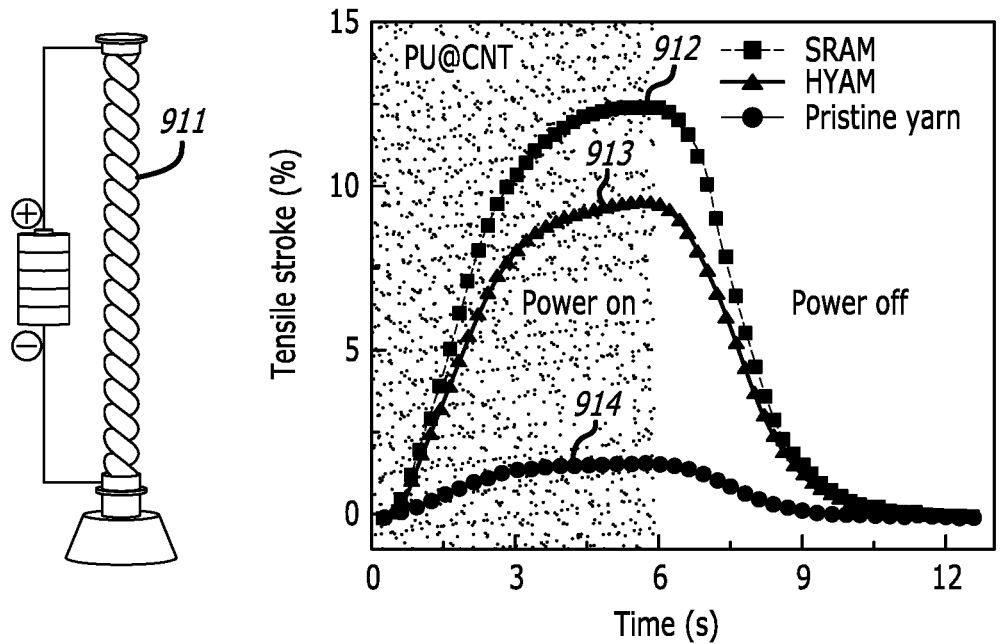
Figure 9D:
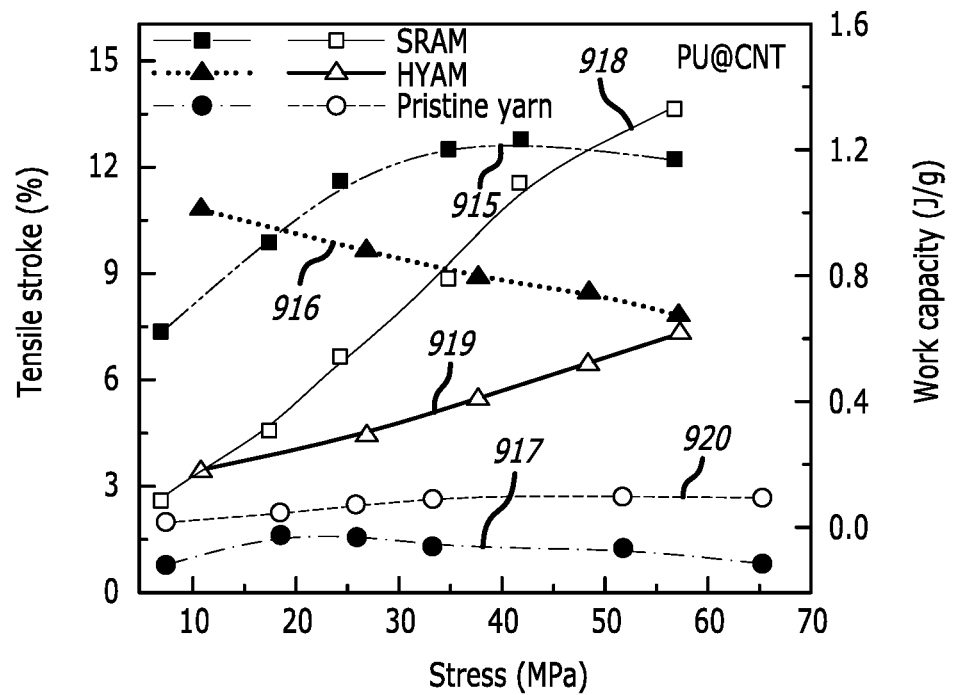
Figure 14A:
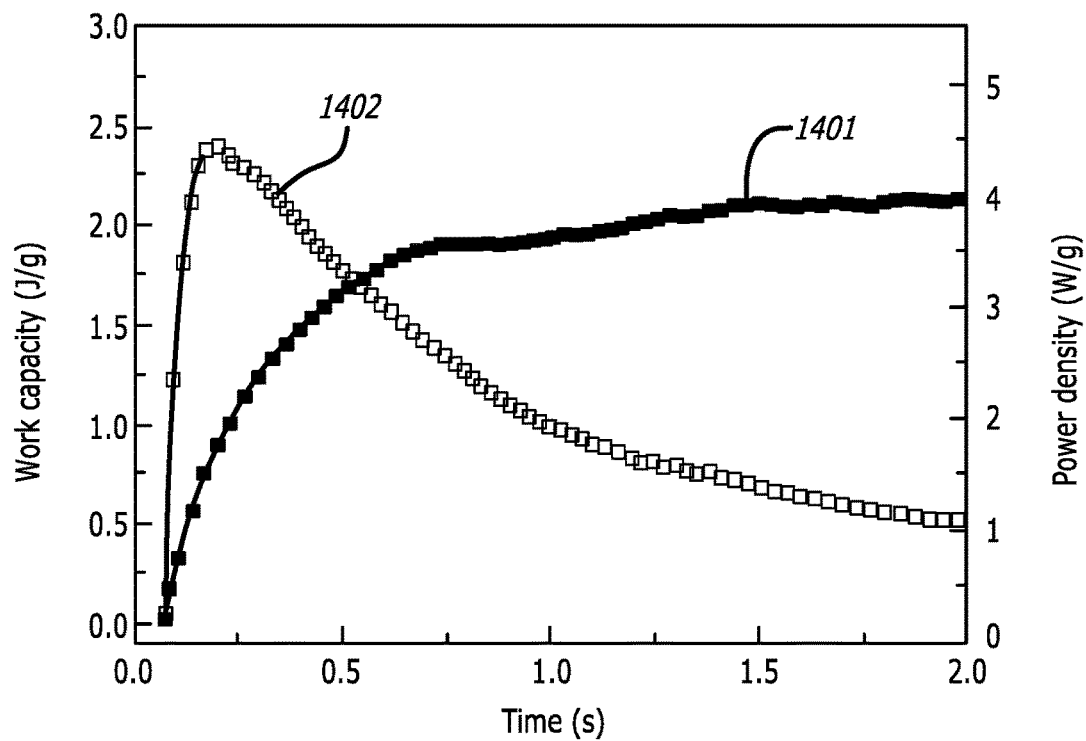
FIGS. 14A-14D are graphs showing work capacity and maximum average contractile power, which is defined as the maximum ratio of contractile work to actuation time. These results are for the tensile load that maximizes contractile work.
Figure 14B:
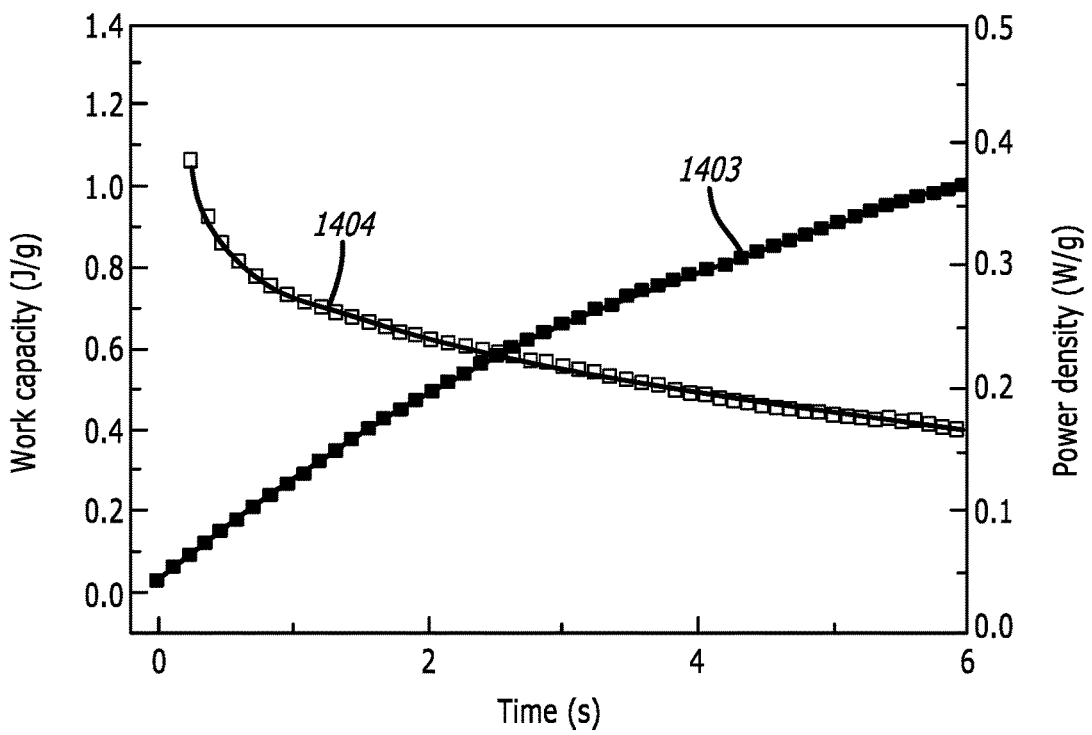

FIG. 14A shows work capacity and maximum average contractile power (plots 1401-1402, respectively) for the ethanol-vapor-driven PEO-SO$_3$@CNT SRAM of FIG. 9A and a tensile load of 48 MPa. FIG. 14B shows work capacity and maximum average contractile power (plots 1403-1404, respectively) for the electro-thermally-driven PU@CNT SRAM of FIG. 9C and a tensile load of 57 MPa. (FIG. 9C shows the time dependence of tensile stroke for a PU@CNT SRAM and HYAM and a pristine CNT yarn (plots 912-914, respectively) when electrothermally actuated using the illustrated configuration 911, 42 MPa stress, and 0.25 W/cm power, which provided temperatures of 85, 93, 97° C., respectively. FIG. 9D shows tensile stroke and contractile work capacity vs. applied stress for the electrothermally actuated yarns (PU@CNT SRAM (plots 915 and 918, respectively), and PU@CNT HYAM (plots 916 and 919, respectively), and pristine CNT yarn (plots 917 and 920, respectively)).

Figure 14C:
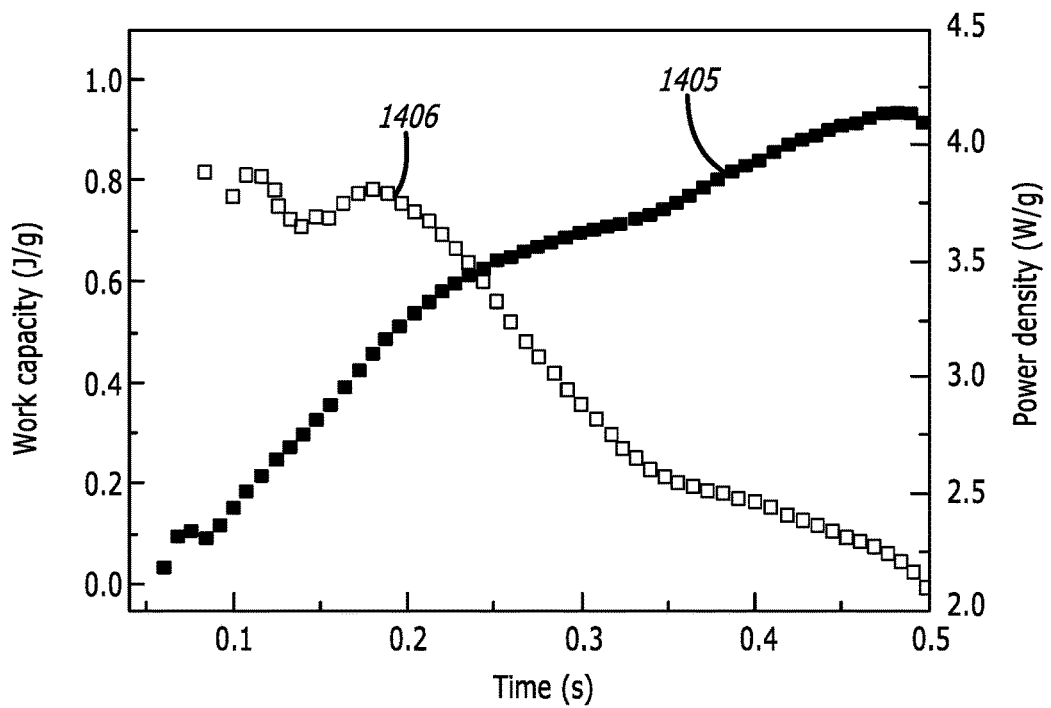
Figure 14D:
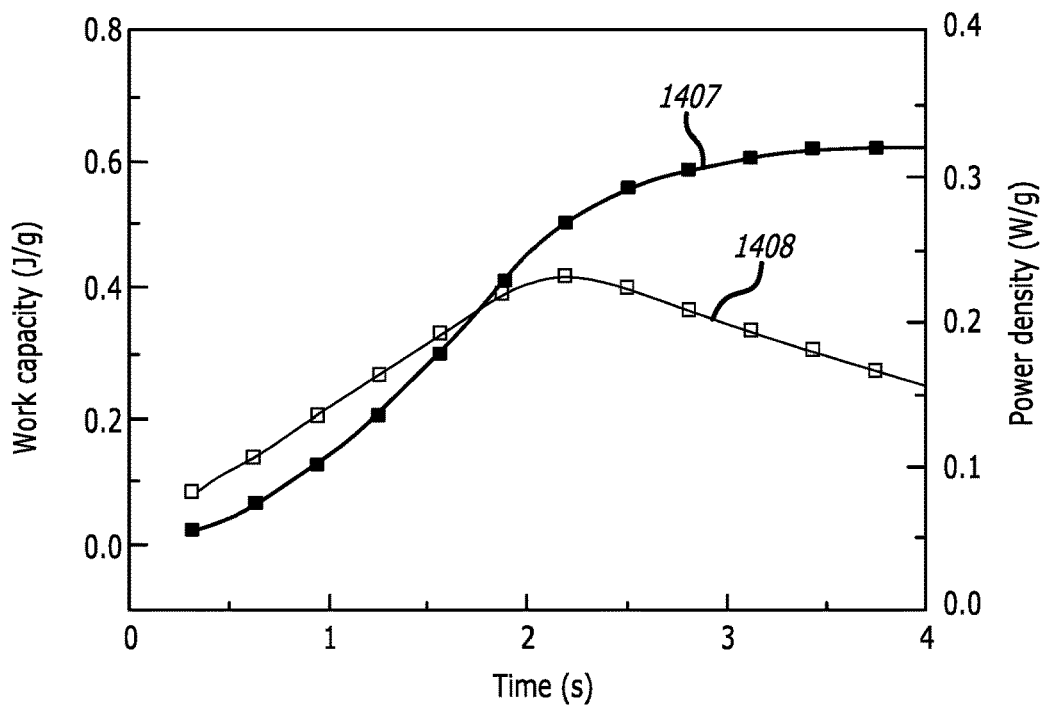

FIG. 14C shows work capacity and maximum average contractile power (plots 1405-1406, respectively) for the electro-chemically-driven CNT@nylon6 SRAM of FIG.

The maximum average contractile power output per cycle was 4.44 W/g for the ethanol-vapor-driven PEO-SO$_3$@CNT SRAM and 1.51 W/g for the corresponding HYAM. The load-optimized contractile work capacity and the maximum average power density of coiled SRAMs are higher than for coiled HYAMs at all applied loads for sorption-driven actuation and electrothermal actuation, which is also the case for SRAM electrochemical muscles (TABLE 1). Specifically, for stress levels maximizing equilibrium contractile work capacities, the ratio of SRAM to HYAM work capacities was 1.84 for ethanol-vapor-driven PEO-SO$_3$@CNT muscles (FIG. 9B), 1.73 for electrothermally-driven PEO-SO$_3$@CNT muscles (FIG. 13B), and 2.15 for electrothermally-driven PU@CNT muscles (FIG. 9D). The used PU polymers are elastomeric polyester-based polyurethanes from BASF Corporation (Elastollan® 1195A10 and TPU-70D, which were used as guests for thermally actuated and sorption-driven muscles, respectively).

These SRAM-to-HYAM work capacity ratios will approximately equal the ratio of energy conversion efficiencies for sorption-powered muscles in which the equilibrium gravimetric sorption of guest in SRAM sheath and in HYAM core are equal, and for thermal muscles in which the differences in heat lost during high-rate contractile work are negligible.

The SRAM-to-HYAM power density ratio (TABLE 1) is higher for ethanol-vapor-driven PEO-SO$_3$@CNT muscles (2.94) than for electrothermally-driven PEO-SO$_3$@CNT muscles (1.69) and PU@CNT muscles (2.06). This is likely because the power density ratio for the vapor-driven muscle is enhanced by both the larger equilibrium work capacity of the SRAM and the more rapid vapor absorption, and the latter diffusion-based enhancement term disappears when actuation is by electrothermally heating the CNT yarn.

Since the rate of cooling is faster for the SRAM than for the HYAM and the rate of cooling has the greatest impact on full cycle performance, the high-frequency work capacity during electrothermal actuation is much higher for a SRAM than a HYAM. The PEO-SO$_3$@CNT SRAMs electrothermally operated in air and in room-temperature water to produce 2.6 W/g (for 3.2% stroke at 9 Hz) and 9.0 W/g (for 5.5% stroke at 12 Hz), respectively, of full-cycle contractile power (FIG. 13C-13F), which is much higher than the typical contractile power of human natural muscle (0.05 W/g). When operated in air, this SRAM muscle provided a stroke of 8.0% at 2 Hz, corresponding to a power density of 1.2 W/g.

Figure 3C:
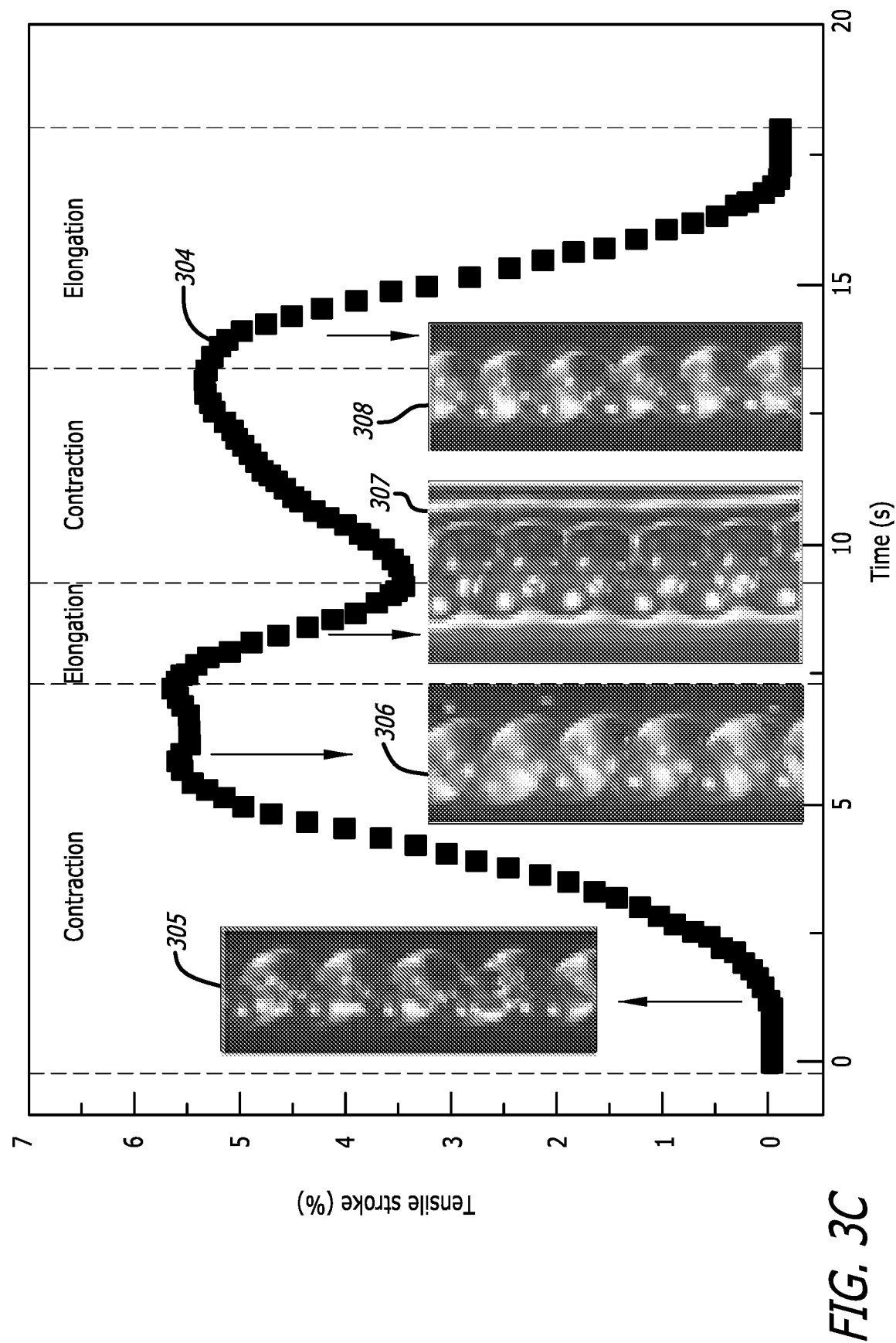
FIG. 3C is a graph showing the effect of using an overly thick sheath on the actuation of a SRAM when the applied mechanical load is low (3.1 MPa). Actuation was produced by dropwise addition of ethanol to a PEO-SO$_3$@PU SRAM that had a sheath-core ratio of 2.27. The insets are optical microscope images during the contraction and elongation processes.

Non-monotonic tensile strokes were observed for coiled SRAMs when the applied load was small, and the sheath thickness and the change in sheath thickness during actuation was large. During actuation, the SRAM first contracted in length until inter-coil contact occurred and then expanded as inter-coil contact drove actuation (FIG. 3C). Such contraction and then elongation during actuation, and the reverse during return to the non-actuated state, can increase the ability of a SRAM to harvest waste thermal and chemical energy as mechanical energy, which is then converted to electrical energy during an actuation cycle. Conversion of mechanical energy to electrical can be accomplished, for example, by connecting a SRAM muscle in series with the previously described twistron electrochemical mechanical-to-electrical energy converter [Kim 2017].

Electrochemical Tensile Actuation of Coiled Muscles

Electrochemically powered artificial muscles have important advantages that are not found for thermally powered muscles: (1) their efficiency is not limited by the Carnot efficiency and (2) they have a natural latching state, meaning that stroke can be maintained without the input of significant electrical energy. A conventional electrochemical CNT yarn muscle is a HYAM, wherein the yarn guest is the electrolyte. Inexpensively-fabricated, electrochemically-actuated polypyrrole-coated yarns and derived stroke-amplifying textiles providing tensile strokes of up to 0.3% and 3%, respectively, have been demonstrated [Maziz 2017]. However, at least one hundred seconds was required for these contractions.

Figure 15A:
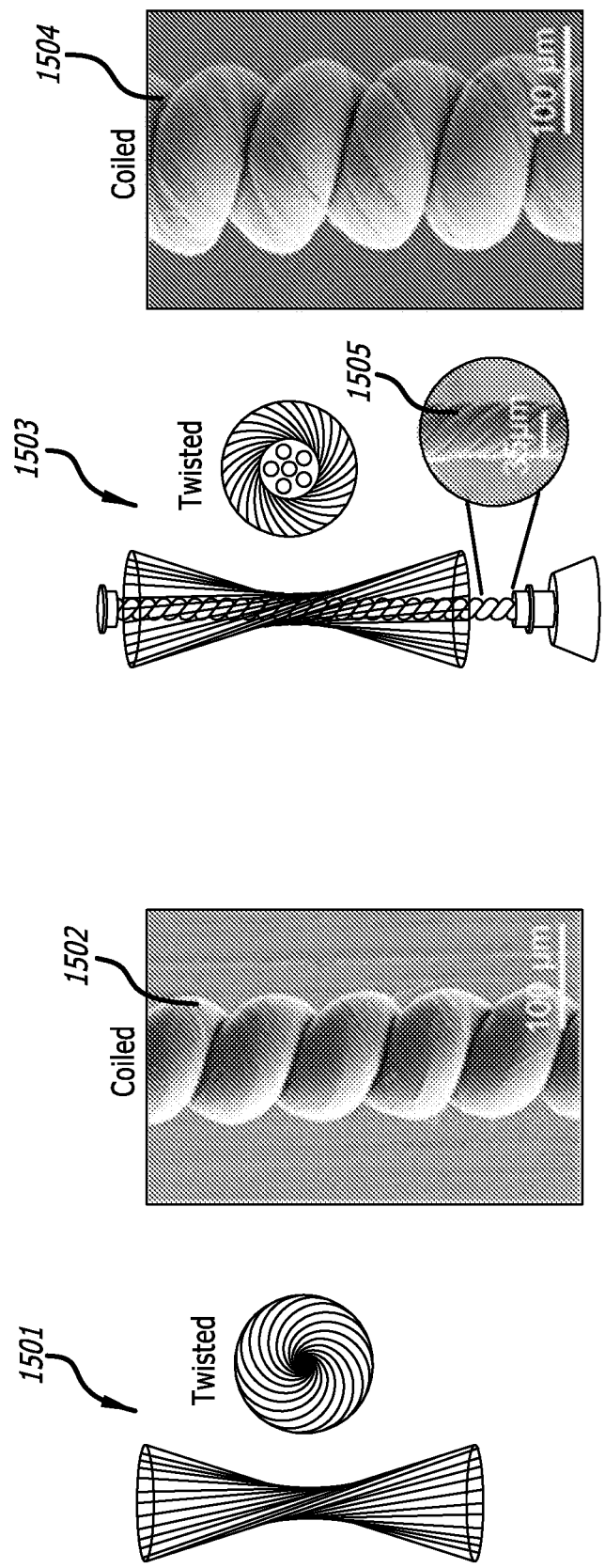
FIGS. 15A-15E shows fabrication and electrochemical tensile actuation of coiled CNT@nylon6 SRAM and coiled CNT HYAM yarns in 0.2 M TBA·PF$_6$/PC electrolyte.

A CNT@nylon6 SRAM, which contains a nylon 6 yarn core that supports a CNT sheath, was made using the process shown in configuration 1503 of FIG. 15A (showing also coiled CNT@nylon6 SRAM yarn 1504 and a non-coiled nylon 6 yarn 1503). Like for a process used to make coiled CNT yarns for energy harvesting [Kim 2017], a stack of CNT sheets was formed into a cylinder (shown in configuration 1501 of FIG. 15A (showing also coiled pristine yarn 1502). For energy harvesters, twist was inserted into this cylinder to make the utilized CNT yarn. To make an electrochemical SRAM, a nylon yarn was placed in the center of the cylinder. During the initial stage of twist insertion, twist is inserted only into the CNT cylinder. However, once the CNT cylinder collapses to form a sheath on the nylon 6 yarn, torque automatically transfers from this sheath to the yarn, enabling the yarn to become fully coiled.

Figure 15B:
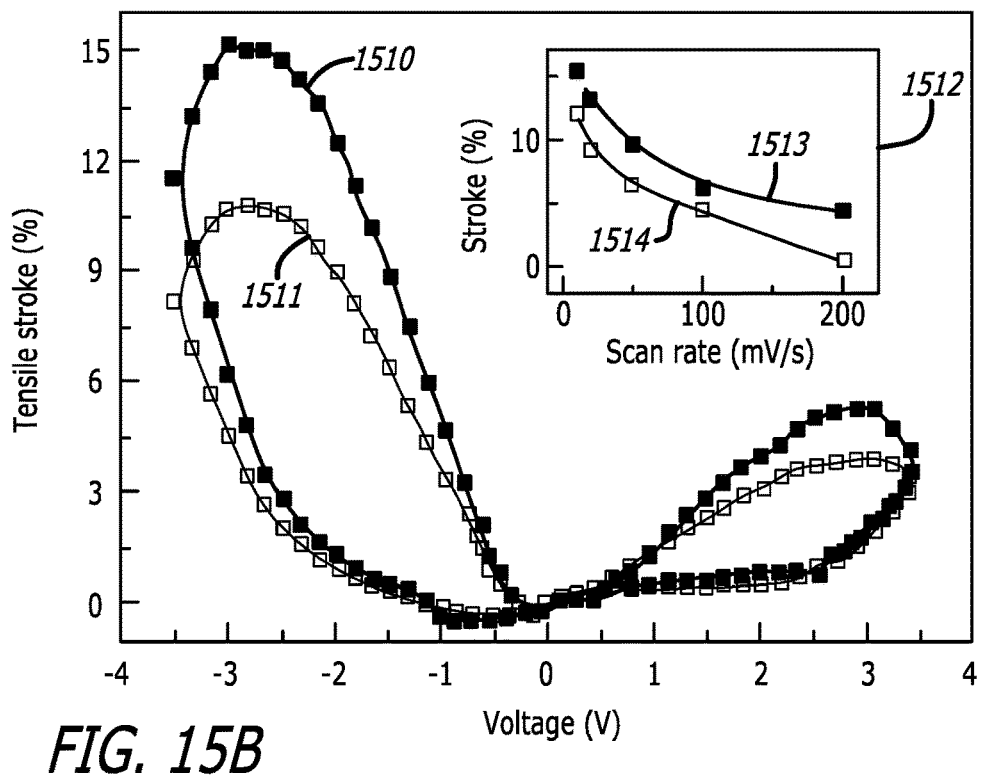

The electrolyte-filled CNT sheath of the CNT@nylon6 SRAM and the electrolyte-filled volume of the HYAM provide electrochemical actuation because of the volume changes produced by electrochemical double-layer charge injection. Consequently, the solvated sizes of the mobile ions of the electrolyte are important. For the presently used electrolyte of 0.2 M tetrabutyl ammonium hexafluorophosphate (TBA·PF$_6$) in propylene carbonate, the calculated van der Waals volume [Ue 2002] of the TBA$^+$ cation (~293 Å$^3$) is much larger than for the PF$_6^-$ anion (69 Å$^3$). Hence, ignoring changes in relative ion size due to solvation, muscle contraction is expected to be largest at potentials lower than the potential of zero charge (pzc) (if injected electrons and holes on the CNTs are compensated by addition of cations and anions, respectively, into the electrochemical double layer). In agreement with this prediction, the observed tensile contractions during a low rate potential scan (FIG. 15B) are largest at negative electrode potentials for both the SRAM (plot 1510) and the HYAM (plot 1511), although these contractions are larger for the SRAM at all potentials. Inset 1512 of FIG. 15B shows actuator stroke at this load for this muscle versus interelectrode voltage scan rate (plots 1513-1514 for the SRAM and the HYAM, respectively).

Figure 15C:
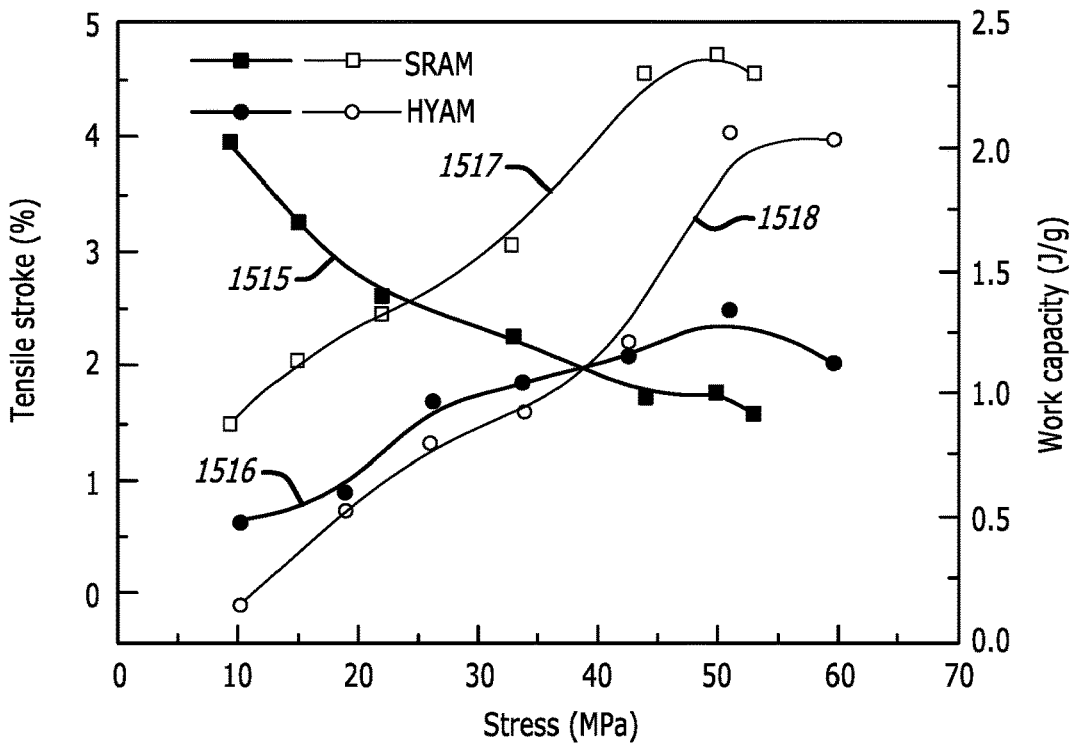
Figure 16:
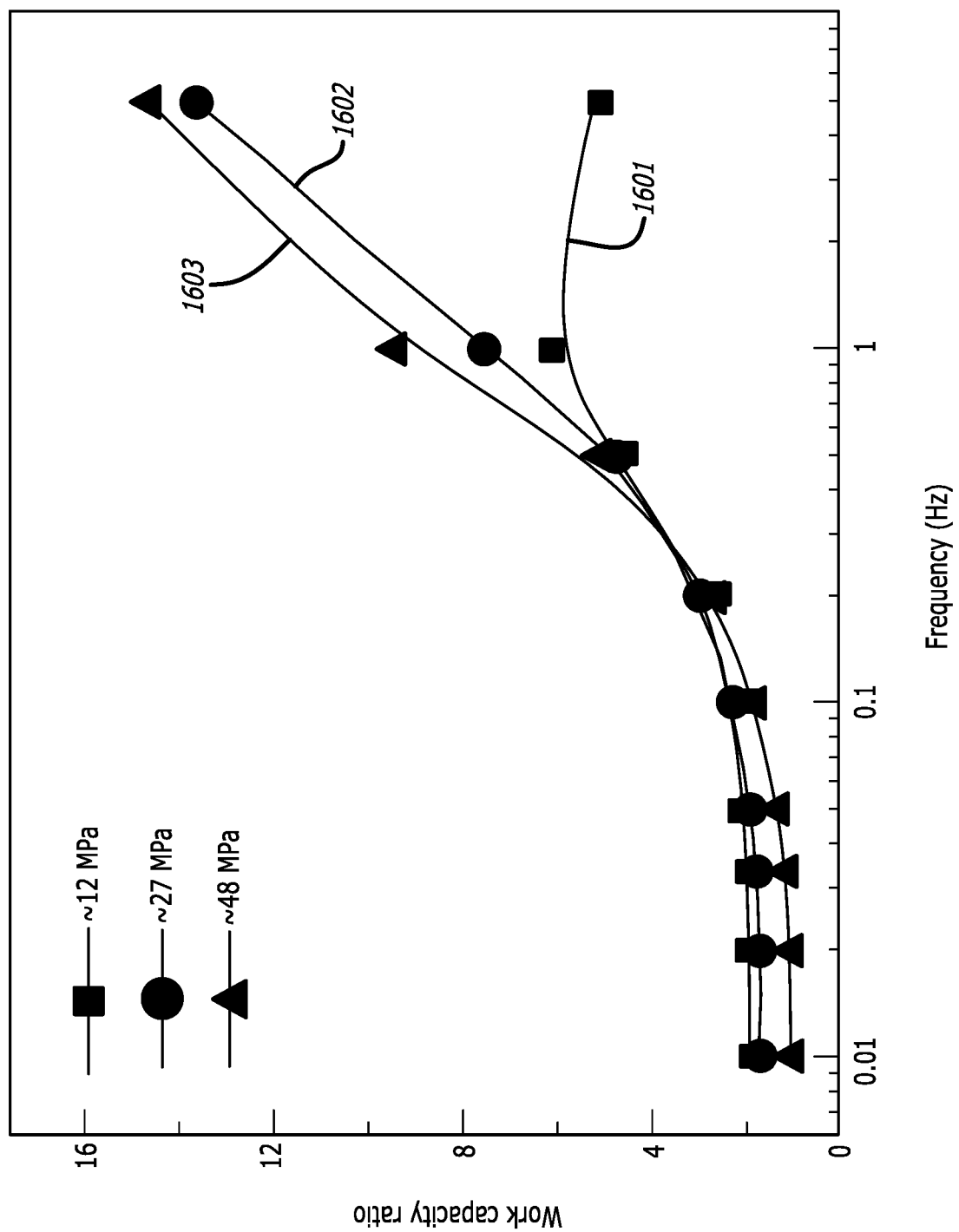
FIG. 16 is a graph showing comparison of electrochemical tensile work capacity of a coiled CNT@nylon6 SRAM and a coiled CNT HYAM yarns in 0.2 M TBA·PF$_6$/PC electrolyte for square-wave-driven actuation between 0 and –3V. The frequency dependence of the ratio of SRAM work capacity to HYAM work capacity is shown, which was obtained from the data of FIG. 15D.

Since the electrical energy needed to produce actuation increases with increasing amount of electrochemically accessible CNTs in the muscle, the contractile work per weight of CNT is an important performance metric. For very slow square-wave switching at 10 mHz between 0 V to −3 V (FIG. 15C), the load-maximized contractile work capacity is slightly higher for the CNT@nylon6 SRAM (2.35 J/g) than for the CNT yarn muscle containing the same CNT weight per yarn length (2.01 J/g). (FIG. 15C shows tensile stroke and contractile work capacity vs. load when applying a 10 mHz square-wave voltage between 0 and −3 V for the 95-µm-diameter CNT@nylon6 SRAM (plots 1517 and 1517, respectively) and the 70-µm-diameter CNT HYAM (plots 1518 and 1520, respectively)). However, for more practically applicable actuation rates (FIG. 16 showing frequency dependence of the ratio of SRAM work capacity to HYAM work capacity at ~12 MPa, ~27 MPa, and ~48 MPa (plots 1601-1603, respectively)), the ratios of SRAM to HYAM work capacities for similar tensile loads are much more impressive. For an applied square-wave frequency of ~0.3 Hz, this ratio is ~3.4 for all applied loads. At the highest measured frequency (5 Hz) and the highest applied load this ratio is 14.6. The electrochemical actuation of a coiled CNT@nylon6 SRAM to provide 14.3% stroke at 0.25 Hz, while lifting a 36 MPa load, which is much higher that the approximately 0.4 MPa load capability of human skeletal muscle.

Figure 15D:
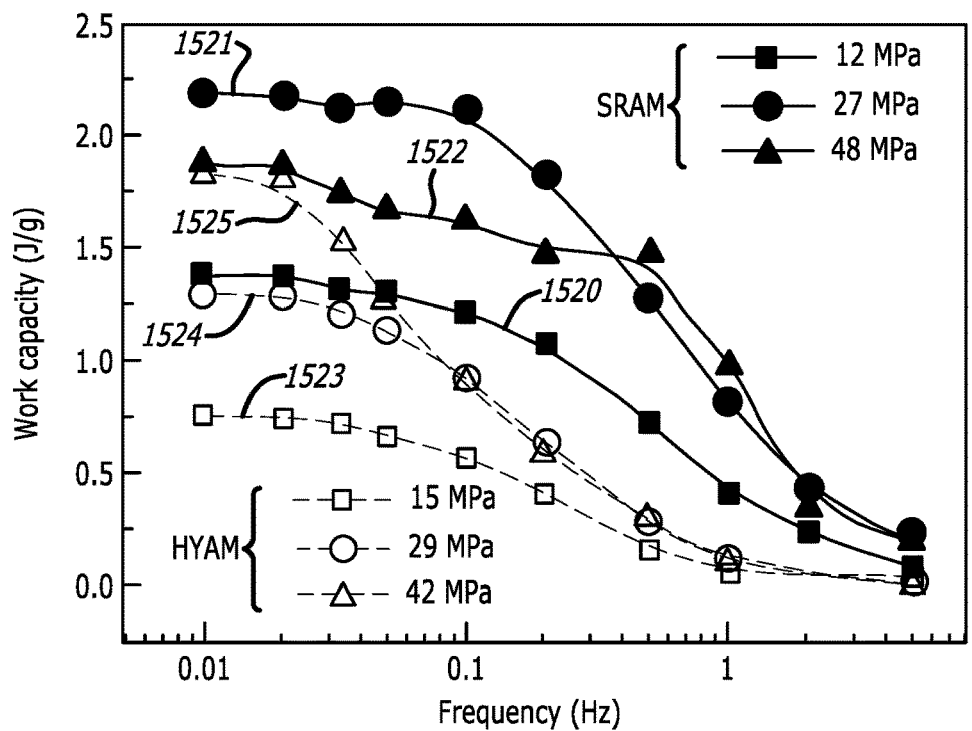

FIG. 15D shows the frequency dependence of work capacity for a coiled CNT@nylon6 SRAM (plots 1520-1522 for ~12 MPa, ~27 MPa, and ~48 MPa, respectively) and a coiled CNT HYAM (plots 1523-1525 for ~12 MPa, ~27 MPa, and ~48 MPa, respectively) for square-wave voltages between 0 V and −3 V. For 1 Hz cycle frequency, the tensile stroke, work per cycle, and average contractile power density for the SRAM were 4.7%, 0.99 J/g, and 1.98 W/g, as compared to 0.90%, 0.11 J/g, and 0.22 W/g for the HYAM. The high performance obtained for the SRAM at relatively high frequencies expands the application possibilities for electrochemical artificial muscles. If an application requires a higher tensile contraction, a higher spring index can be used. Large spring indices obtainable by coiling around a mandrel can enable arbitrarily high strokes (but with related reductions in load lifting capability). For applications requiring a higher frequency response, decreasing the SRAM diameter reduces ion diffusion times and increases actuation rate.

Figure 15E:
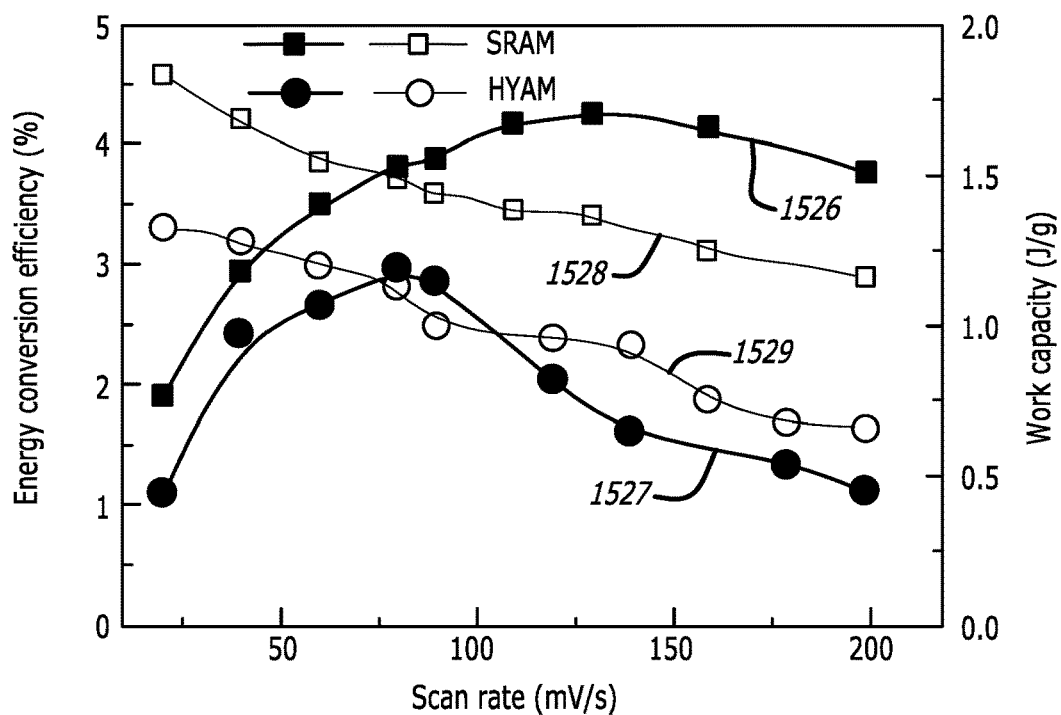

The contractile energy conversion efficiencies were obtained for optimized voltage scan rates between 0 and −2.7 V. This peak efficiency increased from 2.96% at 80 mV/s scan rate for the CNT yarn muscle to 4.26% at 130 mV/s scan rate for the SRAM. (See FIG. 15E showing the scan rate dependence of work capacity and energy conversion efficiency for the SRAM (plots 1528 and 1526, respectively) and HYAM (plots 1529 and 1527, respectively), using an applied stress of ~30 MPa for the SRAM and HYAM). Using a higher potential scan rate for both muscles (200 mV/s, which increased stroke rates, provided a SRAM efficiency (3.8%) that is 2.7 times the HYAM efficiency.

Uses of Sheath-Run Artificial Muscles

Because of major performance improvements and radically decreased cost compared with the highest performance HYAMs, which presently use expensive CNT yarns, the application possibilities of SRAMs are diverse. They extend from microscale actuators that intelligently control flow in fluidic circuits to macroscale arrays of actuators for humanoid robots and exoskeletons. The 5.2, 9.0, and 9.0 fold advantages at 1 Hz of the SRAM over the HYAM in electrochemical stroke, contractile work-per-cycle density, and average contractile power density (FIG. 15D) are especially important for electrically powered robotic devices in which stroke should be maintained without consuming significant electrical energy.

Coils having a high spring index (like shown in FIGS. 1D-1E and FIGS. 11A-11C) can be used to amplify the strokes of SRAMs, HYAMs, and polymer muscles. To minimize muscle cross-section (while still maintaining a highly amplified muscle stroke), the coils can made nearly coplanar, as shown in FIGS. 17A-17C. This structural modification (obtained for the SRAM in FIGS. 17A-17C by thermal setting) enables coiled muscles having a large spring index to be assembled into a thin textile.

FIG. 17A are photographs showing the fabrication of a planar SRAM: a homochiral, mandrel-coiled, twisted SRAM using a 150-µm-diameter PEO-SO$_3$@polycarbonate yarn 1701a having a sheath/core ratio of 0.33, an inserted twist of 22 turns/cm, and a spring index of 11.5. Pressing this mandrel-coiled SRAM between flat plates at 120° C. for 6 hours produced the below SRAM, which is pictured in initial (elongated) state 1701b and moisture-actuated (contracted) state 1701c when the applied load is 4.3 MPa. FIG. 17B shows lateral views 1702a-1702c, respectively, that are orthogonal to those of FIG. 17A. For illustrating the possible use of planar heterochiral SRAMs in an intelligent textile, photographs of three heterochiral SRAMs interconnected by an inert 150-µm-diameter fiber are provided (FIG. 17C) for the expanded moisture-absorbed state 1703a and the contracted moisture-free state 1703b. For an isobaric 4.7 MPa load, 48.6% contraction was obtained by exposing a homochiral planar SRAM to moist air (RH=70%) after it had been equilibrated in an ambient RH of 34%. For clarity, the muscle backgrounds in FIGS. 17A-17C were made black.

The use of SRAMs for harvesting chemical or thermal energy as mechanical energy, which is then converted to electrical energy, is attractive for both small-scale and large-scale applications, like powering remotely communicating sensors and harvesting electrical energy from industrial waste streams. For example, twistron yarn harvesters [Kim 2017] can be connected in series with SRAMs to convert generated mechanical energy to electrical energy. The inherently higher mechanical power generation capabilities of SRAMs, compared with HYAMs, will provide correspondingly higher electrical power output.

Applications in which artificial muscles intelligently actuate by sensing their environment are of great importance [McEvoy 2015]. Since SRAMs can provide intelligent actuation from cheap yarns, they can be used as yarns for comfort-adjusting and protective clothing, and for geotextiles that appropriately respond to environmental conditions to change porosity. Textile responses to ambient variables can be engineered by the design of textile structure and by using differing guest sheath compositions in multiple SRAMs or SRAM segments to provide either additive or subtractive responses to different environmental influences for driving actuation, like temperature, exposure to moisture (like sweat), and sunlight.

Both torsional and tensile actuation could be used in intelligent, analyte-powered sensors that intelligently respond in the body to open and close valves that release drugs. The torsional actuation of a CNT HYAM has previously been used for detecting glucose [Lee 2016]. Various methods can be usefully deployed for providing SRAMs and SRAM textiles that respond either additively or subtractively to different environmental influences, such as temperature, humidity, environmental strain, and chemical and biochemical agents.

Figures 18A, 18B:
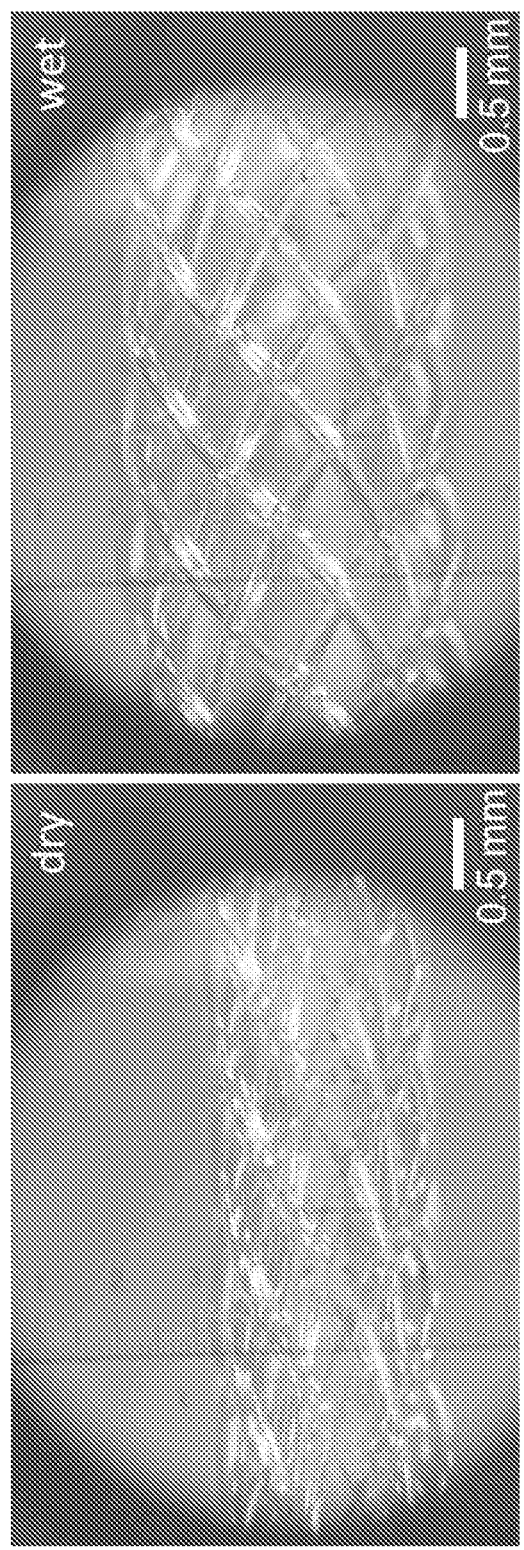
FIGS. 18A-18B are photographs showing the morphing of a cylindrical braid made of nylon 6 fibers by the water-absorption-driven contraction of a coiled PEO-SO$_3$@bamboo SRAM that is inside the braid.

FIGS. 18A-18B shows the morphing of a cylindrical braid to change braid porosity, which is driven by the water-absorption-driven contraction of a coiled PEO-SO$_3$@bamboo SRAM that is inside the braid. This braid has a structure like found in McKibben muscles (Takashima 2010), which are normally driven pneumatically to provide changes in braid length. A bio-responsive SRAM could be used as the yarns of the McKibben braid, so that muscle contraction squeezes a pouch to release a drug that is within the braid. Alternatively, parallel bio-response SRAMs could be located in a mechanically balanced manner on the exterior of a woven braid, and mechanically connected to it, to provide release of a drug that is within the braid. By combining muscle segments that respond to different bio-agents, such as different antigens (either by adding to or cancelling muscle response), drug release could be made intelligent.

The simplest approaches for obtaining SRAM arrays that intelligently respond to the combined effects of different agents in the environments are to combine SRAMs having different guest sheaths and/or different coil indices in mechanical logic circuits. As one example of such a mechanical logic circuit, two SRAMs that individually contract or expand in the presence of different environmental agents can be placed in series to open or close a valve to response to the presence of both agents or the presence of one agent and the absence on another. This valve opening can be either a continuous function of the responses of these individual SRAMs or one that opens a valve only when a critical stress is applied as a result the joint additive or subtractive responses of these SRAMs.

Figure 19A:
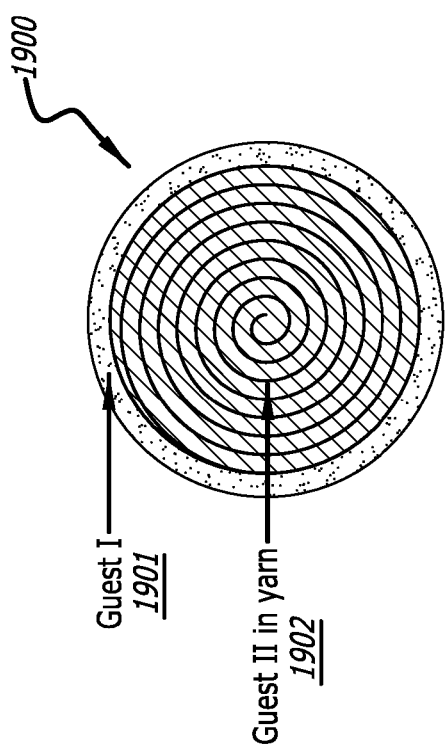
FIGS. 19A-19D are illustration of generic types of SRAMs, which are modified to provide actuation contributions from both sheath and core (FIGS. 19A-19B) using guest I and guest II (which can be different) and by using a sheath that has different sheath compositions on opposite sides of a sheath (FIG. 19C), so that actuation by bending is added to actuation by torsional rotation and muscle length change. The use of two guest sheaths is also illustrated (FIG. 19D), which can respond to differing ambient variables to provide either additive or subtractive contributions to overall muscle actuation. While these illustrations are for twisted, non-coiled muscles, the same concepts pertain to coiled muscles having the analogous structures, since tensile actuation of a coiled SRAM is driven by torsional actuation of the component SRAM yarn.
Figure 19B:
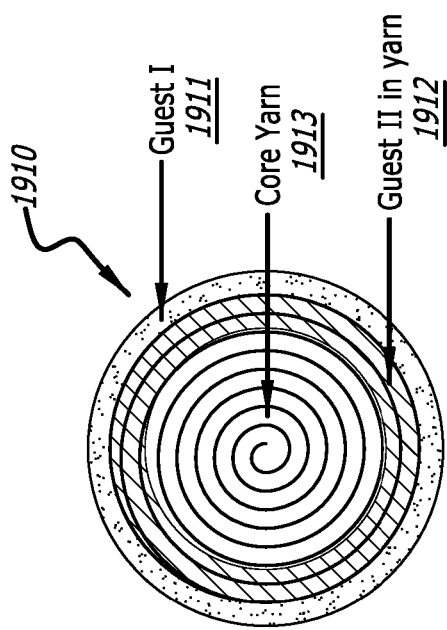

Similarly, different segments of a SRAM can use different guest sheaths, as well as differing coil indices (for amplifying segment stroke). Importantly, SRAMs can incorporate guest in both sheath and core (FIG. 19A showing SRAM 1900 with guest I (sheath guest 1901) and guest II in yarn (core guest 1902) and FIG. 19B showing SRAM 1910 with guest I (sheath guest 1911), guest II in yarn (core guest 1912), and core yarn (core yarn 1913)). The sheath guest can optionally differ from that in the core, so that sheath guest and core guest can either additively or subtractively contribute to actuation in response to various environmental actuating agents. The actuating guest in the core can either uniformly occupy the core (FIG. 19A) or be non-uniformly distributed, such as being preferably located only on the outermost interior of the core (FIG. 19B). As another useful invention embodiment, the yarn or fiber core of a SRAM can also actively actuate by changing modulus and/or dimensions. This yarn or fiber actuation can be caused by the same or different environmental agent and have either the same direction or an opposite direction contribution to overall SRAM actuation as the SRAM sheath. Additionally, the SRAM sheath can optionally contain either actuating fibers (like for CNT fibers for the electrochemical SRAM of FIGS. 15A-15E) or non-actuating fibers. While a coiled exterior yarn or a braided exterior yarn could be described as a sheath on a core fiber or yarn, a SRAM sheath is herein defined as a sheath that does not comprise a yarn.

Non-actuated or actuated guests in a SRAM core can be used to enable coiling of the SRAM core, by eliminating the yarn rupture that would otherwise occur. Elastomeric guests are especially useful for this purpose, like when coiling carbon fiber yarns comprising relatively large diameter carbon fibers [Lamura 2018].

Guests can be conveniently arranged in any desired radial distribution by using biscrolling methods [Lima 2011], where a single guest or differing guests are deposited in a patterned manner on a nanofiber sheet or sheet stack before twist is inserted in the sheet or sheet stack to make a yarn. Electrostatic spinning [Jalili 2006] provides a particularly useful way to make the precursor sheets of highly oriented nanofibers for biscrolling.

Both a sheath and the core can have a twist that is either in the same or opposite directions, and this will affect actuation. Different sheaths can have differing amounts of twist. The relative amounts of twist in a sheath and in the core can be adjusted according to needs by varying the place in the twist insertion process when this sheath is added, and even by providing an initial twist in the core fiber that is in a different direction to the twist that results in the final SRAM. Additionally, for SRAM cores containing plied fibers or yarns (which can have differing fiber diameters, degrees of inserted twist, and optionally present guests), the twist of the plied yarn is the twist of plying.

Figure 19C:
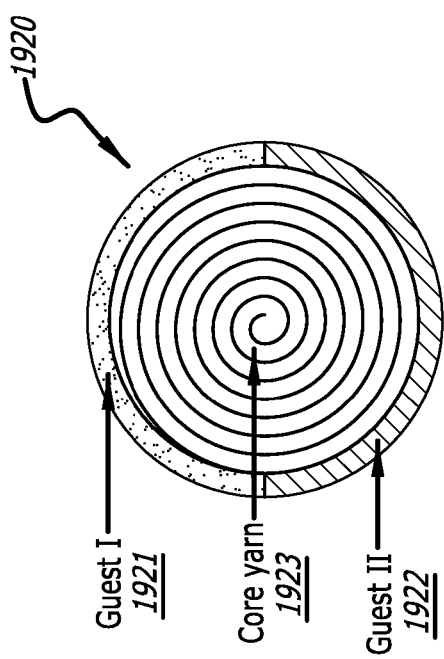

One or more guests that are not circumferentially symmetric (such as SRAM 1920 in FIG. 19C with guest I (sheath guest 1921), guest II (sheath guest 1922), and core yarn (core yarn 1923)) are useful for introducing bending as a component of actuation. For SRAMs woven or knitted into a comfort-adjusting textile, this bending can enhance porosity changes in response to perspiration or changing temperature. Additionally, to avoid sunburn resulting from sunlight penetration through a body-exposing textile structure, morphing by yarn contraction and/or bending in response to sunlight can be used.

Figure 19D:
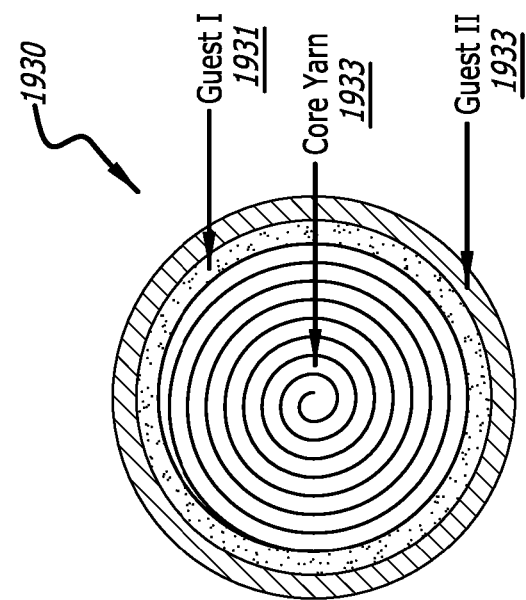

Two guest sheaths can be used in SRAMs (such as SRAM 1930 in FIG. 19D with guest I (sheath guest 1931), guest II (sheath guest 1932), and core yarn (core yarn 1933)), which SRAMs can respond to differing ambient variables to provide either additive or subtractive contributions to overall muscle actuation.

While these illustrations of FIGS. 19A-19D are for twisted, non-coiled muscles, the same concepts pertain to coiled muscles having the analogous structures, since tensile actuation of a coiled SRAM is driven by torsional actuation of the component SRAM yarn.

The SRAM structure is very useful for artificial muscles that actuate in response to the absorption of light. This actuation can result from photothermal heating, photochemical reaction, or their combination. A typical problem of using a HYAM structure arises when the penetration depth of the actuating radiation is much smaller than the yarn diameter, as a result of radiation absorption and scattering by the photo-responsive guest, the host yarn, or their combination. Since the photo-responsive guest is a sheath on the exterior of the muscle, more uniform absorption of radiation can occur for the SRAM than for the HYAM. Diverse photochemically responsive materials are known in the literature that can be used as sheaths to provide photochemically actuated SRAMs [Priimagi 2014].

Further information regarding the present invention is set forth in (a) J. Mu et al., Sheath-Run Artificial Muscles, *Science,* 365(6449), 150-155 (Jul. 12, 2019) and (b) the Supplementary Material for Sheath-Run Artificial Muscles (Jul. 12, 2019) (available at science.sciencemag.org/content/365/6449/150/suppl/DC1). These materials are hereby incorporated by reference in their entirety of all purposes.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

U.S. Pat. No. 8,968,756, entitled "Fabrication of Biscrolled Fiber Using Carbon Nanotube Sheet," issued Mar. 3, 2015 to S. Fang et al. ("Fang '756 patent").
I. Agnarsson et al., Spider silk as a novel high performance biomimetic muscle driven by humidity. *J. Exp. Biol.* 212, 1990-1994 (2009) ("Agnarsson 2009").
S. Aziz et al., Controlled and Scalable Torsional Actuation of Twisted Nylon 6 Fiber. *J. Polym. Sci. B* 54, 1278-1286 (2016) ("Aziz 2016").
S. Aziz et al., Characterization of torsional actuation in highly twisted yarns and fibres. *Polym. Test.* 46, 88-97 (2015) ("Aziz 2015").
P. Chen et al., Hierarchically arranged helical fibre actuators driven by solvents and vapours. *Nat. Nanotech.* 10, 1077-1083 (2015) ("Chen 2015").
H. Cheng et al., Moisture-Activated Torsional Graphene-Fiber Motor. Adv. Mater. 26, 2909-2913 (2014) ("Cheng 2014").
J. Deng et al., Preparation of biomimetic hierarchically helical fiber actuators from carbon nanotubes. *Nat. Protoc.* 12, 1349-1358 (2017) ("Deng 2017").
M. Elsherif et al. Glucose Sensing with Phenylboronic Acid Functionalized Hydrogel-Based Optical Diffusers, *ACS Nano* 12, 2283-2291 (2018) ("Elsherif 2018").
J. Fan et al., High performance and tunable artificial muscle based on two-way shape memory polymer. *RSC Adv.* 17, 1127-1136 (2017) ("Fan 2017").
J. Foroughi et al., Torsional carbon nanotube artificial muscles. *Science* 334, 494-497 (2011) ("Foroughi 2011").
J. Gong et al., Hierarchically arranged helical fiber actuators derived from commercial cloth. *Adv. Mater.* 29, 1605103 (2017) ("Gong 2017").
X. Gu et al., Hydro-actuation of hybrid carbon nanotube yarn muscles. *Nanoscale* 8, 17881-17886 (2016) ("Gu 2016").
W. Guo et al., A Novel electromechanical actuation mechanism of a carbon nanotube fiber. *Adv. Mater.* 24, 5379-5384 (2012) ("Guo 2012").
C. S. Haines et al., Artificial muscles from fishing line and sewing thread. *Science* 343, 868-872 (2014) ("Haines 2014").
S. He et al., A Mechanically Actuating Carbon-Nanotube Fiber in Response to Water and Moisture. *Angew. Chem.* 127, 15093-15097 (2015) ("He 2015").
M. Hiraoka et al., Power-efficient low-temperature woven coiled fibre actuator for wearable applications. *Sci. Rep.* 6, 36358 (2016) ("Hiraoka 2016").
R. Jalili et al., Fundamental parameters affecting electrospinning of PAN nanofibers as uniaxially aligned fibers. *J. Appl. Polym. Sci.* 101, 4350-4357 (2006) ("Jalili 2006").
S. H. Kim et al., Harvesting electrical energy from carbon nanotube yarn twist. *Science* 357, 773-778 (2017) ("Kim 2017").
S. H. Kim et al., Bio-inspired, moisture-powered hybrid carbon nanotube yarn muscles. *Sci. Rep.* 6, 23016 (2016) ("Kim 2016").
S. H. Kim et al., Harvesting temperature fluctuations as electrical energy using torsional and tensile polymer muscles. *Energy Environ. Sci.* 8, 3336 (2015) ("Kim 2015").
C. Lamuta et al., Theory of the tensile actuation of fiber reinforced coiled muscles. *Smart Mater. Struct.* 27, 055018 (2018) ("Lamuta 2018").
J. A. Lee et al., Electrochemically powered, energy-conserving carbon nanotube artificial muscles. *Adv. Mater.* 29, 1700870 (2017) ("Lee 2017").
J. Lee et al., Carbon nanotube yarn-based glucose sensing artificial muscle. *Small* 12, 2085-2091 (2016) ("Lee 2016").
M. D. Lima et al., Electrically, chemically, and photonically powered torsional and tensile actuation of hybrid carbon nanotube yarn muscles. *Science* 338, 928-932 (2012) ("Lima 2012").
M. D. Lima et al., Biscrolling nanotube sheets and functional guests into yarns. *Science* 331, 51-55 (2011) ("Lima 2011").
A. Maziz et al., Knitting and weaving artificial muscles. *Sci. Adv.* 3, e1600327 (2017) ("Maziz 2017").
M. A. McEvoy et al., Materials that couple sensing, actuation, computation, and communication. *Science* 347, 1261689 (2015) ("McEvoy 2015").
F. Meng et al., Electro-induced mechanical and thermal responses of carbon nanotube fibers. *Adv. Mater.* 26, 2480-2485 (2014) ("Meng 2014").
S. M. Mirvakili et al., Artificial muscles: mechanisms, applications, and challenges. *Adv. Mater.* 30, 1704407 (2017) ("Mirvakili I 2017").
S. M. Mirvakili et al., Fast torsional artificial muscles from NiTi twisted yarns. *ACS Appl. Mater. Interfaces* 9, 16321-16326 (2017) ("Mirvakili II 2017").
T. Miyata et al., A reversibly antigen-responsive hydrogel. *Nature* 399, 766-769 (1999) ("Miyata 1999").
A. Priimagi et al., Recent twists in photoactuation and photoalignment control. *J. Mater. Chem. C* 2, 7155-7162 (2014) ("Priimagi 2014").
Y. Song et al., Hierarchical carbon nanotube composite yarn muscles. *Nanoscale* 10, 4077-4084 (2018) ("Song 2018").

A. M. Swartz, et al., Experimental characterization and model predictions for twisted polymer actuators in free torsion. *Smart Mater. Struct.* 27, 114002 (2018) ("Swartz 2018").

Y. Sun et al., Water-responsive helical graphene-oxide fibers incorporating a continuous carbon nanotube network. *Carbon* 132, 394-400 (2018) ("Sun 2018").

K. Takashima et al. McKibben artificial muscle using shape-memory polymer. *Sensors and Actuators A* 164, 116-124 (2010) ("Takashima 2010").

J. Terrones et al., The electro-structural behaviour of yarn-like carbon nanotube fibres immersed in organic liquids. *Sci. Technol. Adv. Mater.* 15, 055008 (2014) ("Terrones 2014").

M. Ue et al., A convenient method to estimate ion size for electrolyte materials design. *J. Electrochem. Soc.* 149, A1385-A1388 (2002) ("Ue 2002").

T. Wang et al., Electrospinning of Polyacrylonitrile Nanofibers. *J. Appl. Polym. Sci,* 102, 1023-1029 (2006) ("Wang 2006").

Q. Yang et al., Artificial muscles made of chiral two-way shape memory polymer fibers. *Appl. Phys. Lett.* 109, 183701 (2016) ("Yang 2016").

P. Zhang et al., Healing-on-demand composites based on polymer artificial muscle. *Polymer* 64, 29-38 (2015) ("Zhang 2015").

What is claimed is:

1. A sheath-core artificial muscle comprising a sheath on a coiled core yarn or fiber that comprises twist, wherein
   (a) the sheath does not comprise a yarn,
   (b) the coiled core yarn or fiber comprises a core yarn or fiber, wherein
      (i) the core yarn or fiber comprises a guest, and
      (ii) the guest has a substantially same chemical composition as the sheath,
   (c) the sheath can change volume, modulus, or a combination thereof when actuated by an influence source to drive actuation,
   (d) the influence source is selected from a group consisting of absorption processes, desorption processes, changes in temperature, changes in external pressure, changes in pH, changes in a magnetic field, changes in an electric field, exposure to actinic radiation, electrochemical charge or discharge, chemical reaction, and combinations thereof, and
   (e) the sheath-core artificial muscle is operable to actuate by at least one of torsional rotation and changes in length.

2. The sheath-core artificial muscle of claim 1, wherein ratio of average thickness of the sheath to average diameter of the coiled core yarn or fiber before actuation is at least 0.05.

3. The sheath-core artificial muscle of claim 1, wherein ratio of average sheath thickness of the sheath to average diameter of the coiled core yarn or fiber before actuation is at most 3.0.

4. The sheath-core artificial muscle of claim 1, wherein
   (a) the sheath has a twist, and
   (b) the twist is in the same direction as the direction of inserted twist in the coiled core yarn or fiber.

5. The sheath-core artificial muscle of claim 1, wherein
   (a) the sheath has a twist, and
   (b) the twist is in the opposite direction as the direction of inserted twist in the coiled core yarn or fiber.

6. The sheath-core artificial muscle of claim 1, wherein the coiled core yarn or fiber has the same direction of twist as the direction of coiling.

7. The sheath-core artificial muscle of claim 1, wherein the coiled core yarn or fiber has the opposite direction of twist as the direction of coiling.

8. The sheath-core artificial muscle of claim 1 further comprising sheaths of at least two types of guest compositions or structures.

9. The sheath-core artificial muscle of claim 1, wherein
   (a) the sheath is asymmetrically placed on opposite sides of the coiled core yarn,
   (b) the asymmetrical placement is with respect to sheath thickness, structure, or composition, and
   (c) the asymmetrical placement is placed so that bending of the sheath-core artificial muscle can occur during actuation.

10. The sheath-core artificial muscle of claim 1, wherein the coiled core yarn comprises a plied core yarn.

11. The sheath-core artificial muscle of claim 10, wherein the plied core yarn comprises plies of differing types.

12. The sheath-core artificial muscle of claim 1, wherein the concentration of the guest in the core yarn or fiber is lowest at or near the center of the core yarn or fiber.

13. The sheath-core artificial muscle of claim 1, wherein the core yarn or fiber comprises carbon nanotubes.

14. The sheath-core artificial muscle of claim 13, wherein the core yarn or fiber is substantially free of guest.

15. The sheath-core artificial muscle of claim 1, wherein the core yarn or fiber comprises carbon fibers.

16. The sheath-core artificial muscle of claim 15, wherein the core yarn or fiber comprises high strength carbon fibers and an elastomeric yarn guest.

17. The sheath-core artificial muscle of claim 1, wherein the coiled core yarn or fiber undergoes substantial change in modulus or volume during actuation.

18. The sheath-core artificial muscle of claim 1, wherein
   (a) the sheath-core artificial muscle comprises at least two components that are operable to actuate by changing volume, modulus, or both, and
   (b) the at least two actuating components are selected from a group consisting of (1) multiple actuating sheaths, (2) actuating sheath and actuating core, and (3) combinations thereof.

19. The sheath-core artificial muscle of claim 18, wherein the sheath-core artificial muscle is operable to actuate in response to an environmental change by using differing actuation contributions from the at least two components within the yarn core or fiber to environmental changes that drive actuation.

20. The sheath-core artificial muscle of claim 1, wherein the sheath-core artificial muscle is operable to actuate
   (a) in response to the presence of at least one of an antigen, a toxic agent, and a biological agent, and
   (b) without the need for electrical energy input.

21. The sheath-core artificial muscle of claim 20, wherein the sheath-core artificial muscle is operable to provide sufficiently high tensile or torsional actuation to enable drug release.

22. The sheath-core artificial muscle of claim 1, wherein the sheath-core artificial muscle is operable to be actuated, at least in part, electrochemically.

23. The sheath-core artificial muscle of claim 22, wherein the sheath-core artificial muscle is operable to be actuated in which actuation of the sheath-core artificial muscle can be predominately driven electrochemically by using an electrically and ionically conducting muscle sheath as an electrochemical electrode.

24. The sheath-core artificial muscle of claim 23 further comprising a high-surface-area electrical conductor in an electrolyte that is connected ionically to a counter electrode.

25. The sheath-core artificial muscle of claim 24, wherein the high-surface-area conductor comprises carbon nanotubes.

26. The sheath-core artificial muscle of claim 23, wherein
  (a) the twisted and coiled core yarn or fiber is substantially electrochemically inactive, and
  (b) the twisted and coiled core yarn or fiber comprises an insulating polymer yarn or fiber or an electronically conducting yarn or fiber.

27. The sheath-core artificial muscle of claim 23, wherein the sheath comprises a redox active electrical conductor in an electrolyte.

28. The sheath-core artificial muscle of claim 22, wherein
  (a) the twisted and coiled core or fiber of the sheath-core artificial muscle is a counter electrode of the sheath-core artificial muscle, and
  (b) the sheath and coiled core yarn or fiber are separated by an electronically insulating, ionically conducting layer.

29. The sheath-core artificial muscle of claim 1, further comprising approximately coplanar coils of coiled core yarns or fibers.

30. The sheath-core artificial muscle of claim 1, wherein the sheath-core artificial muscle has a spring index of at most 1.5.

31. A sheath-core artificial muscle of comprising a sheath on a coiled core yarn or fiber that comprises twist, wherein
  (a) the sheath does not comprise a yarn,
  (b) the coiled core yarn or fiber comprises a core yarn or fiber, wherein
    (i) the core yarn or fiber comprises a guest, and
    (ii) the guest has a substantially different chemical composition as the sheath,
  (c) the sheath can change volume, modulus, or a combination thereof when actuated by an influence source to drive actuation,
  (d) the influence source is selected from a group consisting of absorption processes, desorption processes, changes in temperature, changes in external pressure, changes in pH, changes in a magnetic field, changes in an electric field, exposure to actinic radiation, electrochemical charge or discharge, chemical reaction, and combinations thereof, and
  (e) the sheath-core artificial muscle is operable to actuate by at least one of torsional rotation and changes in length.

* * * * *